United States Patent
Udou

(10) Patent No.: US 9,910,643 B2
(45) Date of Patent: Mar. 6, 2018

(54) PROGRAM FOR PROGRAM EDITING

(71) Applicant: MITSUBISHI ELECTRIC CORPORATION, Tokyo (JP)

(72) Inventor: Satoshi Udou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 14/913,062

(22) PCT Filed: Aug. 21, 2013

(86) PCT No.: PCT/JP2013/072297
§ 371 (c)(1),
(2) Date: Feb. 19, 2016

(87) PCT Pub. No.: WO2015/025382
PCT Pub. Date: Feb. 26, 2015

(65) Prior Publication Data
US 2016/0196118 A1     Jul. 7, 2016

(51) Int. Cl.
*G06F 9/44*     (2006.01)
*G05B 19/042*     (2006.01)
(Continued)

(52) U.S. Cl.
CPC ........... *G06F 8/34* (2013.01); *G05B 19/0426* (2013.01); *G06F 3/017* (2013.01);
(Continued)

(58) Field of Classification Search
None
See application file for complete search history.

(56) References Cited

U.S. PATENT DOCUMENTS 5,583,543 A    12/1996   Takahashi et al.
5,913,221 A     6/1999   Kano et al.
(Continued)

FOREIGN PATENT DOCUMENTS

CN     102460353 A     5/2012
JP      6-119021 A     4/1994
(Continued)

OTHER PUBLICATIONS

Notification of Reason(s) for Refusal for Japanese Patent Application No. 2014-511627, dated Jun. 10, 2014.
(Continued)

*Primary Examiner* — Chameli Das
(74) *Attorney, Agent, or Firm* — Sughrue Mion, PLLC; Richard C. Turner

(57) ABSTRACT

A program for program editing for editing a program described using a symbol on a program editing screen causes an information processing apparatus to function as input-gesture-characteristic-information acquiring unit for acquiring input gesture characteristic information including coordinate information and a track of the coordinate input on the program editing screen, and as processing executing unit for specifying an operation target and specifying a command applied to the operation target on the basis of the input gesture characteristic information, executing the command, and for displaying the result of execution of the command on the program editing screen.

22 Claims, 47 Drawing Sheets

(51) Int. Cl.
*G06F 3/01* (2006.01)
*G06F 3/0484* (2013.01)

(52) U.S. Cl.
CPC ............... *G06F 3/04842* (2013.01); *G05B 2219/23291* (2013.01); *Y02P 90/265* (2015.11)

(56) References Cited

U.S. PATENT DOCUMENTS

| | | | |
|---|---|---|---|
| 5,936,614 A * | 8/1999 | An | G06F 3/04886 345/173 |
| 9,176,663 B2 | 11/2015 | Ashikawa | |
| 2004/0056839 A1 | 3/2004 | Yoshihara | |
| 2004/0233216 A1* | 11/2004 | Rekimoto | G06F 3/046 345/592 |
| 2007/0233323 A1* | 10/2007 | Wiemeyer | G05B 15/02 700/276 |
| 2008/0036743 A1* | 2/2008 | Westerman | G06F 3/038 345/173 |
| 2009/0055161 A1* | 2/2009 | Aoyama | G06F 17/28 704/7 |
| 2011/0093820 A1* | 4/2011 | Zhang | A63F 13/06 715/863 |
| 2012/0086662 A1 | 4/2012 | Ashikawa | |
| 2012/0327102 A1* | 12/2012 | Midorogi | G06F 17/241 345/589 |
| 2013/0305184 A1* | 11/2013 | Kim | G06F 3/0481 715/781 |
| 2014/0139631 A1* | 5/2014 | Mark | G06F 3/0304 348/46 |
| 2014/0229911 A1 | 8/2014 | Inamoto | |
| 2014/0293797 A1* | 10/2014 | Hiramoto | H04L 47/12 370/236 |
| 2014/0313135 A1* | 10/2014 | Pisters | G06F 3/04883 345/173 |
| 2015/0007190 A1* | 1/2015 | Diefenbaugh | G06F 9/5094 718/104 |
| 2016/0292131 A1* | 10/2016 | Langels | G06F 3/04847 |
| 2016/0381565 A1* | 12/2016 | Oteri | H04W 16/14 370/328 |

FOREIGN PATENT DOCUMENTS

| | | |
|---|---|---|
| JP | 6-149467 A | 5/1994 |
| JP | 6-208654 A | 7/1994 |
| JP | 7-44311 A | 2/1995 |
| JP | 7-146642 A | 6/1995 |
| JP | 9-222955 A | 8/1997 |
| JP | 10-124308 A | 5/1998 |
| JP | 11-25148 A | 1/1999 |
| JP | 11-345071 A | 12/1999 |
| JP | 2004-118917 A | 4/2004 |
| JP | 2006-79314 A | 3/2006 |
| JP | 2009-259080 A | 11/2009 |
| WO | 2010/143673 A1 | 12/2010 |
| WO | 2013/038541 A1 | 3/2013 |
| WO | 2013/073023 A1 | 5/2013 |

OTHER PUBLICATIONS

Taiwanese Office Action for Taiwanese Patent Application No. 103101243, dated Nov. 12, 2015.
International Search Report of PCT/JP2013/072297, dated Nov. 19, 2013. [PCT/ISA/210].
Written Opinion of PCT/JP2013/072297, dated Nov. 19, 2013. [PCT/ISA/237].
Communication dated May 18, 2017, from the State Intellectual Property Office of People's Republic of China in counterpart Application No. 201380079036.7.

* cited by examiner

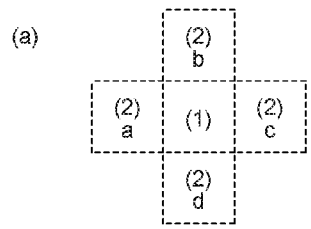

(b)

| TRACK AND DIREC-TION | OPERATION TARGET | DEFINITION OF TRACK AND DIRECTION* | COMMAND |
|---|---|---|---|
| ← | SYMBOL-LOCATABLE BASE ELEMENT | (1)→(2)a | NEGLECT |
| ↑ | | (1)→(2)b | NEGLECT |
| → | | (1)→(2)c | REPLACE BASE ELEMENT WITH CONNECTION LINE IN HORIZONTAL DIRECTION<br>HOWEVER, WHEN OTHER PROGRAM CONSTITUENT ELEMENT IS ABSENT BETWEEN CONNECTION LINE AND BUSES, REPLACE REGION BETWEEN LEFT BUS AND RIGHT BUS WITH CONNECTION LINE |
| ↓ | | (1)→(2)d | WHEN OTHER PROGRAM CONSTITUENT ELEMENT IS ABSENT BETWEEN CONNECTION LINE AND BUSES, REGION BETWEEN LEFT BUS AND RIGHT BUS IS REPLACED WITH CIRCUIT INCLUDING "a" CONTACT, COIL, AND CONNECTION LINE |

* PLACE START POINT IN (1), PLACE END POINT IN (2), AND COLLATE DIRECTION

| (2) ab | (2) b | (2) bc |
|---|---|---|
| (2) a | (1) | (2) c |
| (2) ad | (2) d | (2) cd |

(b)

| TRACK AND DIREC-TION | OPERATION TARGET | DEFINITION OF TRACK AND DIRECTION* | COMMAND |
|---|---|---|---|
| ← | SYMBOL-LOCATABLE BASE ELEMENT | (1)→(2)a | NEGLECT |
| ↑ | | (1)→(2)b | NEGLECT |
| → | | (1)→(2)c | REPLACE BASE ELEMENT WITH CONNECTION LINE IN HORIZONTAL DIRECTION HOWEVER, WHEN OTHER PROGRAM CONSTITUENT ELEMENT IS ABSENT BETWEEN CONNECTION LINE AND BUSES, REPLACE REGION BETWEEN LEFT BUS AND RIGHT BUS WITH CONNECTION LINE |
| ↓ | | (1)→(2)d | WHEN OTHER PROGRAM CONSTITUENT ELEMENT IS ABSENT BETWEEN CONNECTION LINE AND BUSES, REGION BETWEEN LEFT BUS AND RIGHT BUS IS REPLACED WITH CIRCUIT INCLUDING "a" CONTACT, COIL, AND CONNECTION LINE |
| ↖ | | (1)→(2)ab | NEGLECT |
| ↗ | | (1)→(2)bc | NEGLECT |
| ↘ | | (1)→(2)cd | NEGLECT |
| ↙ | | (1)→(2)ad | NEGLECT |

* PLACE START POINT IN (1), PLACE END POINT IN (2), AND COLLATE DIRECTION

FIG.7

| TRACK AND DI-RECTION | OPERATION TARGET | DEFINITION OF TRACK AND DIRECTION | COMMAND |
|---|---|---|---|
| ← | SYMBOL-LOCATABLE BASE ELEMENT | (1)→(2)a | NEGLECT |
| ↑ | | (1)→(2)b | NEGLECT |
| → | | (1)→(2)c | REPLACE BASE ELEMENT WITH CONNECTION LINE IN HORIZONTAL DIRECTION HOWEVER, WHEN OTHER PROGRAM CONSTITUENT ELEMENT IS ABSENT BETWEEN CONNECTION LINE AND BUSES, REPLACE REGION BETWEEN LEFT BUS AND RIGHT BUS WITH CONNECTION LINE |
| ↓ | | (1)→(2)d | NEGLECT |
| ⋮ | ⋮ | ⋮ | ⋮ |
| ← | ─┤├─ | (1)→(2)a | NEGLECT |
| ↑ | | (1)→(2)b | REPLACE CONSTITUENT ELEMENT WITH ─┤↑├─ |
| ↓ | | (1)→(2)d | REPLACE CONSTITUENT ELEMENT WITH ─┤↓├─ |
| ↙ | | (1)→(2)ad | REPLACE CONSTITUENT ELEMENT WITH ─┤/├─ |
| ⊠ | | (2)ab→(1)→(2)cd→(2)d →(2)ad→(1)→(2)bc | CUT OFF CONSTITUENT ELEMENT |
| ∨ | | (2)bc→(2)c→(2)d→(2)a →(2)ab | DELETE CONSTITUENT ELEMENT |
| ⋮ | ⋮ | ⋮ | ⋮ |
| ↙ | ─┤/├─ | (1)→(2)ad | REPLACE CONSTITUENT ELEMENT WITH ─┤ ├─ |
| ⋮ | ⋮ | ⋮ | ⋮ |
| ↓ | CONNEC-TION LINE | (1)→(2)d | REPLACE CONSTITUENT ELEMENT WITH ─┤ ├─ |
| ↑ | | (1)→(2)b | REPLACE CONSTITUENT ELEMENT WITH ─┤/├─ |
| ↩ | | (2)b→(2)c→(2)d | REPLACE CONSTITUENT ELEMENT WITH ─○─ |
| ↴ | | (2)a→(1)→(2)c→(2)cd | REPLACE CONSTITUENT ELEMENT WITH INSTRUCTION FRAME |
| ↓↓ | | (2)a→(2)ad, (1)→(2)d | REPLACE CONSTITUENT ELEMENT WITH ─┤ ├─ |
| ↱ | | (2)a→(1)→(2)c→(2)bc | REPLACE CONSTITUENT ELEMENT WITH ─┤ ├─ |
| ↰ | | (2)c→(1)→(2)a→(2)ab | REPLACE CONSTITUENT ELEMENT WITH └○─ |
| ↳ | | (2)ab→(2)a→(1)→(2)c →(2)bc | REPLACE CONSTITUENT ELEMENT WITH ┘├─ |
| ⋮ | ⋮ | ⋮ | ⋮ |
| ↓ | INSTRUC-TION FRAME | (1)→(2)d | REPLACE CONSTITUENT ELEMENT WITH ↓□ |
| ⋮ | ⋮ | ⋮ | ⋮ |

FIG.9
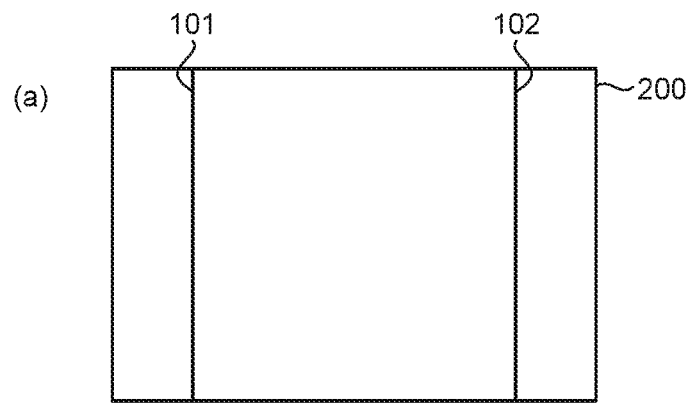
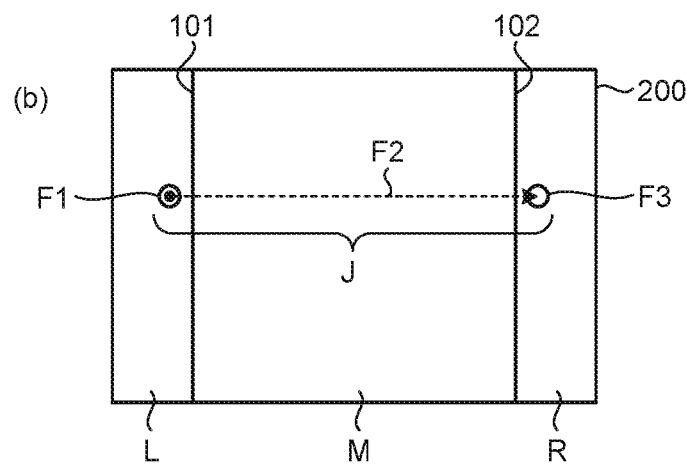
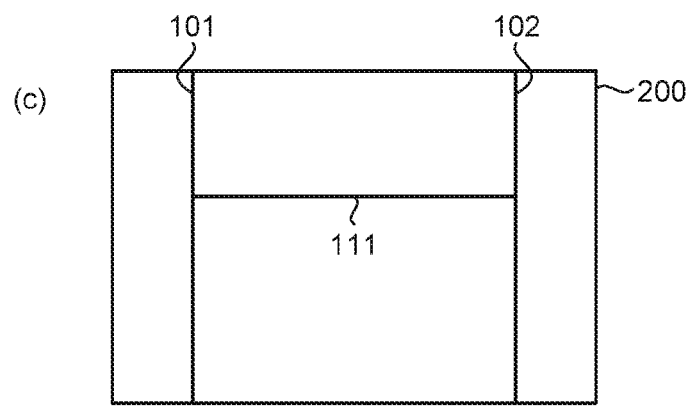

FIG.31 (a)

| | x → | | | | | | | | |
|---|---|---|---|---|---|---|---|---|---|
| FMx1 y1 | FMx2 y1 | FMx3 y1 | FMx4 y1 | FMx5 y1 | FMx6 y1 | FMx7 y1 | FMx8 y1 | | |
| FMx1 y2 | FMx2 y2 | FMx3 y2 | FMx4 y2 | FMx5 y2 | FMx6 y2 | FMx7 y2 | FMx8 y2 | | |
| F CMx1y1 2 | F CMx2y1 4 | F CMx3y1 6 | F CMx4y1 8 | | | | | | |
| FMx1 y4 | FMx2 y4 | FMx3 y4 | FMx4 y4 | FMx5 y4 | FMx6 y4 | FMx7 y4 | FMx8 y4 | | |
| FMx1 y5 | FMx2 y5 | FMx3 y5 | FMx4 y5 | FMx5 y5 | FMx6 y5 | FMx7 y5 | FMx8 y5 | | |
| FMx1 y6 | FMx2 y6 | FMx3 y6 | FMx4 y6 | FMx5 y6 | FMx6 y6 | FMx7 y6 | FMx8 y6 | | |
| FMx1 y7 | FMx2 y7 | FMx3 y7 | FMx4 y7 | FMx5 y7 | FMx6 y7 | FMx7 y7 | FMx8 y7 | | |
| CMx1y2 | | CMx2y2 | | CMx3y2 | | CMx4y2 | | | |
| FMx1 y8 | FMx2 y8 | FMx3 y8 | FMx4 y8 | FMx5 y8 | FMx6 y8 | FMx7 y8 | FMx8 y8 | | |
| FMx1 y9 | FMx2 y9 | FMx3 y9 | FMx4 y9 | FMx5 y9 | FMx6 y9 | FMx7 y9 | FMx8 y9 | | |
| FMx1 y10 | FMx2 y10 | FMx3 y10 | FMx4 y10 | FMx5 y10 | FMx6 y10 | FMx7 y10 | FMx8 y10 | | |

(b)

| COARSE REGION | DETAILED REGION | COORDINATE RANGE |
|---|---|---|
| CMx1y1 | FMx1y1 | (x1,y1):(x10,y10) |
| | FMx2y1 | (x11,y1):(x20,y10) |
| | FMx1y2 | (x1,y11):(x10,y20) |
| | FMx2y2 | (x11,y11):(x20,y20) |
| | FMx1y3 | (x1,y21):(x10,y30) |
| | FMx2y3 | (x11,y21):(x20,y30) |
| | FMx1y4 | (x1,y31):(x10,y40) |
| | FMx2y4 | (x11,y31):(x20,y40) |
| | FMx1y5 | (x11,y41):(x10,y50) |
| | FMx2y5 | (x11,y41):(x20,y50) |
| CMx2y1 | FMx3y1 | (x21,y1):(x30,y10) |
| | FMx4y1 | (x31,y1):(x40,y10) |
| | ⋮ | ⋮ |
| | ⋮ | ⋮ |
| | ⋮ | ⋮ |
| | ⋮ | ⋮ |

| (2)ab | (2)b | (2)bc |
|---|---|---|
| (2)a | (1) | (2)c |
| (2)ad | (2)d | (2)cd |

(b)

| (62)ab | (62)b | (62)bc | (32)ab | (32)b | (32)bc | (72)ab | (72)b | (72)bc |
|---|---|---|---|---|---|---|---|---|
| (62)a | (61) | (62)c | (32)a | (31) | (32)c | (72)a | (71) | (72)c |
| (62)ad | (62)d | (62)cd | (32)ad | (32)d | (32)cd | (72)ad | (72)d | (72)cd |
| (22)ab | (22)b | (22)bc | (12)ab | (12)b | (12)bc | (42)ab | (42)b | (42)bc |
| (22)a | (21) | (22)c | (12)a | (11) | (12)c | (42)a | (41) | (42)c |
| (22)ad | (22)d | (22)cd | (12)ad | (12)d | (12)cd | (42)ad | (42)d | (42)cd |
| (92)ab | (92)b | (92)bc | (52)ab | (52)b | (52)bc | (82)ab | (82)b | (82)bc |
| (92)a | (91) | (92)c | (52)a | (51) | (52)c | (82)a | (81) | (82)c |
| (92)ad | (92)d | (92)cd | (52)ad | (52)d | (52)cd | (82)ad | (82)d | (82)cd |

(c)

| OPERATION TARGET | TRACK AND DIRECTION | | DEFINITION OF TRACK AND DIRECTION | COMMAND |
|---|---|---|---|---|
| SYMBOL-LOCATABLE BASE ELEMENT | STANDARD BASE ELEMENT | FOR COARSE REGION ← | (1)→(2)a | REPLACE BASE ELEMENT WITH LATERAL RULED LINE |
| | | FOR COARSE REGION → | (1)→(2)c | REPLACE BASE ELEMENT WITH LATERAL RULED LINE |
| | | ⋮ | ⋮ | ⋮ |
| | | FOR DETAILED REGION ✕ | (11)→(12)cd→(82)ab →(81)→(82)cd, (42)c→(42)d→(82)ab →(52)c→(52)d | STEP 1: RECOGNIZE TRACKS AS CHARACTERS STEP 2: CASE 1: WHEN TRACKS CANNOT BE RECOGNIZED AS CHARACTERS, PROCEED TO PROCESS FOR COARSE REGION CASE 2: WHEN PROGRAM CONSTITUENT ELEMENT IS ADJACENT TO LOWER SIDE, REGISTER CHARACTERS THEREOF IN DEVICE NAME CASE 3: WHEN NOT CORRESPONDING TO CASE 2, ADD, BY ONE ROW, LADDER PROGRAM HAVING PROGRAM CONSTITUENT ELEMENT CORRESPONDING TO FIRST CHARACTER WHEN CORRESPONDING PROGRAM CONSTITUENT ELEMENT IS ABSENT IN FIRST CHARACTER, NEGLECT |
| | | FOR DETAILED REGION ↓ | (11)→(12)cd→(82)ab, (42)c→(42)d→(82)ab →(82)a→(82)ad | |
| | | ⋮ | ⋮ | ⋮ |
| | DEVICE NAME INPUT BASE ELEMENT | FOR COARSE REGION → | (1)→(2)bc | STEP 1: OPEN CHARACTER INPUT PANEL AND RECEIVE CHARACTERS INPUT IN CHARACTER INPUT PANEL STEP 2: CASE 1: WHEN TRACKS CANNOT BE RECOGNIZED AS CHARACTERS, PROCEED TO PROCESS FOR COARSE REGION CASE 2: WHEN PROGRAM CONSTITUENT ELEMENT IS ADJACENT TO LOWER SIDE, REGISTER CHARACTERS THEREOF IN DEVICE NAME CASE 3: WHEN NOT CORRESPONDING TO CASE 2, ADD, BY ONE ROW, LADDER PROGRAM HAVING PROGRAM CONSTITUENT ELEMENT CORRESPONDING TO FIRST CHARACTER WHEN CORRESPONDING PROGRAM CONSTITUENT ELEMENT IS ABSENT IN FIRST CHARACTER, NEGLECT |
| | | ⋮ | ⋮ | ⋮ |
| | | FOR DETAILED REGION ALL OTHERS | - | STEP 1: RECOGNIZE TRACKS AS CHARACTERS STEP 2: CASE 1: WHEN TRACKS CANNOT BE RECOGNIZED AS CHARACTERS, PROCEED TO PROCESS FOR COARSE REGION CASE 2: WHEN PROGRAM CONSTITUENT ELEMENT IS ADJACENT TO LOWER SIDE, REGISTER CHARACTERS THEREOF IN DEVICE NAME CASE 3: WHEN NOT CORRESPONDING TO CASE 2, ADD, BY ONE ROW, LADDER PROGRAM HAVING PROGRAM CONSTITUENT ELEMENT CORRESPONDING TO FIRST CHARACTER WHEN CORRESPONDING PROGRAM CONSTITUENT ELEMENT IS ABSENT IN FIRST CHARACTER, NEGLECT |

FIG.36
(a) 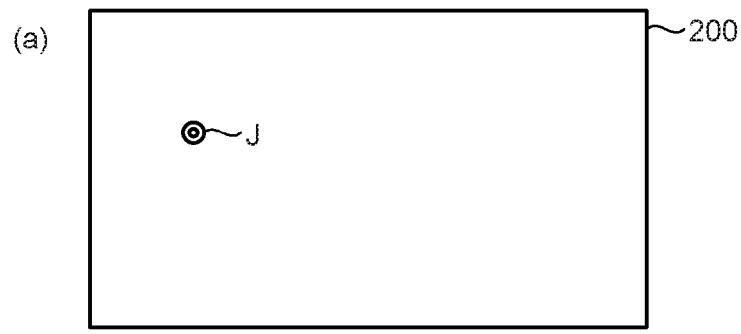
(b) 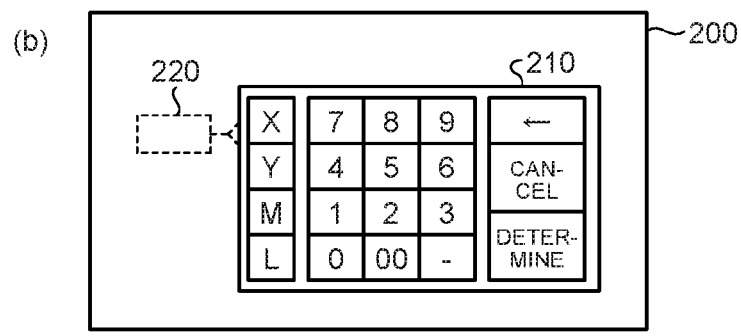
(c) 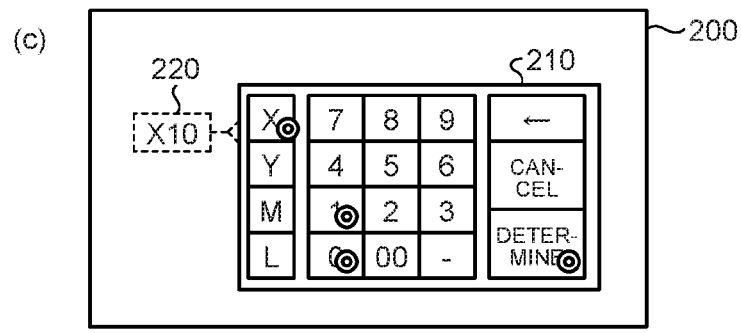
(d) 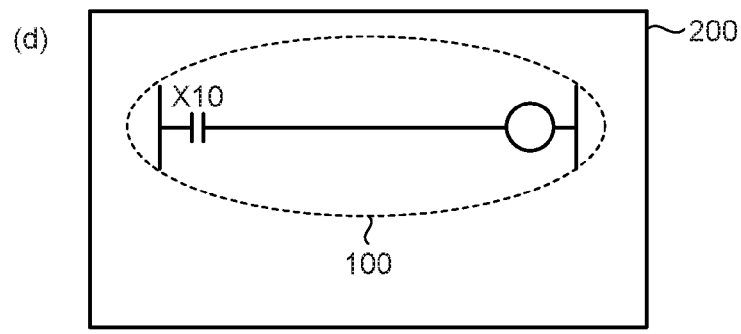

| COARSE REGION | DETAILED REGION | COORDINATE RANGE |
|---|---|---|
| CMx1y1 | FMx1y1 | (x1,y1):(x10,y10) |
| | FMx2y1 | (x11,y1):(x20,y10) |
| | FMx1y2 | (x1,y11):(x10,y20) |
| | FMx2y2 | (x11,y11):(x20,y20) |
| | FMx1y3 | (x1,y21):(x10,y30) |
| | FMx2y3 | (x11,y21):(x20,y30) |
| | FMx1y4 | (x1,y31):(x10,y40) |
| | FMx2y4 | (x11,y31):(x20,y40) |
| | FMx1y5 | (x11,y41):(x10,y50) |
| | FMx2y5 | (x11,y41):(x20,y50) |
| CMx2y1 | FMx3y1 | (x21,y1):(x30,y10) |
| | FMx4y1 | (x31,y1):(x40,y10) |
| | ⋮ | ⋮ |
| | ⋮ | ⋮ |
| | ⋮ | ⋮ |
| | ⋮ | ⋮ |

FIG.46
(a) 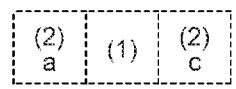
(b) 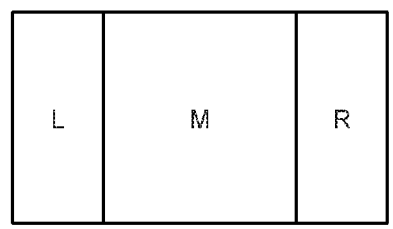
(c)
| TRACK AND DI-RECTION | OPERATION TARGET | DEFINITION OF TRACK AND DIRECTION | COMMAND |
|---|---|---|---|
| ← | SYMBOL-LOCATABLE BASE ELEMENT | (1)→(2)a | PLACE CONNECTION LINE BETWEEN LEFT BUS AND RIGHT BUS |
| → | | (1)→(2)c | PLACE CONNECTION LINE BETWEEN LEFT BUS AND RIGHT BUS |
| ⋮ | ⋮ | ⋮ | ⋮ |

FIG.49
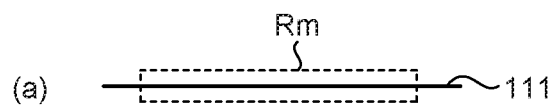
(a)
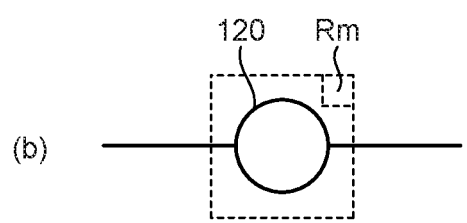
(b)
FIG.50
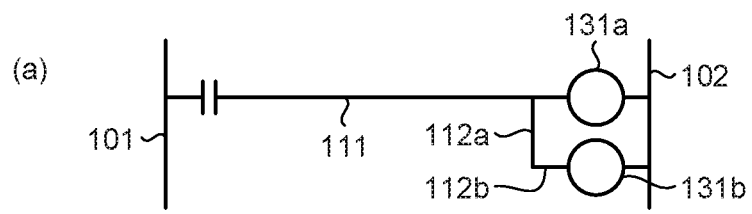
(a)
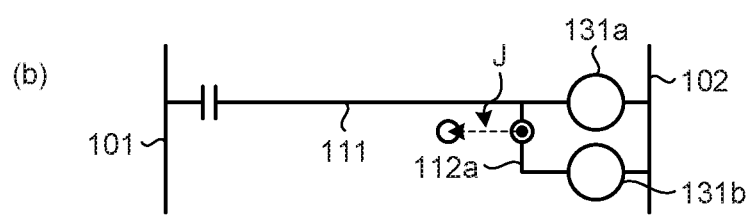
(b)
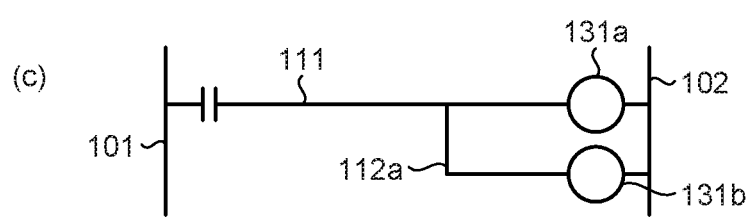
(c)

FIG.53
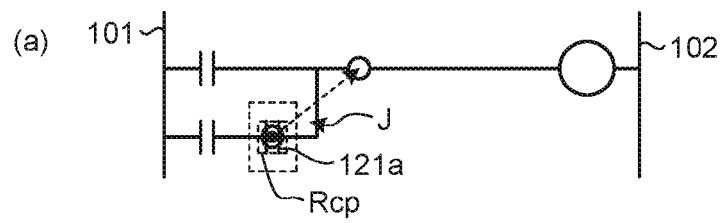
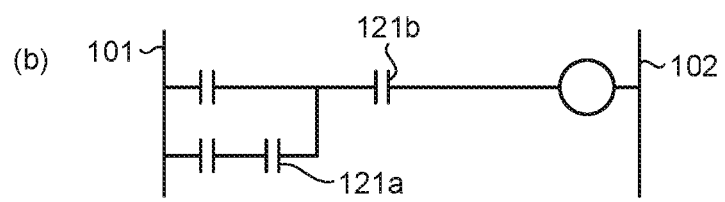
FIG.54
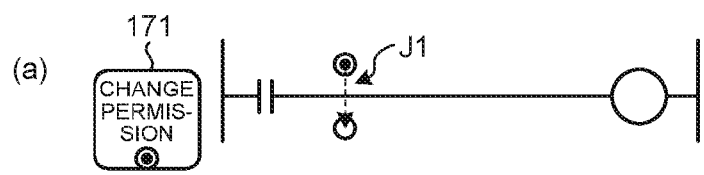
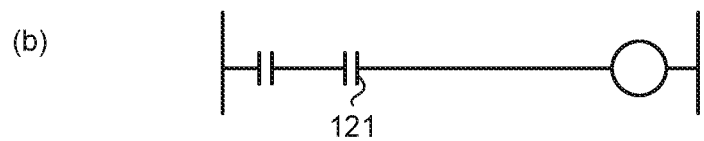
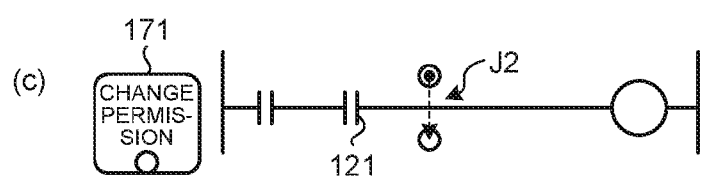
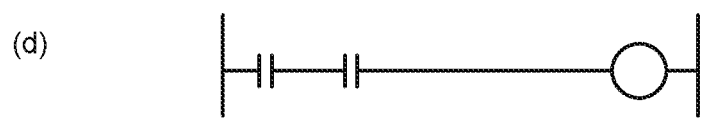

FIG.60
(a) 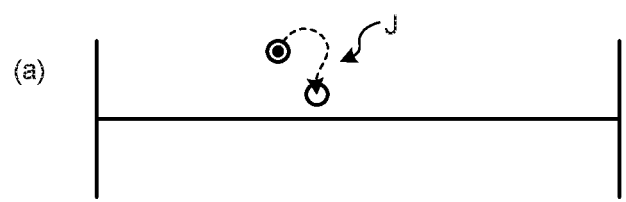
(b) 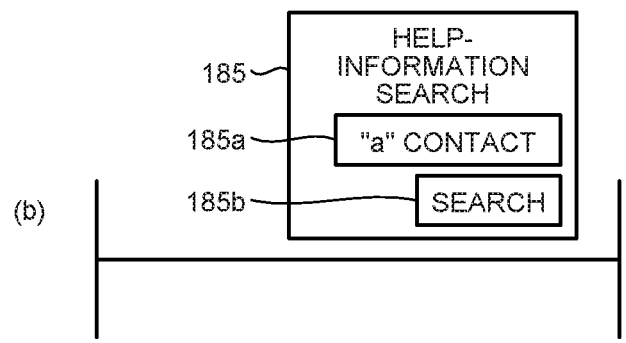
(c) 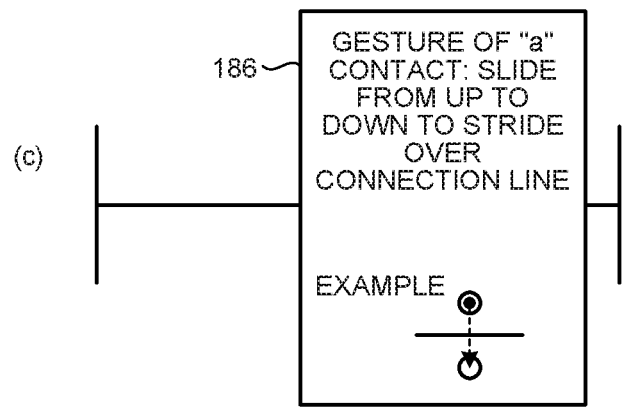

FIG.62
(a) 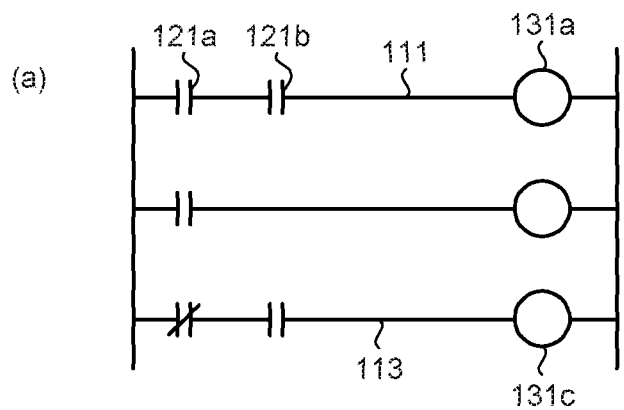
(b) 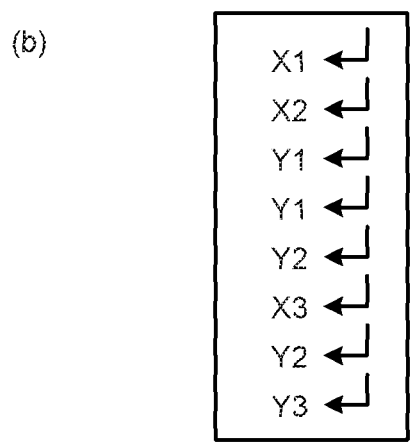
(c) 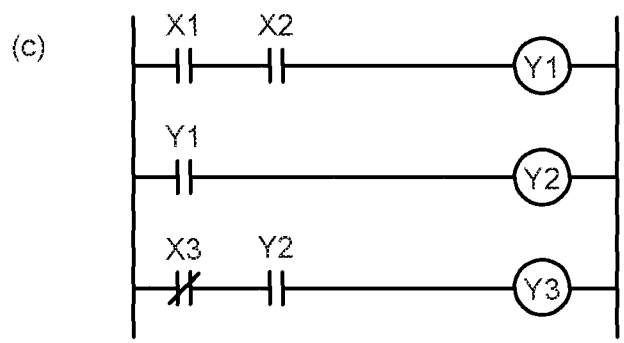

PROGRAM FOR PROGRAM EDITING

CROSS REFERENCE TO RELATED APPLICATIONS

This application is a National Stage of International Application No. PCT/JP2013/072297 filed Aug. 21, 2013, the contents of all of which are incorporated herein by reference in their entirety.

FIELD

The present invention relates to a program for program editing of a control apparatus.

BACKGROUND

A program executed by a control apparatus such as a programmable controller included in an FA (Factory Automation) system is described, in general, using symbols in a circuit diagram format (hereafter referred to as ladder program) by a relay symbolic language based on an idea of a relay control circuit. Besides, the program is sometimes described using symbols in formats such as an FB (Function Block), an FBD (Function Block Diagram), and an SFC (Sequential Function Chart). Creation of the program described using such symbols is graphically performed in an information processing apparatus using a program for program editing called an engineering tool.

In an engineering tool of a general control apparatus, a program described using symbols is edited using a mouse and a keyboard. For example, when a program constituent element such as a circuit symbol or a connection line is added to a ladder program, on an editing screen for editing a program, editing of the program is enabled by repeating, using the mouse or the keyboard, after designating a position where the program constituent element is to be added, selecting the program constituent element desired to be added. When operation other than the addition of the program constituent element is performed, editing of the program is enabled also by repeating processing for designating a target of operation and selecting processing desired to be executed (hereinafter referred to as command).

On the other hand, in recent years, an input technology using an information processing apparatus which is equipped with a touch panel input function (hereinafter referred to as a tablet terminal) is actively performed. When an engineering tool is used in the tablet terminal, a method of enabling editing of a program by treating operation for touching a finger on the touch panel equivalently to operation for designating a target of operation with a mouse cursor and pressing a mouse button is a general method.

CITATION LIST

Patent Literature

Patent Literature 1: Japanese Patent Application Laid-Open No. 2009-259080

SUMMARY

Technical Problem

When the engineering tool is used in the tablet terminal, if the conventional general method explained above is used, operation for designating a place of a program constituent element and designating a type of the program constituent element is repeated using a finger. Therefore, there is a problem in that a moving distance of a hand is large compared with the operation by the mouse and thus the operation is onerous. Because the finger is larger than a mouse pointer, a list of choices for designating a type of the program constituent element or a command needs to be displayed large on a program editing screen, so it causes reduction of information that can be displayed on the screen compared with the operation by the mouse.

The present invention has been devised in view of the above and it is an object of the present invention to obtain a program for program editing that can easily edit, using a tablet terminal, a program described using symbols.

Solution to Problem

To attain the object, a program for program editing according to the present invention is a program for program editing for editing a program described using a symbol on a program editing screen, the program for program editing causing an information processing apparatus to function as: input-gesture-characteristic-information acquiring unit for acquiring input gesture characteristic information including coordinate information, a track of the coordinate, and a direction of the track input on the program editing screen; and processing executing unit for specifying an operation target and specifying a command applied to the operation target as well on the basis of the input gesture characteristic information, executing the command, and displaying the result of the execution of the command on the program editing screen.

Advantageous Effects of Invention

According to the present invention, input gesture characteristic information obtained from input operation by a user of moving a finger while keeping the finger placed on a program editing screen for a program described using symbols is acquired, an operation target and a command applied to the operation target are specified on the basis of the input gesture characteristic information, and the command is executed and results of the execution of the command are displayed on the program editing screen. Therefore, there is an effect that it is made possible to simultaneously perform, in a tablet terminal, using the input operation of moving the finger while keeping the finger placed on the program editing screen, designation of the target of the operation (hereinafter referred to as operation target) and designation of the command performed on the operation target and it is made possible to easily perform editing of the program described using symbols.

BRIEF DESCRIPTION OF DRAWINGS

FIG. 2 is a diagram showing an example of a gesture definition.

FIG. 3 is a diagram showing an example of a gesture definition.

FIG. 7 is a diagram showing an example of a gesture definition according to a second embodiment.

FIG. 9 is a diagram showing an example of a procedure of program editing processing according to the second embodiment.

FIG. 31 is a diagram schematically showing a concept of region management information according to a third embodiment.

FIG. 33 is a diagram showing an example of a gesture definition according to the third embodiment.

FIG. 36 is a diagram showing an example of a procedure of program editing processing according to the third embodiment.

FIG. 46 is a diagram showing an example of a gesture definition according to a fourth embodiment.

FIG. 49 is a diagram showing examples of moving conditions of program constituent elements according to a seventh embodiment.

FIG. 50 is a diagram showing an example of a moving method for a program constituent element according to the seventh embodiment.

FIG. 53 is a diagram showing an example of a procedure of program editing processing according to the seventh embodiment.

FIG. 54 is a diagram showing an example of a procedure of program editing processing according to an eighth embodiment.

FIG. 60 is a diagram showing an example of a procedure of help information showing processing according to a tenth embodiment.

FIG. 62 is a diagram showing an example of a procedure of device name input processing according to the eleventh embodiment.

DESCRIPTION OF EMBODIMENTS

Preferred embodiments of a program for program editing according to the present invention are explained in detail below with reference to the accompanying drawings. Note that, in the following explanation, editing of a ladder program is explained as an example. However, the present invention is not limited by the embodiments.

First Embodiment

Figure 1:
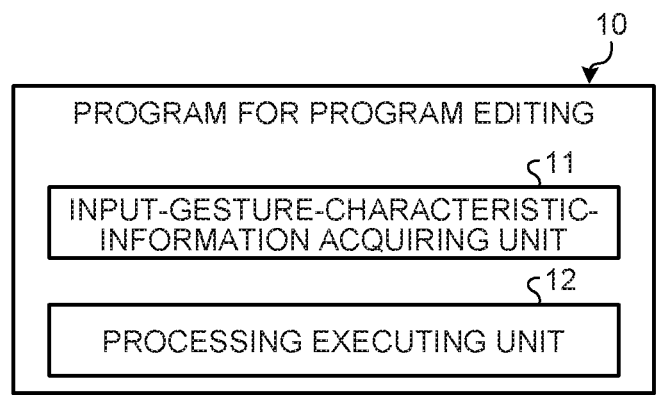
FIG. 1 is a block diagram showing an example of the construction of a program for program editing according to a first embodiment.

FIG. 1 is a block diagram showing an example of the construction of a program for program editing according to a first embodiment. A program for program editing 10 includes input-gesture-characteristic-information acquiring unit 11 and processing executing unit 12.

The input-gesture-characteristic-information acquiring unit 11 acquires input gesture characteristic information including coordinate information, a track of the coordinates, and a direction of the track input on a program editing screen via an input indicator such as a finger. As the coordinate information, coordinates obtained on the basis of a coordinate system defined on the program editing screen can be used.

The processing executing unit 12 collates the coordinate information stored in the input gesture characteristic information with coordinates of constituent elements displayed in the program editing screen and specifies an operation target, collates the track of the coordinates and the direction of the track stored in the input gesture characteristic information with information concerning a shape and a direction of a track defined in a gesture definition concerning the operation target and specifies a command applied to the operation target as well, executes the command, and displays the results of the execution of the command on the program editing screen.

The constituent elements on the program editing screen include at least program constituent elements such as a symbol representing an "a" contact, a symbol representing a "b" contact, a symbol representing a coil, and a connection line connecting the symbols, and base elements configuring regions other than the program constituent elements. As the base elements, there are left side base elements placed on a left side of a left bus, right side base elements placed on a right side of a right bus, and symbol-locatable base elements placed between the left bus and the right bus.

The gesture definition associates a type of the constituent element, information concerning the shape and the direction of the track, and the command to be executed together. FIG. 2 and FIG. 3 are diagrams showing examples of gesture definitions. A method of laying tile-like constituent elements on the program editing screen and grasping a route of a track according to types of tiles is illustrated. FIG. 2(*a*) is a diagram showing the positional relation of tile-like squares in defining a track using two squares in the horizontal direction or the vertical direction centering on a certain tile-like square. FIG. 2(*b*) is a diagram showing an example of a gesture definition in the case of FIG. 2(*a*). FIG. 3(*a*) is a diagram showing the positional relation of tile-like squares in defining a linear track using two squares in the horizontal direction, the vertical direction, or the oblique direction centering on a certain tile-like square. FIG. 3(*b*) is a diagram showing an example of a gesture definition in the case of FIG. 3(*a*).

In this example, the gesture definition associates a shape of a track of an input operation and a direction of the track, a constituent element, and a command applied to the constituent element together. A track of a gesture is a track of coordinates obtained on the basis of a coordinate system defined on the program editing screen. A program constituent element drawn in a gesture drawing region is defined with respect to drawing of the track. The definition of the shape of the track can be represented by minimum points as far as the shapes are distinguished. That is, for example, when only a straight line is used as the shape of the track, the track can be defined using two squares.

When a shape other than the straight line is added, the track can be defined using three or more squares. When the track is defined by two squares, the track is distinguished according to a direction from a start point to an end point. When the track is defined using three or more squares, the shape of the track is distinguished according to the coordinates of squares through which the track has passed from the start point to the end point. The direction of the track is distinguished according to the order of the squares through which the track has passed from the start point to the end point.

The squares of the gesture definition can be defined using physical dimensions, or only a logical positional relation not having physical specific dimensions can be defined. The gesture definitions shown in FIG. 2 and FIG. 3 represent definitions of logical positional relations.

Note that, although, in the above explanation and explanations of following embodiments, rectangular squares are used as shape of the tile-like constituent elements, other shapes such as a regular hexagonal shape can be used.

Figure 4:
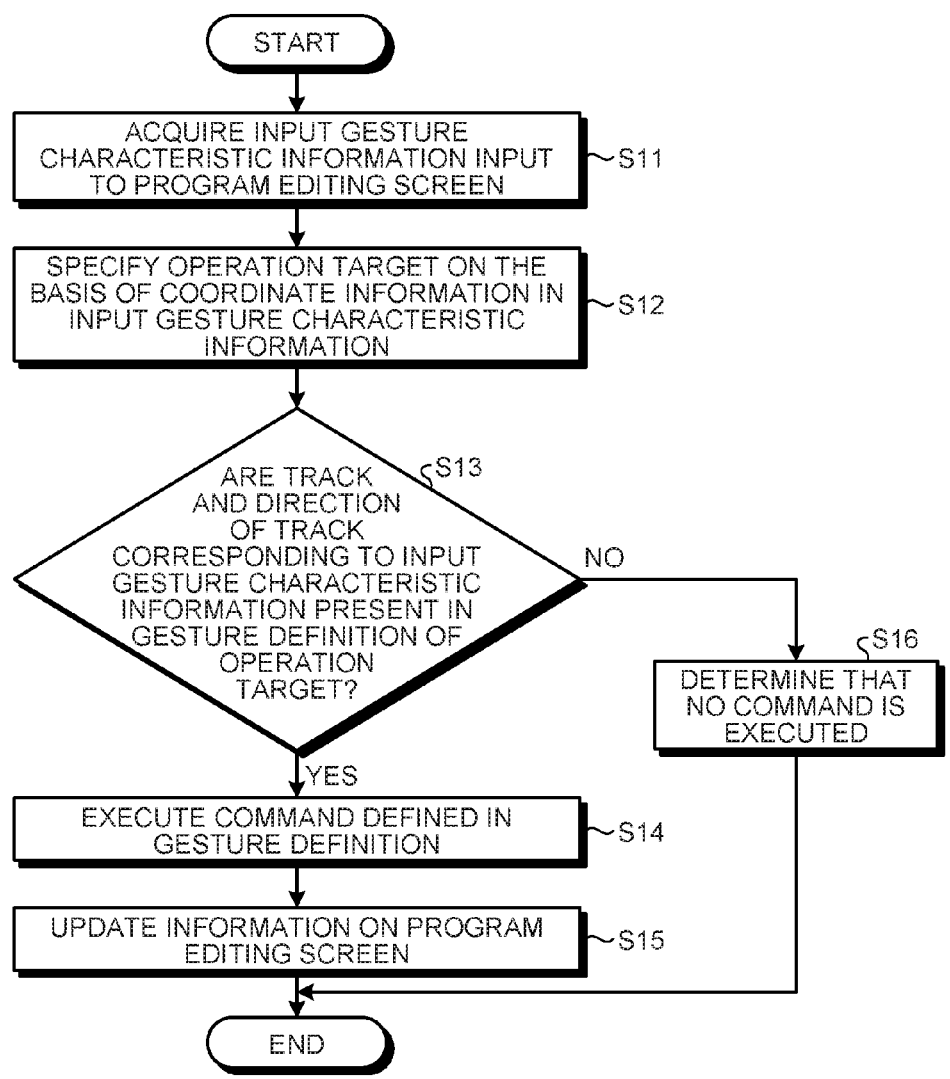
FIG. 4 is a flowchart for explaining an example of a processing procedure of a program editing method according to the first embodiment.

A program editing method is explained below. FIG. 4 is a flowchart for explaining an example of a processing procedure of a program editing method according to the first embodiment. First, the input-gesture-characteristic-information acquiring unit 11 acquires input gesture characteristic information input to the program editing screen by a user (step S11). The input gesture characteristic information includes coordinate information, which is a contact position of an input indicator, a track of the coordinates, and a direction of the track.

Subsequently, the processing executing unit 12 specifies an operation target on the basis of the coordinate information stored in the input gesture characteristic information (step S12) and judges whether a shape of the track and the direction of the track corresponding to the input gesture characteristic information are present in a gesture definition of the operation target (step S13). When the shape of the track and the direction of the track corresponding to the input gesture characteristic information are present in the gesture definition (Yes at step S13), the processing executing unit 12 executes a command defined in the gesture definition (step S14) and updates information on the program editing screen (step S15). Consequently, the program editing processing ends.

When the track corresponding to the input gesture characteristic information is not present in the gesture definition at step S13 (No at step S13), the processing executing unit 12 determines that execution of the command is unnecessary (step S16) and the program editing processing ends.

Note that the processing executing unit 12 can start the processing before the input operation using the input indicator is completed. In that case, the processing executing unit 12 can be so configured as to put off the execution of the command until the input operation is completed and display, on the program editing screen, a command scheduled to be executed when the input operation is completed. The processing executing unit 12 can be configured to display, on the program editing screen, information that can specify an operation target to which the command is applied when the input operation is completed.

Figure 5:
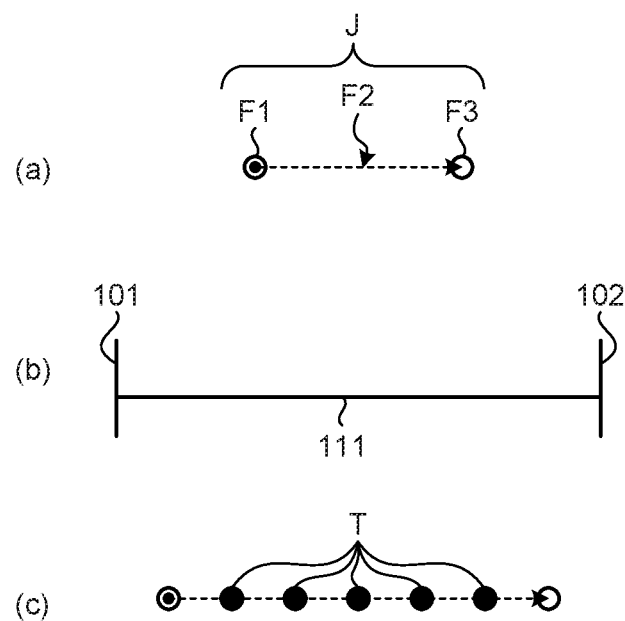
FIG. 5 is a diagram showing an example of a procedure of program editing processing according to the first embodiment.
Figure 6:
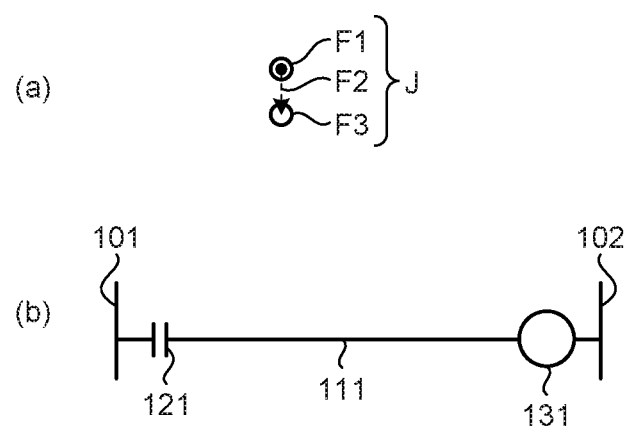
FIG. 6 is a diagram showing an example of a procedure of program editing processing according to the first embodiment.

A specific example of program editing processing is explained below. FIG. 5 and FIG. 6 are diagrams showing examples of a procedure of program editing processing according to the first embodiment. FIG. 5 shows an input operation for placing a left bus 101, a right bus 102, and a connection line 111 connecting the buses. First, on the program editing screen on which no program constituent element is placed, as shown in FIG. 5(a), the user touches a tip of the input indicator on the program editing screen (F1), moves the input indicator in the right direction of the screen while keeping the tip touched on the screen (F2), and releases the tip from the screen at a certain point (F3). In the figure, an input operation J, that is a track of the tip in contact with the screen is indicated by an arrow of a dotted line.

The input-gesture-characteristic-information acquiring unit 11 acquires input gesture characteristic information from the input operation J. The processing executing unit 12 specifies an operation target according to the input gesture characteristic information and specifies a command according to the input gesture characteristic information and the gesture definition.

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, FIG. 5(a) represents a state before the buses are displayed. All regions of the program editing screen are configured by only the symbol-locatable base elements. Therefore, the operation target is specified as the symbol-locatable base elements.

Subsequently, the processing executing unit 12 collates a shape of the track and a direction of the track defined in a gesture definition concerning the specified operation target, that is, in this example, the symbol-locatable base elements and the shape of the track and the direction of the track stored in the input gesture characteristic information and specifies a command applied to the symbol-locatable base elements. That is, in this example, because the track stored in the input gesture characteristic information is a straight line in the horizontal direction and the direction stored in the input gesture characteristic information is in the right direction, a command for adding a connection line in the horizontal direction is executed. At this point, the buses are not displayed yet. Therefore, the processing executing unit 12 places the left bus, the right bus, and the connection line connecting the left bus and the right bus on the program editing screen and ends the program editing processing.

As a result, as shown in FIG. 5(b), the left bus 101, the right bus 102, and the connection line 111 connecting the buses are placed near places where the input operation J is performed on the program editing screen.

FIG. 6 shows a gesture operation for placing the left bus 101, the right bus 102, and the connection line 111 having an "a" contact symbol 121 and a coil symbol 131 and connecting the two buses 101 and 102. As shown in FIG. 6(a), the user touches the tip of the input indicator on the program editing screen (F1), moves the input indicator in the downward direction of the program editing screen while keeping the tip placed on the program editing screen (F2), and releases the tip from the program editing screen at a certain point (F3). The input-gesture-characteristic-information acquiring unit 11 acquires input gesture characteristic information from the input operation J. The processing executing unit 12 specifies an operation target according to the input gesture characteristic information and specifies a command according to the input gesture characteristic information and the gesture definition. As a result, as shown in FIG. 6(b), the left bus 101, the right bus 102, and the connection line 111 connecting the buses are placed near a gesture drawing region. The "a" contact symbol 121 is placed in a region on the left side on the connection line 111 and the coil symbol 131 is placed in a region on the right side on the connection line 111. This is a basic program often used in the ladder program. The gesture definition in which a command for generating the program often used in this way is associated with input operation consequently makes it possible to reduce workload concerning a program editing.

These are examples. Combinations of a gesture and a program constituent element can be variously defined.

For example, the input operation J in FIG. 5(a) can be combined with the command that brings the result as shown in FIG. 6(b) instead of the command that brings the result as shown in FIG. 5(b).

Note that, the above explanation is based on the case when the coordinate information stored in the input gesture characteristic information is input while the input indicator is in contact with the program editing screen. When the program editing screen of the tablet terminal is configured to detect the input indicator while the input indicator is proximate to the program editing screen in addition to while the input indicator is in contact with the program editing screen, proximate state information can be also stored in the input gesture characteristic information. The proximate state information indicates following three statuses about positional relation of the input indicator and the program editing screen. These statuses are in contact, in close proximity, and not in close. In this case, the processing executing unit 12 can be configured to further include a function of determining different commands on the basis of the proximate state information.

In the case of No at step S13 in FIG. 4, step S12 and step S13 can be performed again concerning another operation target in the vicinity.

Further, in order to reduce time from the input end until the command is executed, the processing performed by the input-gesture-characteristic-information acquiring unit 11 and the processing performed by the processing executing unit 12 can be performed in parallel. That is, the processing executing unit 12 can be configured to start the specifying of the operation target and the command while the input-gesture-characteristic-information acquiring unit 11 is acquiring the input gesture characteristic information, that is, before the input of the track ends.

During the gesture detection, as shown in FIG. 5(c), a track of the contact position of the input indicator can be shown in the program editing screen. As a method to show the track, for example, marks T indicating detected positions at predetermined periods can be displayed. Consequently, there is an effect that it is easy to check how an input is acquired.

In the first embodiment, the user performs an input operation to place program constituent elements corresponding to the input operation with the input indicator on the program editing screen on which nothing is placed.

Consequently, it is made possible to simultaneously perform designation of an operation target and designation of a command performed on the operation target. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

By using a gesture definition in which tracks which are similar to symbols that users desire to input to a program are defined, there is also an effect that memorization of tracks for input operation becomes easier for the user and it is made possible to learn an operation method of the program editing in a shorter period.

Second Embodiment

In the explanation in the first embodiment, the input operation of the ladder program is performed with the input indicator on the program editing screen on which no symbol is placed, to edit the ladder program. In the ladder program, in general, symbols are placed between a left bus and a right bus and programming is performed by connecting, with a connection line, the left bus, the symbols, and the right bus. Therefore, in the following explanation in the second embodiment, the ladder program is edited by input operation using the input indicator in a state in which the left bus and the right bus are already placed in the program editing screen.

In a program for program editing in the second embodiment, a gesture definition further includes information concerning constituent elements through which a track has passed. The processing executing unit 12 further includes a function of determining the constituent elements through which the track has passed and specifying a command.

FIG. 7 is a diagram showing an example of a gesture definition according to the second embodiment. FIG. 7 shows, as in FIG. 3(a), a gesture definition in defining a track using two squares in the horizontal direction, the vertical direction, or an oblique direction centering on a certain tile-like square. As shown in the figure, in the gesture definition, a track of input operation and constituent elements through which the track passes are associated with program constituent elements. Consequently, it is made possible to associate the same track with a plurality of program constituent elements.

Figure 8:
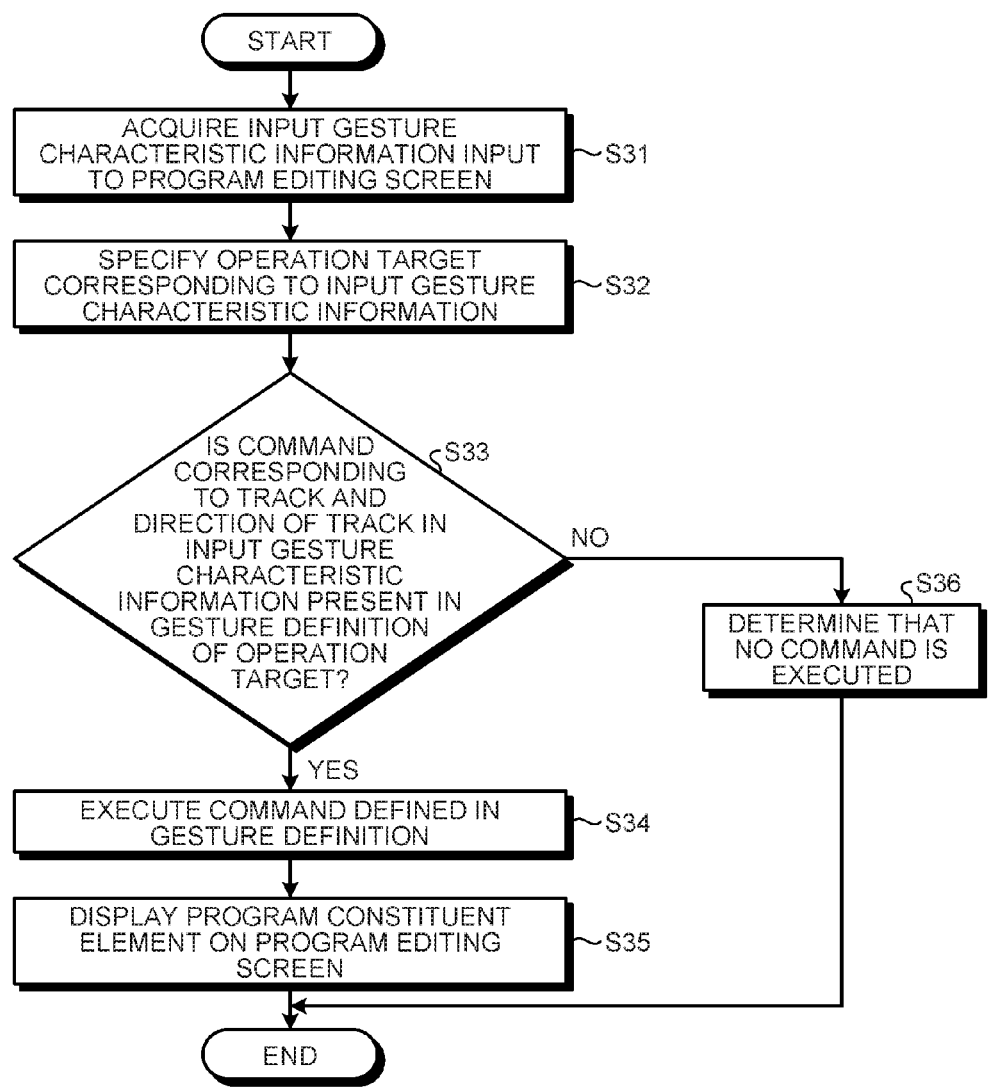
FIG. 8 is a flowchart for explaining an example of a processing procedure of a program editing method according to the second embodiment.

FIG. 8 is a flowchart for explaining an example of a procedure of a program editing method according to the second embodiment. First, the input-gesture-characteristic-information acquiring unit 11 acquires input gesture characteristic information input on the program editing screen (step S31). The input gesture characteristic information includes coordinate information, which are coordinates of contact position of the input indicators, a track of the coordinates, and a direction of the track.

Subsequently, the processing executing unit 12 specifies an operation target corresponding to the input gesture characteristic information (step S32). The operation target can be specified by, for example, collating the coordinate information stored in the input gesture characteristic information with coordinate information where the processing executing unit 12 displays the constituent elements on the program editing screen.

Note that an example is explained in which a constituent element present near the center of the track of the input operation is specified as the operation target. Other various specifying methods can be also used. For example, the processing executing unit 12 can be configured to specify a constituent element present at a start point of the track of the input operation as the operation target. The processing executing unit 12 can be also configured to specify a constituent element present at an end point of the track of the input operation as the operation target. The processing executing unit 12 can be also configured to specify a constituent element present in the centroid of the track of the input operation as the operation target.

When the operation target is a base element, the processing executing unit 12 judges whether the shape of the track and the direction of the track stored in the input gesture characteristic information are present in the gesture definition concerning the base element (step S33). When a command corresponding to the shape of the track and the direction of the track stored in the input gesture characteristic information is present in the gesture definition (Yes at step S33), the processing executing unit 12 executes the command (step S34) and displays program constituent elements on the program editing screen as the results of the execution (step S35). Consequently, the procedure of program editing processing ends.

That is, if a gesture traverses the left bus and the right bus, the processing executing unit 12 determines at step S32 that a base element is the operation target. The program constituent elements defined by the gesture definition are placed between the left bus and the right bus in the gesture drawing region. If a gesture strides over the connection line, at step S33, the processing executing unit 12 determines that the connection line, which is one of the program constituent elements, is the operation target. The connection line in the gesture drawing region is replaced by another program constituent element according to the command of the gesture definition.

Note that, the track of the input operation sometimes traverses, besides a circuit symbol such as the "a" contact symbol, a part of a connection line connected to the symbol. In this case, the circuit symbol and the connection line are included in options of the operation target. To process such situation stably, a setting as to preferentially determine the symbol excluding the connection line as the operation target can be defined. Thereafter, the processing executing unit 12 performs processing for displaying the program constituent elements on the program editing screen at step S35.

When a command corresponding to the shape of the track and the direction of the track stored in the input gesture characteristic information is not present in the gesture definition concerning the operation target at step S33 (No at step S33), the processing executing unit 12 determines that execution of any command is unnecessary (step S36) and the program editing processing ends. Note that, the processing executing unit 12 can be configured to, when a recognition error occurs, display an error message or not display the error message.

Figure 10:
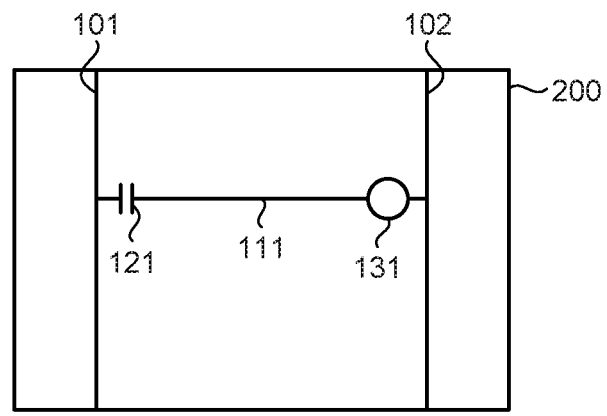
FIG. 10 is a diagram showing an example of a procedure of program editing processing according to the second embodiment.

Specific examples of the program editing processing performed (1) when the input operation is performed on the program editing screen on which no program constituent element is placed, and (2) when the input operation is performed on the program editing screen on which program constituent elements are already placed are explained below.
(1) A Case in which the Input Operation is Performed on the Program Editing Screen on which No Program Constituent Element is Placed:

FIG. 9 and FIG. 10 are diagrams showing an example of a procedure of program editing processing according to the second embodiment. On a program editing screen 200 on which only the left bus 101 and the right bus 102 are placed as shown in FIG. 9(*a*), the user inputs the input operation J with the input indicator starting from the left side of the left bus 101 and ending in a region on the right side of the right bus 102 while moving to the right direction (to trace the screen in the order of a region L, a region M and a region R).

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation J from a left side base element (L) (F1) and ends the input at a right side base element (R) (F3) through a symbol-locatable base element (M) (F2). Therefore, the operation target is specified as the symbol-locatable base element.

The processing executing unit 12 collates a shape of a track and a direction of the track defined in the gesture definition concerning the specified operation target, that is, in this example, the symbol-locatable base element with the shape of the track and the direction of the track of the input operation included in the input gesture characteristic information. Thereafter, the processing executing unit 12 specifies a command applied to the symbol-locatable base element. That is, in this example, the track included in the input gesture characteristic information is a straight line in the horizontal direction and the direction of the track is the right direction. Therefore, a command for adding a connection line in the horizontal direction is executed.

Consequently, as shown in FIG. 9(*c*), the connection line 111 connecting the left bus 101 and the right bus 102 is placed in a program editing screen 200.

According to the input of the input operation J shown in FIG. 9(*b*), as shown in FIG. 10, the connection line 111 connecting the left bus 101 and the right bus 102, the "a" contact symbol 121 on the left bus 101 side of the connection line 111, and the coil symbol 131 on the right bus 102 side of the connection line 111 can be placed.

Figure 11:
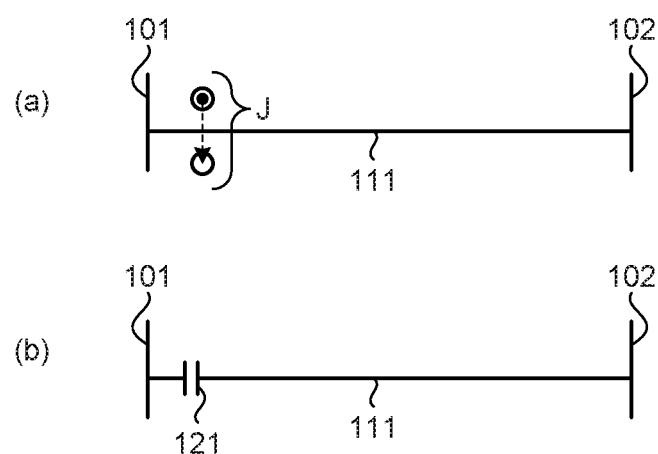
FIG. 11 is a diagram showing an example of a procedure of specific program editing processing according to the second embodiment.
Figure 12:
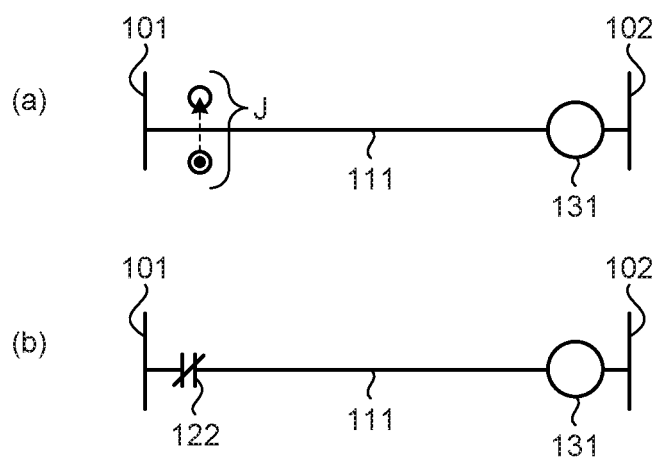
FIG. 12 is a diagram showing an example of a procedure of specific program editing processing according to the second embodiment.

The program as shown in FIG. 10 is a basic program often used in the ladder program. By associating the command for generating the program often used in this way with the input operation using the gesture definition, it is made possible to further reduce workload concerning a program editing compared with the case in which only the connection line 111 is placed.
(2) A Case in which the Input Operation is Performed on the Program Editing Screen on which Program Constituent Elements are Already Placed FIG. 11 to FIG. 29 are diagrams showing examples of specific procedures of program editing processing according to the second embodiment.
(2-1) An Example in which Constituent Elements are Placed Over the Connection Line FIG. 11 to FIG. 15 show examples in which a gesture is drawn to stride over the connection line. In FIG. 11, when the input operation J is performed from a region on an upper side toward a region on the lower side of the connection line 111 as shown in (a), the "a" contact symbol 121 is placed instead of the connection line in the position of the input operation J as shown in (b). In FIG. 12, when the input operation J is performed from the region on the lower side toward the region on the upper side of the connection line 111 as shown in (a), a "b" contact symbol 122 is placed instead of the connection line in the position of the input operation J. Even when shapes of tracks are the same in the input operation and operation targets are the same, if directions of the tracks are different, a different command is executed. As a result of the execution of the command, it is made possible to perform program editing operation for replacing constituent elements with different program constituent elements.

Figure 13:
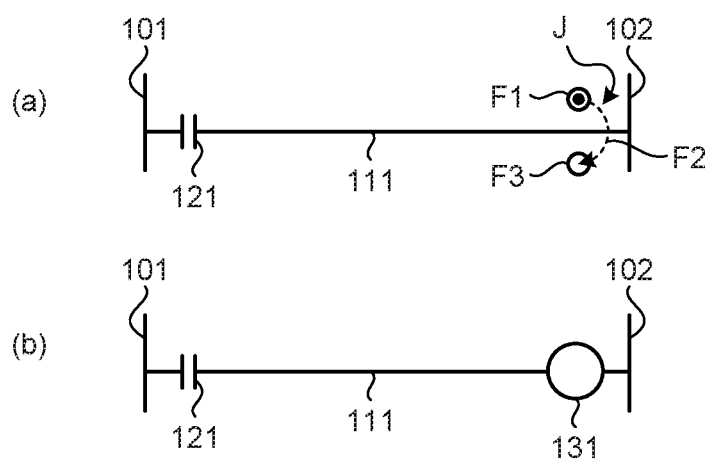
FIG. 13 is a diagram showing an example of a procedure of specific program editing processing according to the second embodiment.

In FIG. 13, as shown in (a), the user starts the input operation J from the symbol-locatable base element which is located at the upper side of the connection line 111 and ends the input on the lower side of the connection line 111 while drawing a semicircle toward a region on the lower side.

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation J from a region on the upper side of the connection line 111 (F1) and ends the input in a region on the lower side of the connection line 111 (F3) through the connection line 111 (F2). Therefore, the operation target is specified as the connection line 111, which is the program constituent element.

Thereafter, the processing executing unit 12 collates a shape of a track and a direction of the track defined in the gesture definition concerning the specified operation target, that is, in this example, the connection line 111 with the shape of the track and the direction of the track stored in the input gesture characteristic information and specifies a command to be applied to the connection line 111. That is, in this example, the track stored in the input gesture characteristic information is a curved line in a semicircular shape in the up-down direction and the direction of the track is the downward direction. Therefore, the processing executing unit 12 executes a command for adding the coil symbol 131.

Consequently, as shown in FIG. 13(b), the coil symbol 131 is placed in the position where the input operation J is performed.

Figure 14:
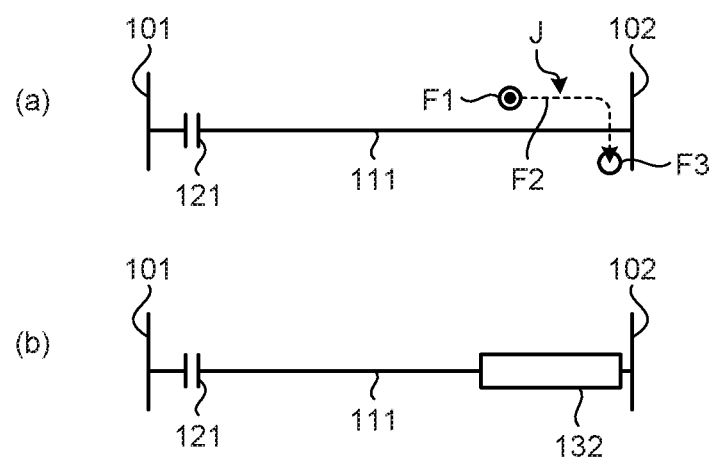
FIG. 14 is a diagram showing an example of a procedure of specific program editing processing according to the second embodiment.

In FIG. 14, as shown in (a), the user starts the input operation J from a point, which is on the upper side of the connection line 111 and is in a region on a right upper side of the connection line 111 and, after moving the input indicator in parallel to the connection line 111 and after changing the direction of the input indicator approximately 90 degrees toward a region on the lower side of the connection line 111 to stride over the connection line 111, ends the input on the lower side of the connection line 111.

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation J from a region on the upper side of the connection line 111 (F1) and ends the input in a region on the lower side of the connection line 111 (F3) through the connection line 111 (F2). Therefore, the operation target is specified as the connection line 111, which is the program constituent element.

Thereafter, the processing executing unit 12 collates a shape of a track and a direction of the track defined in a gesture definition concerning the specified operation target, that is, in this example, the connection line 111 with the shape of the track, the direction of the track, and the coordinate information stored in the input gesture characteristic information and specifies a command applied to the connection line 111. That is, in this example, the track stored in the input gesture characteristic information is a combination of a straight line in a direction parallel to the connection line 111 and a straight line in a direction perpendicular to the connection line 111. Therefore, the processing executing unit 12 executes a command for adding an instruction frame 132.

Consequently, as shown in FIG. 14(b), the instruction frame 132 is placed in the location where the input operation J is performed. At a point when the instruction frame 132 is placed, no instruction statement is input to the instruction frame 132.

Figure 15:
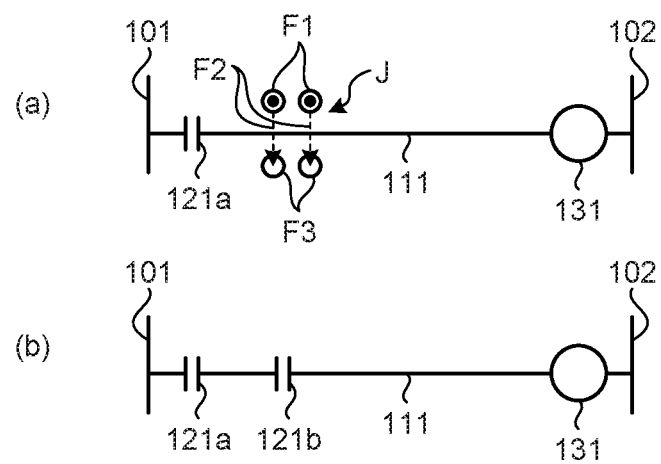
FIG. 15 is a diagram showing an example of a procedure of specific program editing processing according to the second embodiment.

In the example explained above, one input indicator is used. Additionally, a command can be allocated to input operation performed with two or more input indicators simultaneously being in contact with the program editing screen. In FIG. 15, as shown in (a), at a location between an "a" contact symbol 121a and the coil symbol 131, the user starts the input operation J from the upper side of the connection line 111 with two input indicators, and, after linearly moving the input indicators toward a region on the lower side, ends the input on the lower side of the connection line 111.

That is, first, the input-gesture-characteristic-information acquiring unit 11 acquires coordinate information of F1, F2, and F3, a track of the coordinates, and also a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation from a region on the upper side of the connection line 111 (F1) and ends the input in a region on the lower side of the connection line 111 (F3) through the connection line 111 (F2). Therefore, the operation target is specified as the connection line 111, which is the program constituent element.

Thereafter, the processing executing unit 12 collates a shape of a track and a direction of the track defined in the gesture definition concerning the specified operation target, that is, in this example, the connection line 111 with the shape of the track and the direction of the track included in the input gesture characteristic information and specifies a command to be applied to the connection line 111. That is, in this example, the tracks stored in the input gesture characteristic information are two straight lines in the up-down direction and a direction of the tracks is downward. Therefore, the processing executing unit 12 executes a command for adding an "a" contact symbol 121b.

Consequently, as shown in FIG. 15(b), the "a" contact symbol 121b is placed in the location where the input operation J has been performed.

By performing the input operation J traversing the connection line 111 as explained above with reference to FIG. 11 to FIG. 15, a command corresponding to the input gesture characteristic information is executed on the basis of the gesture definition concerning the connection line and the connection line is replaced with another program constituent element.

In conclusion, designation of an operation target and designation of a command performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command performed on the operation target. Therefore, there is an effect that it is made possible to effectively use the program editing screen.

(2-2) An Example in which a Symbol is Changed

Figure 16:
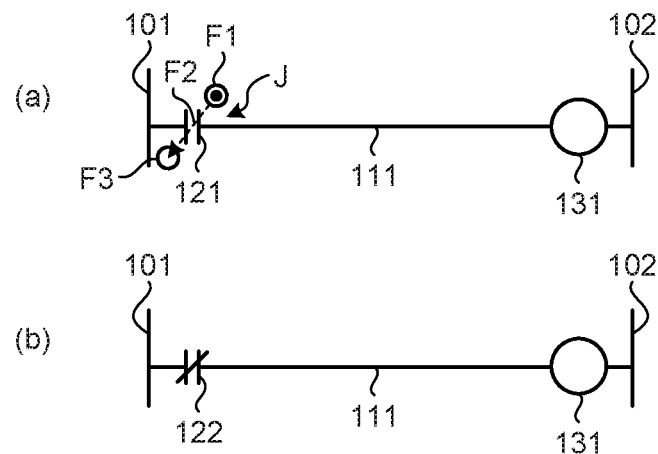
FIG. 16 is a diagram showing an example of a procedure of specific program editing processing according to the second embodiment.

In FIG. 16, the input operation J is performed from a region on the upper right toward a region on the lower left of the "a" contact symbol 121 as shown in (a).

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation from a region on the upper side of the connection line 111 (F1) and ends the input in a region on the lower side of the connection line 111 (F3) through an "a" contact symbol 121 (F2). Therefore, the operation target is specified as the "a" contact symbol 121, which is a program constituent element.

Thereafter, the processing executing unit 12 collates a shape of a track and a direction of the track defined in a gesture definition concerning the specified operation target, that is, in this example, the "a" contact symbol 121 with the shape of the track and the direction of the track included in the input gesture characteristic information and specifies a command applied to the "a" contact symbol 121. That is, in this example, the track stored in the input gesture characteristic information is a straight line in an oblique direction and the direction of the track is left downward. Therefore, the processing executing unit 12 executes a command for replacing the "a" contact symbol 121 with the "b" contact symbol 122.

Consequently, as shown in FIG. 16(*b*), the "b" contact symbol 122 is placed in the location where the input operation J is performed.

Figure 17:
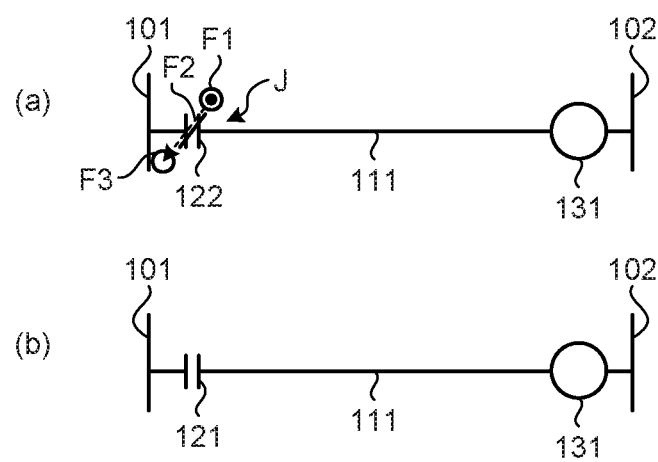
FIG. 17 is a diagram showing an example of a procedure of specific program editing processing according to the second embodiment.

FIG. 17 is opposite to the case shown in FIG. 16. That is, when the input operation J is performed from a region on the upper right toward a region on the lower left of the "b" contact symbol 122 as shown in (a), the "a" contact symbol 121 is placed as shown in (b). Details of this processing are substantially the same as the case shown in FIG. 16. Therefore, explanation of the procedure of program editing processing concerning FIG. 17 is omitted in this description.

Figure 18:
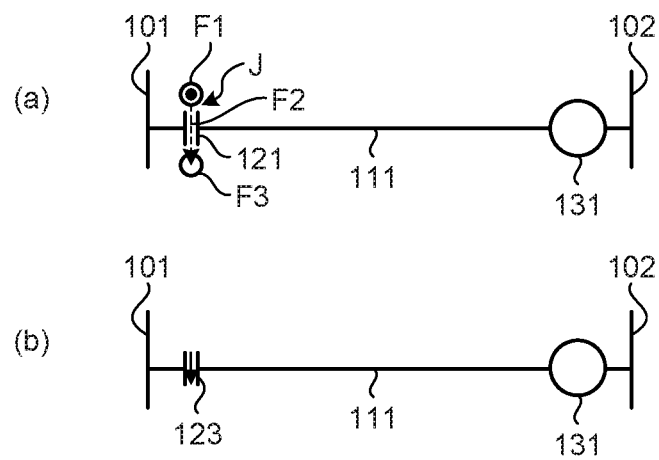
FIG. 18 is a diagram showing an example of a procedure of specific program editing processing according to the second embodiment.

In FIG. 18, when the input operation J is performed from a region on the upper side toward a region on the lower side of the "a" contact symbol 121 as shown in (a), a trailing edge pulse "a" contact symbol 123 is placed as shown in (b). Details of this processing are substantially the same as the processing in the case of FIG. 16. Therefore, explanation of the procedure of program editing processing concerning FIG. 18 is also omitted in this description.

By performing the input operation J traversing the program constituent element as explained above with reference to FIG. 16 to FIG. 18, a command corresponding to the input gesture characteristic information is executed on the basis of the gesture definition concerning the program constituent element and the program constituent element is replaced by another program constituent element.

That is, designation of an operation target and designation of a command performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command performed on the operation target. Therefore, there is an effect that it is made possible to effectively use the program editing screen.

(2-3) An Example in which a Parallel Circuit is Created

Figure 19:
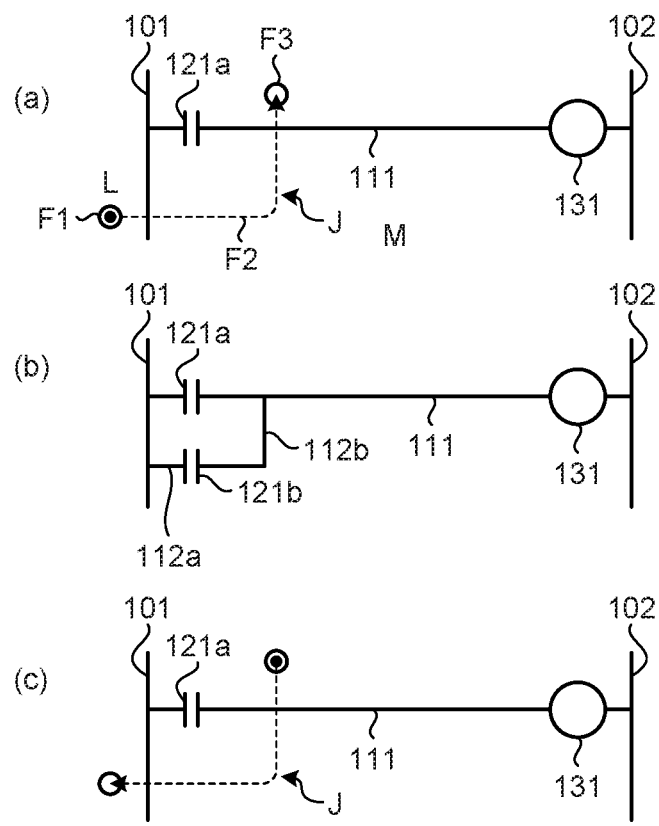
FIG. 19 is a diagram showing an example of a procedure of specific program editing processing according to the second embodiment.

In FIG. 19, as shown in (a), the user starts the input operation J from the region L (F1) and, after moving the input indicator a predetermined distance in the horizontal direction toward the region M, changes the direction of the input indicator approximately 90 degrees upward, and moves the input indicator to a region on the upper side of the connection line 111 (F3) through the connection line 111 (F2).

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information stored in the input gesture characteristic information acquired by the input-gesture-characteristic-information acquiring unit 11. In this example, the user starts the input operation from a region on the lower side of the connection line 111 (F1) and ends the input in a region on the upper side of the connection line 111 (F3) through the left bus 101 and the connection line 111 in the symbol-locatable base element (F2). Therefore, the operation target is specified as the symbol-locatable base element.

Thereafter, the processing executing unit 12 collates a shape of a track and a direction of the track defined in a gesture definition concerning the specified operation target, that is, in this example, the symbol-locatable base element with the shape of the track and the direction of the track stored in the input gesture characteristic information and specifies a command applied to the symbol-locatable base element. That is, in this example, the track is a combination of a horizontal straight line and a vertical straight line stored in the input gesture characteristic information. The direction of the track is from the left toward the right direction, changes to the upward direction on the midway, and traverses the connection line 111. As a result, as shown in (b), a parallel circuit including the "a" contact symbol 121*b*, a connection line 112*a* connecting the left bus 101 and the "a" contact symbol 121*b*, and a connection line 112*b* connecting the "a" contact symbol 121*b* and the connection line 111 is placed in the location where the input operation has been performed.

Note that, as shown in (c), the parallel circuit shown in (b) can be placed according to the input operation J for, after moving a predetermined distance from a region on the upper side toward a region on the lower side of the connection line 111, changing the direction approximately 90 degrees toward the region L, and moving to the region L on the left side of the left bus 101. FIG. 19 is the parallel circuit of the contact symbols. Similarly, as shown in FIG. 20, a parallel circuit of coil symbols 131*a* and 131*b* can be placed.

Figure 20:
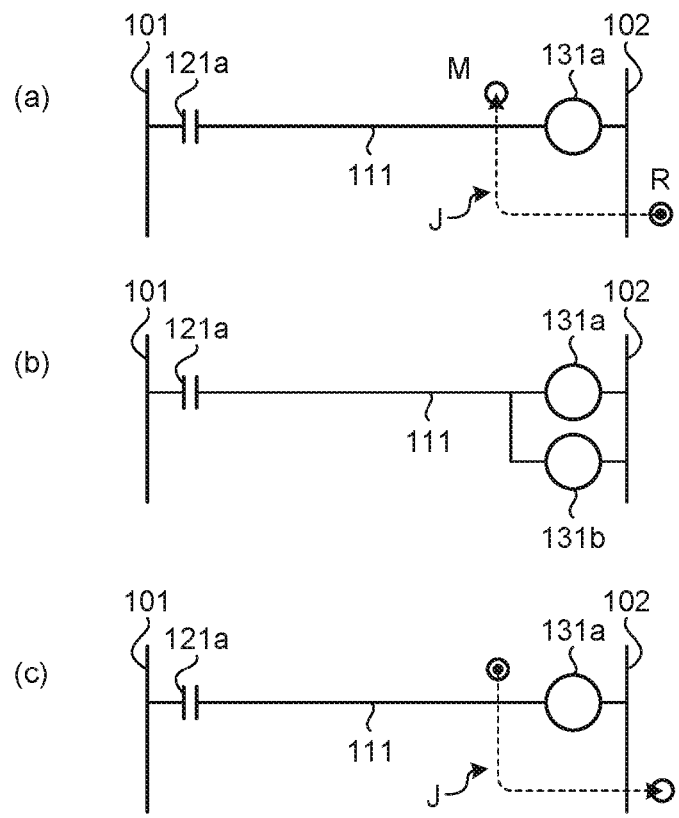
FIG. 20 is a diagram showing an example of a procedure of specific program editing processing according to the second embodiment.
Figure 21:
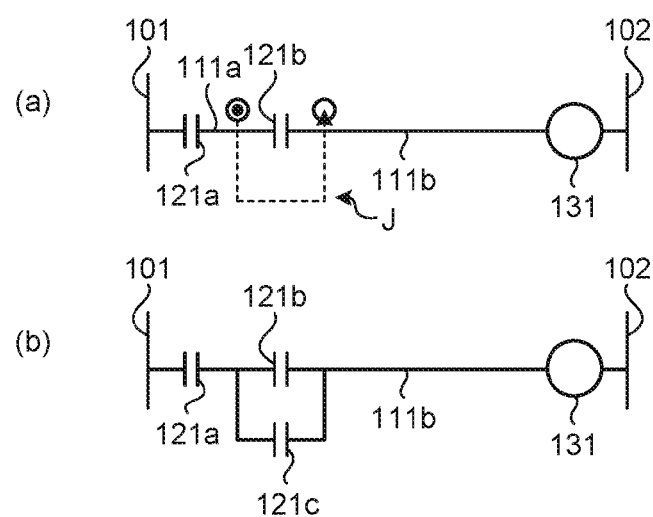
FIG. 21 is a diagram showing an example of a procedure of specific program editing processing according to the second embodiment.

In FIG. 19 and FIG. 20, the examples are shown in which the parallel circuit connected to the left bus 101 or the right bus 102 is created. It is also possible to create a parallel circuit that branches halfway in the connection line 111. In FIG. 21, two "a" contact symbols 121*a* and 121*b*, connection lines 111*a* and 111*b*, and one coil symbol 131 are placed from the left as shown in (a). The user performs an input operation J of a U shape. That is, the user starts the gesture input from a region on the upper side of the connection line 111*a* present between the "a" contact symbols 121*a* and 121*b* among the above symbols to surround the "a" contact symbol 121*b*. As a result, as shown in (b), an "a" contact symbol 121*c* branches from the connection lines 111*a* and 111*b* in the position where the input operation has been performed. The "a" contact symbol 121*c* is placed in parallel to the "a" contact symbol 121*b*. Details of this processing are substantially the same as the processing in the case of FIG. 19. Therefore, explanation of the procedure of program editing processing concerning FIG. 21 is omitted in this description.

As explained above with reference to FIG. 19 to FIG. 21, by performing the input operation J for tracing an addition destination of the ladder program, the command corresponding to the input gesture characteristic information is executed on the basis of the gesture definition concerning the base element. The base element is replaced by the ladder program including the program constituent elements and the connection lines.

In conclusion, designation of an operation target and designation of a command performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

(2-4) An Example in which Symbols are Cut Off and Deleted

Figure 22:
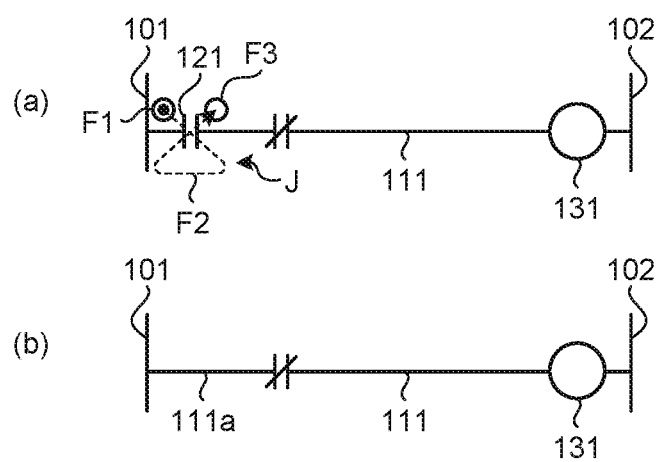
FIG. 22 is a diagram showing an example of a procedure of specific program editing processing according to the second embodiment.

In FIG. 22, as shown in (a), the input operation J is performed to move the input indicator from an upper left side toward a lower right side of the "a" contact symbol 121 and, after moving the input indicator toward the left in the horizontal direction from the lower right side of the "a" contact symbol 121, and move the input indicator from a lower left side toward a upper right side of the "a" contact symbol 121.

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information included in the input gesture characteristic information acquired by the input-gesture-characteristic-information acquiring unit 11. In this example, the user starts the operation from a region on the upper left side of the "a" contact symbol 121 (F1) and, after moving the input indicator toward the lower right side and moving the input indicator toward the left in the horizontal direction from the lower right side of the "a" contact symbol 121, moves the input indicator from the lower left side toward the upper right side of the "a" contact symbol 121 (F2), and ends the input in a region on the upper right side of the "a" contact symbol 121 (F3). Therefore, the operation target is specified as the "a" contact symbol 121, which is a program constituent element.

Thereafter, the processing executing unit 12 collates a shape of a track and a direction of the track defined in a gesture definition concerning the specified operation target, that is, in this example, the "a" contact symbol 121 with the shape of the track and the direction of the track included in the input gesture characteristic information, and specifies a command applied to the "a" contact symbol 121. That is, in this example, a command for cutting off the "a" contact symbol 121 and replacing the "a" contact symbol 121 with the connection line is executed.

Consequently, as shown in (b), the "a" contact symbol 121 traversed by the track of the input operation J is cut off and the connection line 111a is placed in the region of the "a" contact symbol 121.

Note that it can be also configured such that the cut "a" contact symbol 121 is attached to other regions. A gesture definition in this case can be defined for all the program constituent elements.

Figure 23:
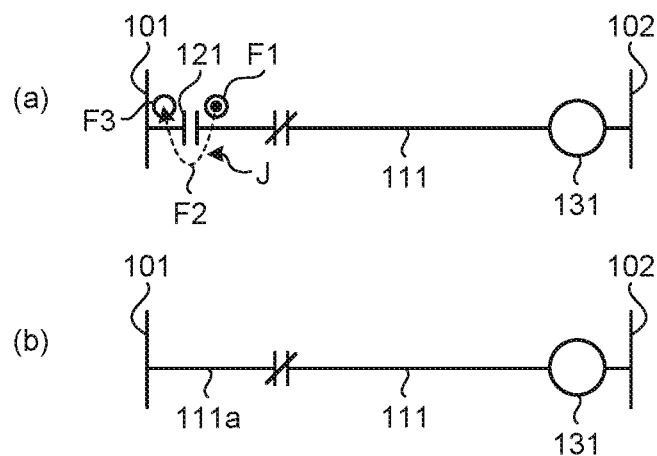
FIG. 23 is a diagram showing an example of a procedure of specific program editing processing according to the second embodiment.

FIG. 23 is similar to FIG. 22. Although the processing for cutting off the program constituent element traversed by the track of the input operation J is performed in FIG. 22, in FIG. 23, a program constituent element (in this case, the "a" contact symbol 121) traversed by the track of the input operation J is deleted and replaced by the connection line. Details of this processing are substantially the same as the processing in the case of FIG. 22. Therefore, explanation of the procedure of program editing processing concerning FIG. 23 is omitted in this description.

Note that it can be configured such that the deleted "a" contact symbol 121 is disabled to be attached to other regions. A gesture definition in this case can be defined for all the program constituent elements.

Figure 24:
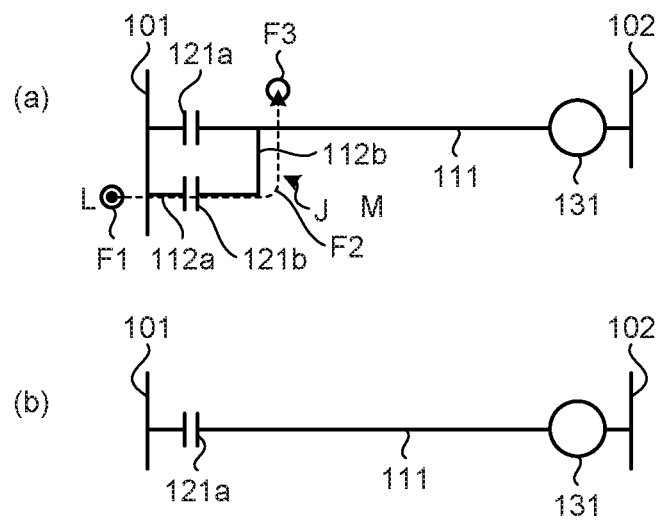
FIG. 24 is a diagram showing an example of a procedure of specific program editing processing according to the second embodiment.

In FIG. 24, a case in which the parallel circuit is deleted is shown. As shown in (a), the input operation J is performed to, after moving the input indicator in the horizontal direction from a region on the lower side of the connection line 111 in the region L toward the region M to trace the connection lines 112a and 112b and the "a" contact symbol 121b of the parallel circuit, change the direction approximately 90 degrees toward the upper side and move the input indicator to a region on the upper side of the connection line 111. As a result, as shown in (b), the parallel circuit in the position where the input operation has been performed is deleted. Details of this processing are substantially the same as the processing in the case of FIG. 19. Therefore, explanation of the procedure of program editing processing concerning FIG. 24 is omitted in this description.

As explained above with reference to FIG. 22 to FIG. 24, by performing the input operation J for tracing the program constituent elements desired to be cut or deleted, the command corresponding to the input gesture characteristic information is executed on the basis of the gesture definition concerning the program constituent elements. The program constituent elements are replaced by the connection lines or the base elements.

That is, designation of an operation target and designation of a command to be performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

(2-5) Other Examples (2-5-1) Placement Processing in which Two or More Constituent Elements and a Gesture are Combined In the examples explained above, according to a combination of a constituent element on the program editing screen and input operation, a command applied to the constituent element is defined. The gesture definition can be also configured to make it possible to distinguish, according to, for example, whether there is a program constituent element present in the vicinity of a target of the input operation, commands to be executed.

Figure 25:
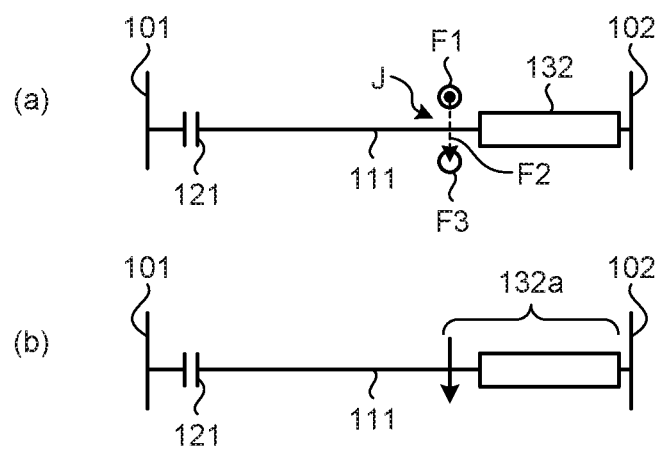
FIG. 25 is a diagram showing an example of a procedure of specific program editing processing according to the second embodiment.

In FIG. 25, input operation is performed to stride over the connection line 111 in the vicinity of the left side of the instruction frame 132, which is one of the program constituent elements, to change a part of the connection line 111 to another program constituent element. That is, as shown in (a), the input operation J from a region on the upper side of the connection line 111 toward a region on the lower side is performed on the left side of the instruction frame 132.

That is, first, the input-gesture-characteristic-information acquiring unit 11 acquires coordinate information of F1, F2, and F3, a track of the coordinates, and a direction of the track starting at F1 and ending at F3 of the input operation J.

Subsequently, the processing executing unit 12 specifies an operation target on the basis of the coordinate information included in the input gesture characteristic information acquired by the input-gesture-characteristic-information acquiring unit 11. In this example, the user starts the input operation from a region on the upper side of the connection line 111 on the left side of the instruction frame 132 (F1) and ends the input in a region on the lower side of the connection line 111 (F3) through the connection line 111 (F2). Therefore, the operation target is specified as the connection line 111 present on the left of the instruction frame 132, which is a program constituent element.

Thereafter, the processing executing unit 12 collates the shape of a track and a direction of the track defined in a gesture definition concerning the specified operation target, that is, in this example, the connection line 111 with the shape of the track and the direction of the track stored in the input gesture characteristic information, and specifies a command applied to the connection line 111. That is, in this example, the track stored in the input gesture characteristic information is a straight line in the up-down direction and the direction of the track is downward. The instruction frame 132 is adjacent to the right of the connection line 111. Therefore, a command for changing the instruction frame 132 to a trailing edge pulse instruction frame 132a is executed.

Consequently, as shown in (b), the instruction frame 132 is changed to the trailing edge pulse instruction frame 132a, on the left side of which a downward arrow is added.

Figure 26:
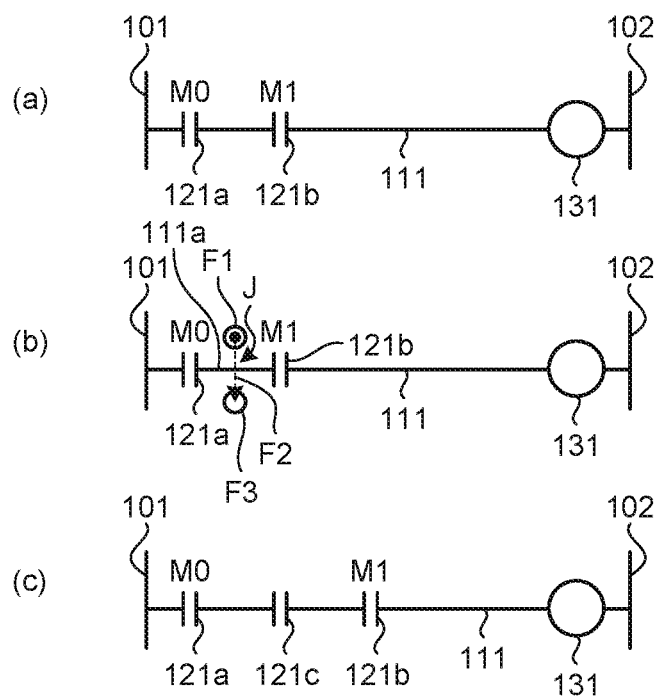
FIG. 26 is a diagram showing an example of a procedure of specific program editing processing according to the second embodiment.

In FIG. 26, as shown in (a), the two "a" contact symbols 121a and 121b and the coil symbol 131 are placed on one connection line 111. When, in this ladder program, as shown in (b), the input operation J for adding an "a" contact symbol between the two "a" contact symbols 121a and 121b is performed, the processing executing unit 12 specifies the connection line 111a as the operation target and executes a command corresponding to the input operation J and the gesture definition concerning the connection line. That is, the processing executing unit 12 replaces the connection line 111a with the "a" contact symbol 121c.

At this point, the processing executing unit 12 can be configured such that it only places the "a" contact symbol 121c in the region where the input operation J has performed or, can be also configured such that when the region is small, it expands the distance between the two "a" contact symbols 121a and 121b and places the "a" contact symbol 121c between the "a" contact symbols 121a and 121b. The latter case can be realized by, for example, configuring the processing executing unit 12 to have a function of logically inserting a program constituent element (an "a" contact symbol) between the two "a" contacts and then displaying the entire program. Alternatively, a function of determining whether a region where the program constituent element, that is the "a" contact symbol 121c, is placed has an area sufficient for placing the program constituent element and a function of, when the region does not have the sufficient area, expanding the distance between program constituent elements adjacent to the region and then placing the program constituent element can be provided in the processing executing unit 12.

As a result, when two constituent elements are close to each other, as shown in (c), it is possible to expand the distance between the constituent elements and place the "a" contact symbol 121c corresponding to the input operation J in the expanded region between the constituent elements.

In conclusion, designation of an operation target and designation of a command to be performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command performed on the operation target. Therefore, there is an effect that it is made possible to effectively use the program editing screen.

(2-5-2) Placement Processing in which Tracks of Two or More Strokes and Placement Elements are Combined In the example explained above, the gesture definitions are defined by tracks of one stroke. A gesture definition having tracks of two or more strokes can be also defined.

Figure 27:
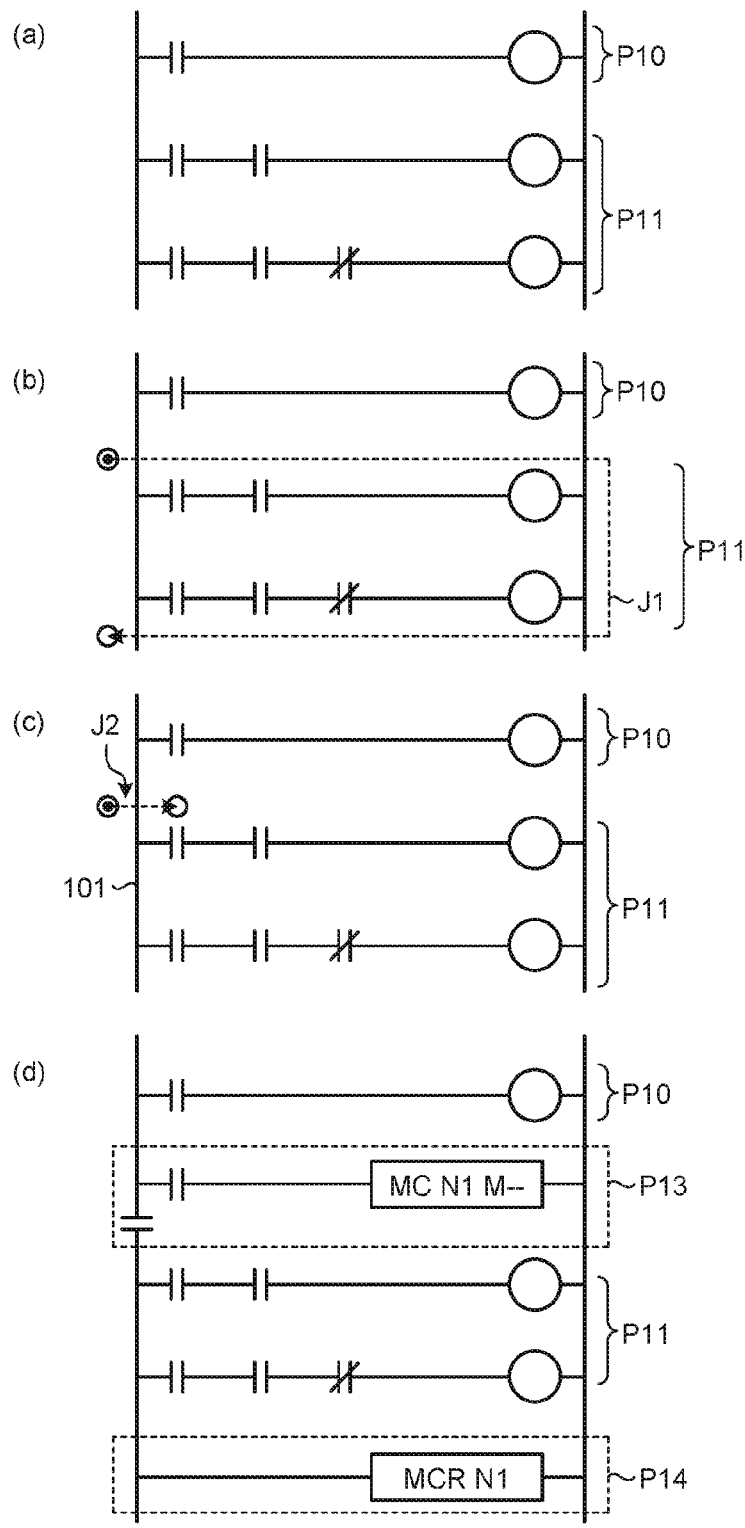
FIG. 27 is a diagram showing an example of a procedure of specific program editing processing according to the second embodiment.

FIG. 27 is a diagram showing an example of editing in which two gesture definitions are combined. An example is explained in which there is a ladder program including programs P10 and P11 shown in (a) and a program called master control is desired to be performed to make it possible to designate necessity of execution of the program P11 of the programs P10 and P11.

In such a case, as shown in (b), first, as a first stroke, an outer edge of the program P11 is drawn to be traced by input operation J1 having like a C shape. According to the input operation, the processing executing unit 12 executes a command for changing the program P11 to a selected state. Subsequently, as shown in (c), as a second stroke, input operation J2 traversing the left bus 101 between the program P10 and the program P11 from the left to the right is drawn. Consequently, as shown in (d), the processing executing unit 12 creates a master control circuit in which a program P13 for instructing a start of the master control circuit is placed between the program P10 and the program P11 and a program P14 for instructing an end of the master control is placed below the program P11. Note that the master control circuit is an example. It goes without saying that a procedure for combining the input operation for selecting a program to be processed and the input operation for executing a command on the selected program in this way can be applied to other processing.

In this way, by only one input operation, not only a command can be performed on a constituent element designated in the input operation, but also one input operation for selecting an operation target and another input operation for designating a command executed on the selected operation target can be combined. Consequently, it is made possible to further increase types of operation that can be associated with the input operation.

In conclusion, it is made possible to execute different commands corresponding to operation targets using the same track similar to a change desired to be added to a program. Therefore, there is an effect that memorization of tracks for input operation becomes easier for the user and it is made possible to learn an editing method of a program described using symbols by the tablet terminal in shorter period.

In addition, designation of an operation target and designation of a command performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

(2-5-3) a Case in which a Command for the Program Editing Screen is Associated with the Input Operation In the example explained above, the commands for the input operation and the constituent elements are defined in the gesture definition. In the input operation, a command for the program editing screen, those are, for example, processing for changing a range of a program to be displayed on the program editing screen (hereinafter referred to as scroll processing), processing for undoing executed command, or processing for redoing the same command can be also defined in the gesture definition.

For example, input operation performed by two input indicators can be defined as tracks concerning scroll processing in gesture definitions of all constituent elements such that the scroll processing is performed by input operation performed on a constituent element. A function of judging the input operation performed by the two input indicators as an input operation for the program editing screen can be provided in the processing executing unit 12. Alternatively, in a gesture definition, the scroll processing can be also defined as a command concerning the region L on the left side of the left bus (left side base elements L) or the region R on the right side of the right bus (right side base elements R).

Figure 28:
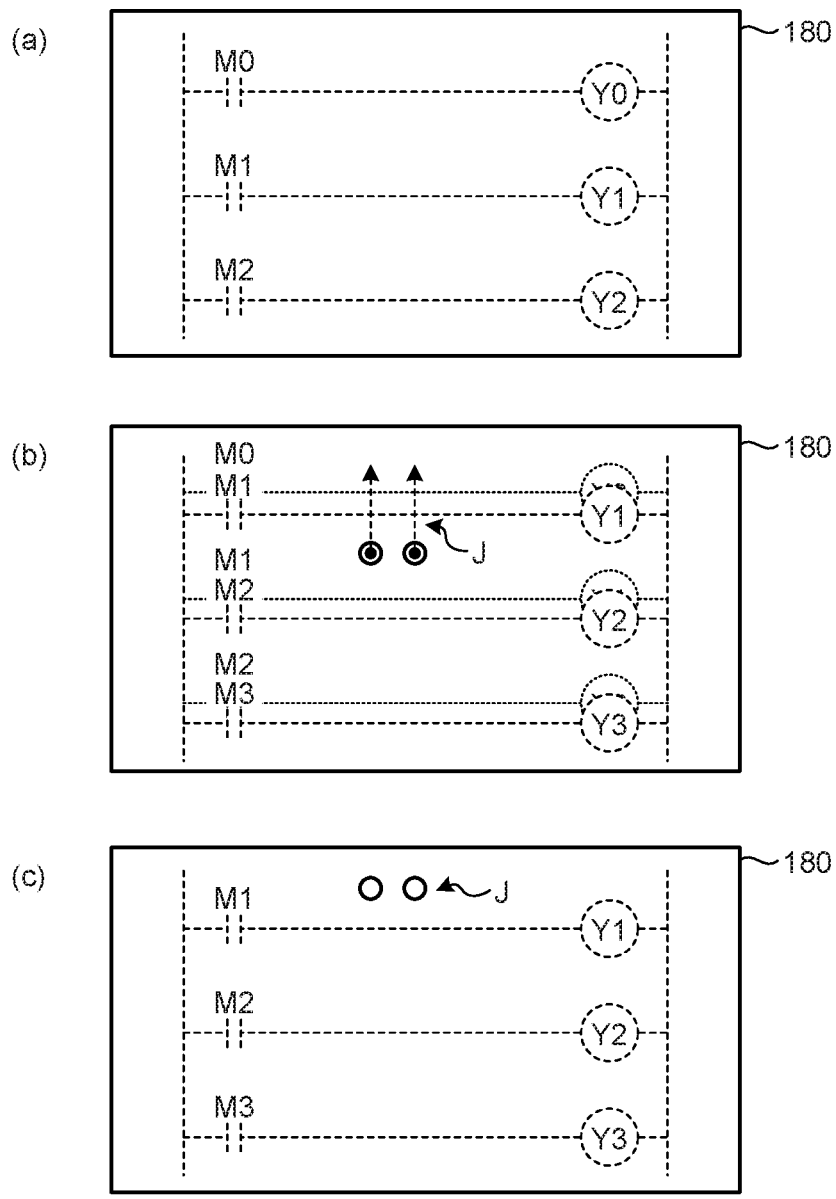
FIG. 28 is a diagram showing an example of a procedure of specific program editing processing according to the second embodiment.

In FIG. 28, an example of the scroll processing by the input operation by the two input indicators is shown. To scroll a ladder program displayed in a program editing screen 180 in (a) upward, the input operation J is performed in a direction in which a region where the ladder program is drawn in the program editing screen 180 is desired to be scrolled by the two input indicators as shown in (b). As a result, a range of the ladder program displayed in the program editing screen 180 moves according to the movement of the input indicators. As shown in (c), when a desired range appears, the user releases the input indicators from the program editing screen 180 to end the input operation J. Then, the scroll processing ends.

Figure 29:
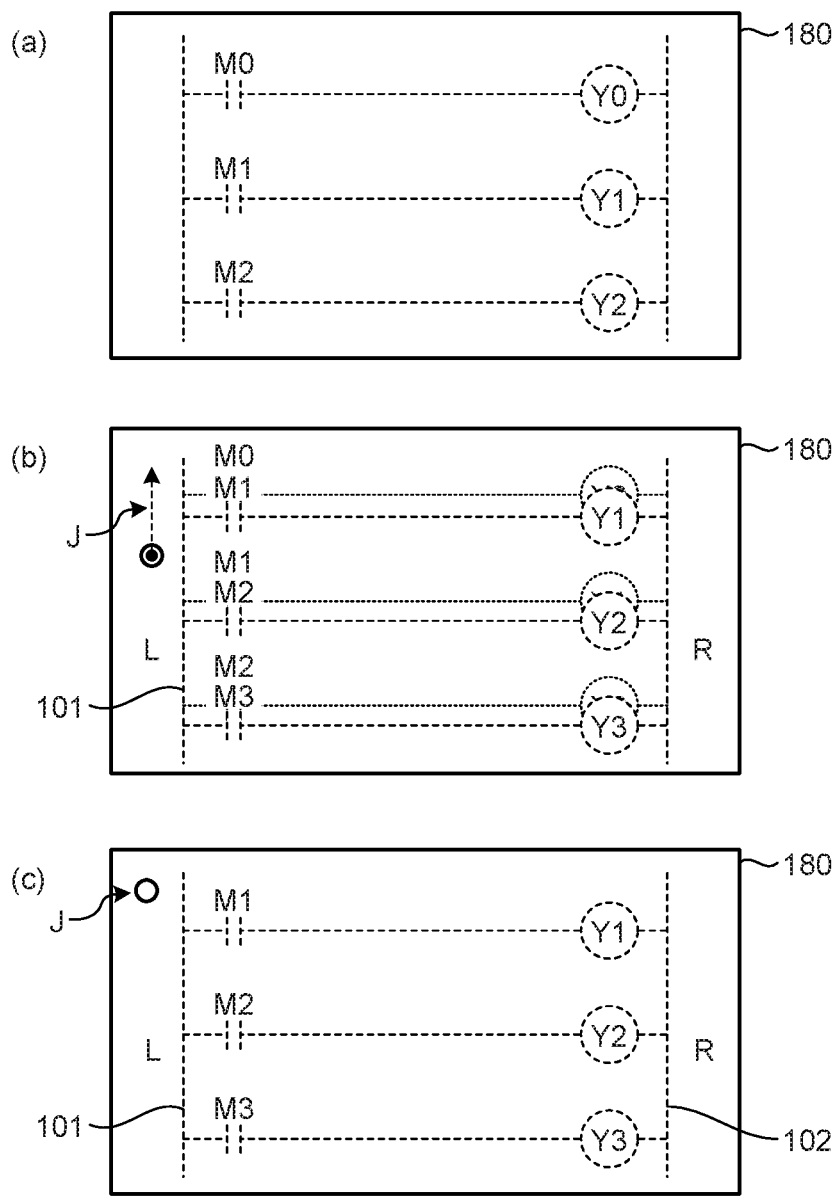
FIG. 29 is a diagram showing an example of a procedure of specific program editing processing according to the second embodiment.

In FIG. 29, an example is shown in which the scroll processing is defined as a command corresponding to a track of a straight line in the gesture definition concerning the left side base element L. To scroll a ladder program displayed in the program editing screen 180 in (a) upward, the input operation J is performed on the left side base element L on the program editing screen 180 in a direction in which scroll is desired to be performed by one input indicator as shown in (b). As a result, a range of the ladder program displayed on the program editing screen 180 changes according to the movement of the input indicator. As shown in (c), when a desired range appears, the user releases the input indicator from the program editing screen 180 to end the input operation J. Then, the scroll processing ends. Note that, in the above explanation, the input operation J is performed on the left side base element L. The same gesture definition can be also defined to the right side base element R. The duration of the scroll movement after the end of the input operation can be also changed according to the magnitude of a temporal change of the track of the input operation. Other commands for program editing can be also executed by defining commands in the gesture definition. For example, a command for undoing an executed command, a command for doing an undone command, or a command for redoing an executed command can be also executed by defining commands in the gesture definition.

Figure 30:
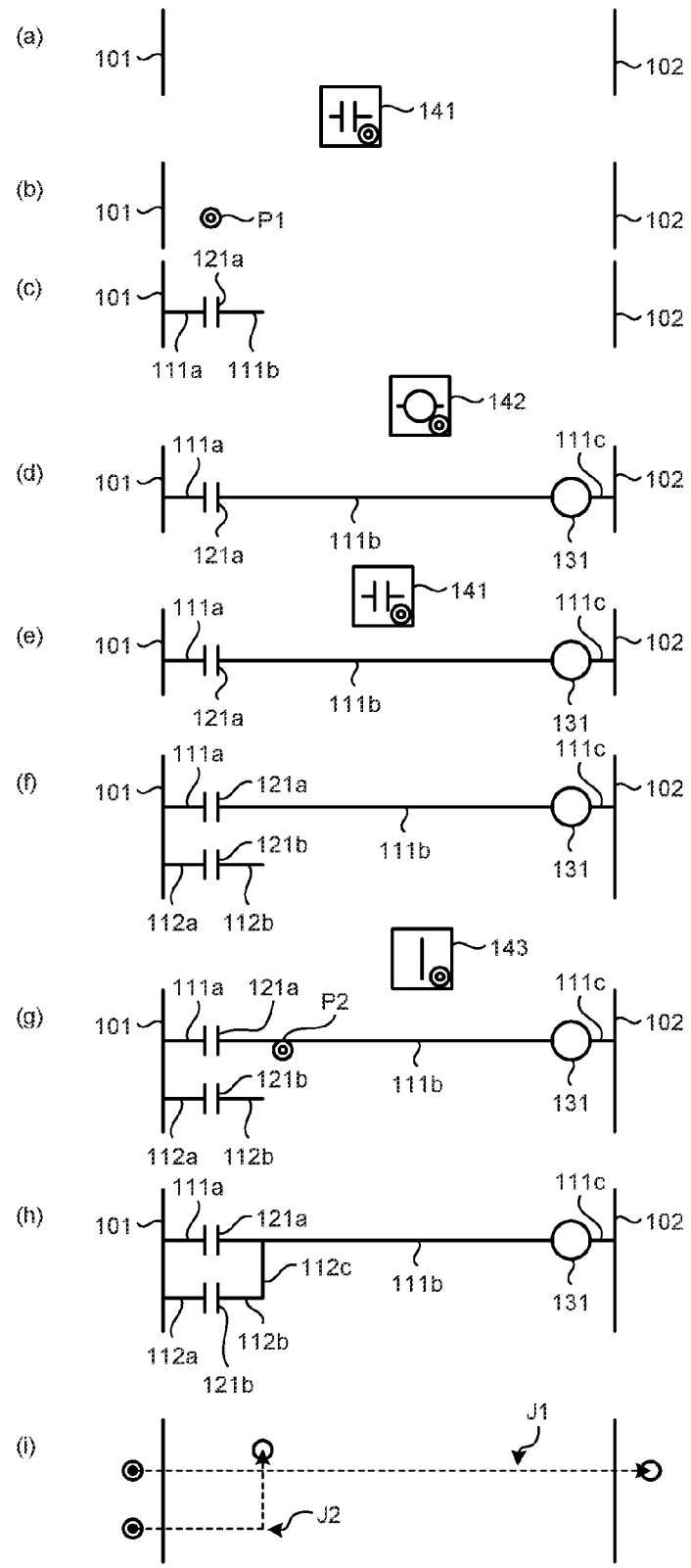
FIG. 30 is a diagram schematically showing a program editing procedure in a general engineering tool.

Effects compared with creation processing for a ladder program in a general engineering tool are explained. FIG. 30 is a diagram schematically showing a procedure of program editing processing in the general engineering tool. The procedure shown in the figure is a procedure for causing a tablet terminal to execute an engineering tool for a personal computer including a pointing device such as a mouse as an input section. In a general case, first, as shown in FIG. 30(a), the left bus 101 and the right bus 102 are placed in the program editing screen. Thereafter, as shown in FIG. 30(b), a location P1 on the program editing screen where a program constituent element is desired to be placed is tapped by the input indicator. Subsequently, a button 141 to choose an "a" contact symbol is tapped by the input indicator in a tool bar in which buttons to choose program constituent elements are placed side by side. Consequently, as shown in FIG. 30(c), the "a" contact symbol 121a is added in the program editing screen. The "a" contact symbol 121a is connected to the left bus 101 by a connection line 111a. A connection line 111b placed on the right side of the "a" contact symbol 121a is not connected to the right bus 102.

Thereafter, as shown in FIG. 30(d), when a button 142 to choose a coil symbol in the tool bar is tapped by the input indicator, the coil symbol 131 is added between the connection line 111b and the right bus 102. The coil symbol 131 and the "a" contact symbol 121a are connected by the connection line 111b. The coil symbol 131 and the right bus 102 are connected by the connection line 111c.

Subsequently, as shown in FIG. 30(e), when the button 141 to choose an "a" contact symbol in the tool bar is tapped, as shown in FIG. 30(f), the "a" contact symbol 121b is placed under the "a" contact symbol 121a created as explained above. The "a" contact symbol 121b is also connected to the left bus 101 by the connection line 112a. The connection line 112b is also placed on the right side of the "a" contact symbol 121b and is not connected to the right bus 102.

Thereafter, as shown in FIG. 30(g), a location P2 where a connection line 112c which is shown in FIG. 30(h) is desired to be placed, that is, the location P2 on the connection line 111b corresponding to the right end of the connection line 112b connected to the "a" contact symbol 121b is tapped. A button 143 to choose a connection line extending in the up-down direction in the tool bar is tapped. Consequently, as shown in FIG. 30(h), a parallel circuit is created in which a connection line 112c connecting the location P2 on the connection line 111b and the right end of the connection line 112b is placed and the "a" contact symbols 121a and 121b are placed in parallel.

In this way, in the general engineering tool, to place program constituent elements between the left bus 101 and the right bus 102, a procedure for selecting a position where symbols are placed and choosing symbols to be placed using the tool bar is necessary.

Contrary to this, in the second embodiment, the input-gesture-characteristic-information acquiring unit 11 acquires input operations. The processing executing unit 12 specifies operation targets on the basis of coordinate information of the input gesture characteristic information acquired by the input-gesture-characteristic-information acquiring unit 11 and executes commands on the basis of the shape of a track and a direction of the track included in the input gesture characteristic information, the shape and direction of the tracks and commands defined in a gesture definition concerning the constituent element. As a result, designation of an operation target and designation of a command executed on the operation target can be performed by one input operation.

That is, when the operation performed in FIG. 30 is input in the procedure explained in the second embodiment, as shown in FIG. 30(*i*), by only just two input operations, those are, after the input operation J1 in the horizontal direction leading from a region on the left side of the left bus 101 to a region on the right side of the right bus 102 is performed, by performing the input operation J2 of moving in the horizontal direction from the region on the left side of the left bus to a region between the buses, changing the direction approximately 90 degrees upward, and crossing the connection line 111 drawn by the input operation J1, a ladder program shown in FIG. 30(*g*) can be input.

That is, there is an effect that it is made possible to edit a program with a small number of operations and small labor by the tablet terminal compared with the general engineering tool.

Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

Because the gesture definition is defined by combinations of constituent elements, shapes of tracks and directions of the tracks of an input operation, and commands, different commands for the same shape and direction of tracks can be assigned for respective constituent elements. Therefore, it is made possible to suppress number of shapes of tracks. That is, the user has to remember fewer kinds (numbers) of tracks. Therefore, there is also an effect that memorization of tracks for input operation becomes easier for the user and it makes it possible to provide a program creation environment in which the user can easily learn the operation method in a shorter period.

Note that, although the above explanation, the examples are explained in which the processing executing unit 12 specifies the operation target on the basis of the coordinate information included in the input gesture characteristic information and specifies, on the basis of a gesture definition concerning the operation target, the command to be executed, the processing executing unit 12 can be also configured to distinguish regions above, below, on the left, and on the right of a constituent element and specify, on the basis of a gesture definition concerning each region, a command to be executed.

That is, for example, a region on the left side of the left bus, a region between the left bus and the right bus, and a region on the right side of the right bus can be distinguished according to the coordinate information. The processing executing unit 12 can be also configured to judge the order in which the input operation J traverses the regions using the gesture definition in which the coordinate information, the shape and direction of the tracks, the command to be executed, and additionally a combination of the order of traversing the regions instead of a constituent element are defined, and execute, on the basis of the gesture definition, a command corresponding to the gesture definition. In this way, the effects explained concerning FIG. 9 and FIG. 10 can be obtained.

For example, a region on the upper side and the region on the lower side of the connection line can be also separated and the region on the upper side and the region on the lower side can be distinguished according to the coordinate information. The processing executing unit 12 can be also configured to judge the order in which the input operation J traverses the regions using the gesture definition in which the coordinate information, the shape and direction of the tracks, the command to be executed, and additionally a combination of the order of traversing the regions instead of a constituent element are defined, and execute, on the basis of the gesture definition, a command corresponding to the gesture definition. In this way, the effects explained concerning FIG. 11 can be obtained.

For example, regions obliquely above, obliquely below, on the left, on the right, immediately above, and immediately below the "a" contact symbol and a region of the "a" contact symbol can be distinguished according to the coordinate information. The processing executing unit 12 can be also configured to judge the order in which the input operation J traverses the regions using the gesture definition in which the coordinate information, the shape and direction of the tracks, the command to be executed, and additionally a combination of the order of traversing the regions instead of a constituent element are defined, and execute, on the basis of the gesture definition, a command corresponding to the gesture definition. In this way, the effects explained concerning FIG. 16 can be obtained.

Third Embodiment

A shape of a track and a direction of the track defined in a gesture definition can be defined by modeling characters. In a third embodiment, examples in which character-like tracks are defined in the gesture definition are explained.

When the character-like tracks are defined in the gesture definition, compared with a case in which the character-like track is not defined in the gesture definition, position information having high resolution needs to be stored in input gesture characteristic information. Therefore, in the third embodiment, the input-gesture-characteristic-information acquiring unit 11 stores an input track at two kinds of resolution in the input gesture characteristic information.

A program editing screen is divided into regions by a first division unit of a predetermined size. The regions are used when an input of characters by an input indicator is identified. In the following explanation, the regions divided by the first division unit are referred to as "detailed regions". The program editing screen is also managed as regions by a second division unit larger than the first division unit and having a size integer times as large as an area of the first division unit. The regions managed by the second division unit are used when an input of a track not modeling characters from the input indicator is identified. In the following explanation, the regions managed by the second division unit are referred to as "coarse regions". The input-gesture-characteristic-information acquiring unit 11 stores two kind of input gesture characteristic information on the basis of region management information that associates the detailed regions and the coarse regions.

The program editing screen is associated with the detailed regions and the coarse regions to enable the processing executing unit 12 to reduce load of processing by distinguishing tracks modeling characters and tracks not modeling characters because a size (an area) of characters included in character information displayed on the program editing screen is considerably small compared with the size of program constituent elements.

When the size of the characters displayed on the program editing screen is not so small compared with the program constituent elements displayed on the program editing screen, the program editing screen can be also configured by one region.

One kind of input gesture characteristic information can be stored on the basis of the region management information associated with the detailed regions without providing management information associated with the coarse regions, and the processing executing unit 12 can be also configured not to distinguish the track modeling the characters and the track not modeling the characters.

The region management information is used to manage regions set on the program editing screen. As the region management information, information for dividing the detailed regions set on the program editing screen and information associating the detailed regions with the coarse regions are illustrated in FIG. 31. FIG. 31 is a diagram schematically showing a concept of the region management information, wherein (a) is a diagram showing a relation between the detailed regions and the coarse regions on the program editing screen, and (b) is a diagram showing an example of the region management information. As shown in FIG. 31(*a*), in the program editing screen, for example, with the upper left of the screen set as the origin, an x axis is provided in the left-right direction and a y axis is provided in a direction perpendicular to the x axis. Detailed regions FMxiyj (i and j are natural numbers) of the first division unit are placed on an xy plane. The size of the detailed regions can be optionally set according to the size of a contact region of the input indicator with the program editing screen. For example, when only a finger is used as the input indicator, the size of the contact region can be set large compared with when a stylus pen is used. One coarse region CMxmyn (m and n are natural numbers) includes the detailed regions FMxiyj of 5 rows×2 columns in this example. Further, one detailed region FMxiyj includes regions having a size of 10×10 as a unit of a coordinate. Such a relation is represented in, for example, a table format as shown in FIG. 31(*b*). That is, a coordinate range on the program editing screen included in the detailed regions FMxiyj is specified. The detailed regions FMxiyj included in each of the coarse regions CMxmyn are specified.

The input-gesture-characteristic-information acquiring unit 11 stores a coarse input track (a first input track) in units of coarse regions and a detailed input track (a second input track) in units of detailed regions according to input gesture characteristic information obtained in units of the coordinates and the region management information.

For example, the processing executing unit 12 specifies an operation target on the basis of coordinate information included in the coarse input track, and, first, when a track corresponding to the coarse input track is present in the gesture definition of the operation target, executes a command corresponding to the track. In this case, specifying processing for an operation target using the detailed input track is not performed. When the track corresponding to the coarse input track is not present in the gesture definition, the processing executing unit 12 specifies an operation target on the basis of coordinate information included in the detailed input track, and, when a track corresponding to the detailed input track is present in the gesture definition of the operation target, executes a command corresponding to the track. When the detailed input track is used, because the gesture is character, character recognition processing is performed using a shape of a track and a direction of the tracks stored in the detailed input track to specify input characters.

Further, as types of a symbol-locatable base element, a standard base element, a device name input base element for inputting a device name of a program constituent element, and a comment input base element for inputting comment information of a constituent element can be also respectively defined to make it possible to distinguish whether the input characters are a device name for a program constituent element or comment information. For example, when the operation target is the device name input base element, the processing executing unit 12 performs processing for registering, on the basis of a command defined in the gesture definition, as a device name of a program constituent element associated with the device name input base element, characters acquired by performing character recognition processing on the basis of the shape of tracks or the shape of the tracks and directions of the tracks stored in the input gesture characteristic information, and placing the device name in a predetermined position in the program editing screen. When the operation target is the comment input base element, the processing executing unit 12 performs processing for registering, on the basis of the command defined in the gesture definition, as comment information of a constituent element associated with the device name input base element, characters acquired by performing the character recognition processing on the basis of the shapes of the tracks, or the shapes of the tracks and the directions of the tracks stored in the input gesture characteristic information, and placing the comment information in a predetermined position in the program editing screen. Note that the device name is a name for distinguishing each one of program constituent elements. The comment information is an explanation sentence attached to each program constituent element.

Note that, in this case, the processing executing unit 12 and the input-gesture-characteristic-information acquiring unit 11 can be so configured as to specify the operation target on the basis of input operation of a first track. Further, the processing executing unit 12 and the input-gesture-characteristic-information acquiring unit 11 can be so arranged as to determine that the input operation ends when the input operation is not performed within a predetermined period, and can continue a character input when the input operation continues to the outside of the region of the base element.

Figure 32:
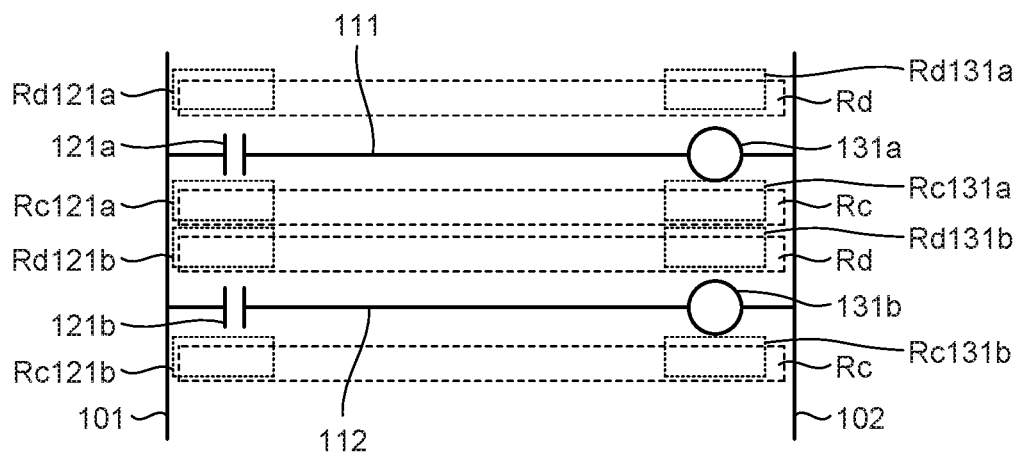
FIG. 32 is a diagram showing an example of division of character input regions in a ladder program according to the third embodiment.

FIG. 32 is a diagram showing an example in which character input regions in a ladder program are designated using the device name input base elements and the comment input base elements. As shown in the figure, in the ladder program, symbols of program constituent elements are placed like they are pierced by the connection lines 111 and 112 connecting the left bus 101 and the light bus 102. The connection lines 111 and 112 are placed in the up-down direction between the left bus 101 and the right bus 102. In the ladder program, in general, a device name for a symbol is written on the upper side of the symbol and comment information for the symbol is written on the lower side of the symbol. Therefore, in a region sandwiched by the connection lines 111 and 112, it is likely to be unclear whether input characters are a device name or comment information. Therefore, in the third embodiment, device name input base elements are placed on a device name input region Rd which is placed in a predetermined range on the upper side of the connection lines 111 and 112, and comment input base elements are placed on a comment input region Rc which is placed in a predetermined region on the lower side of the connection lines 111 and 112. Further, the device name input base elements and the comment input base elements are tied to each of the constituent elements.

A device name input region Rd121a is placed above the "a" contact symbol 121a of the connection line 111. A comment input region Rc 121a is placed below the "a" contact symbol 121a. A device name input region Rd131a is placed above the coil symbol 131a of the connection line 111. A comment input region Rc131a is placed below the coil symbol 131a. Further, a device name input region Rd121b is placed above the "a" contact symbol 121b of the connection line 112. A comment input region Rc121b is placed below the "a" contact symbol 121b. A device name input region Rd131b is placed above the coil symbol 131b of the connection line 112. A comment input region Rc131b is placed below the coil symbol 131b.

FIG. 33 is a diagram showing an example of a gesture definition. As in FIG. 2 or FIG. 3, a method of laying tile-like regions on the program editing screen and acquiring a route of a track with each region as one unit is illustrated. FIG. 33(a) is a diagram showing a positional relation of tile-like squares in the case of coarse regions. FIG. 33(b) is a diagram showing a positional relation of tile-like squares in the case of detailed regions. FIG. 33(c) is a diagram showing an example of a gesture definition in the case of FIGS. 33(a) and (b).

In this example, the gesture definition associates a type of a constituent element, a shape of a track, a direction of the track, and a command to be executed together. Information concerning the shape of the track and the direction of the track includes information for the coarse regions and information for the detailed regions. Coordinate information stored in the input gesture characteristic information is coordinates obtained on the basis of a coordinate system defined on the program editing screen as explained above. In this example, the information for coarse regions is the same as the information in the case of FIG. 2 or FIG. 3. The information for detailed regions can be distinguished more in detail than the case of the coarse regions of the track of the input operation by further dividing the squares in the coarse regions into nine. The shape of the track is defined using squares. That is, the shape of the track is distinguished by coordinates of squares through which the track has passes from a start point to an end point. The direction of the track is distinguished by the order of the squares through which the track has passed from the start point to the end point.

The sizes of the squares of the coarse regions and the detailed regions have physical dimensions that the user can adjust on the basis of the size of the constituent elements displayed on the program editing screen and the thickness of the input indicator. As the squares of the gesture definition, although a physical dimension can be defined, only a logical positional relation not having a physical specific dimension can be also defined. The gesture definition shown in FIG. 33 represents a definition of a logical positional relation.

Note that although squares are used in the explanation above, squares of other shapes such as a regular hexagonal shape can be also used.

Figure 34:
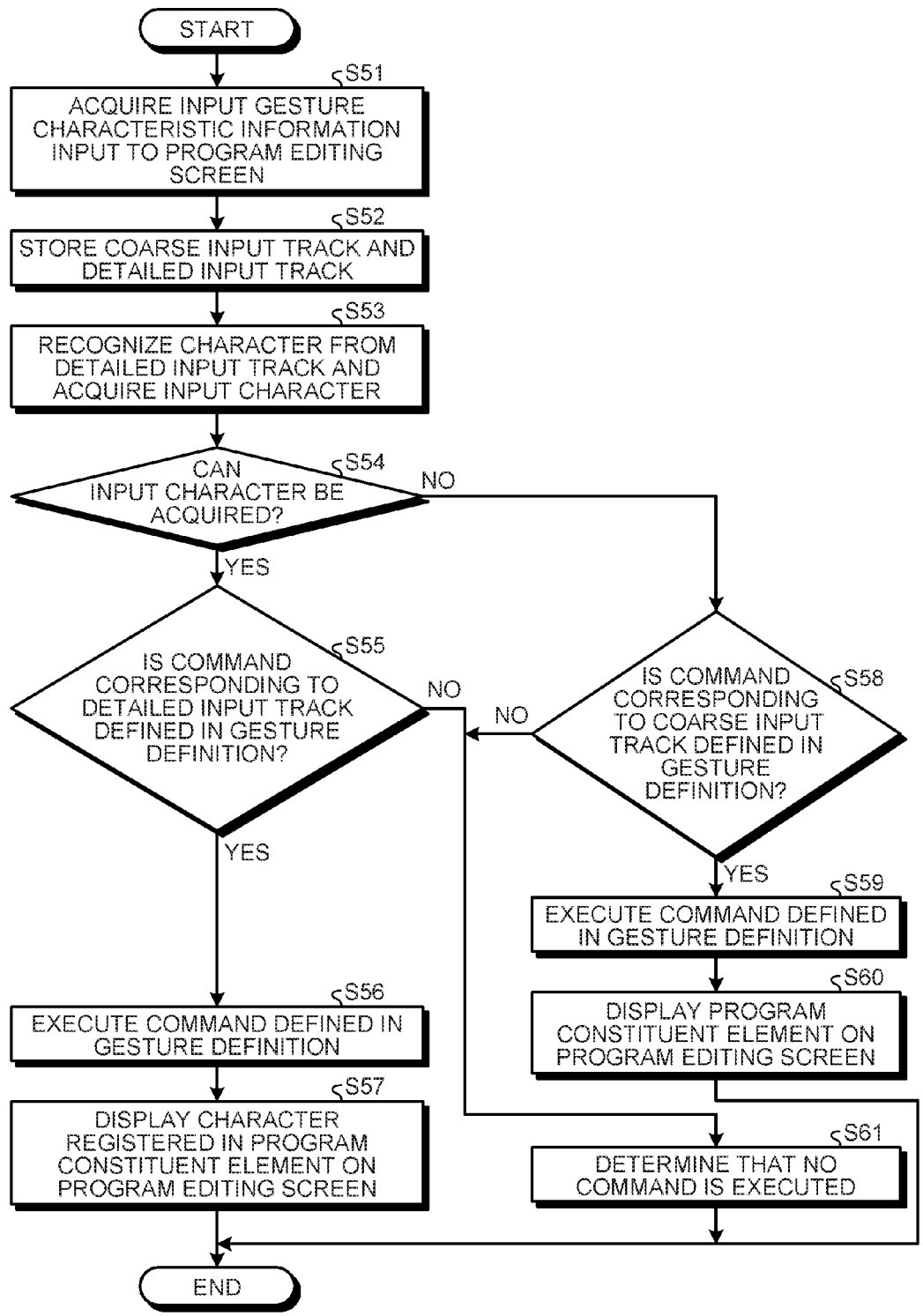
FIG. 34 is a flowchart showing an example of a processing procedure of a program editing method on a program editing screen on which no program constituent element is placed according to the third embodiment.

A program editing method is explained below. FIG. 34 is a flowchart for explaining an example of a processing procedure of a program editing method on the program editing screen on which no program constituent element is placed according to the third embodiment.

First, the input-gesture-characteristic-information acquiring unit 11 acquires input gesture characteristic information input to the program editing screen (step S51). The input gesture characteristic information includes coordinate information, which is a contact position of the input indicator, a track of the coordinates, and a direction of the track.

The input-gesture-characteristic-information acquiring unit 11 stores a coarse input track in units of coarse regions as information concerning the shape of the track and the direction of the track on the basis of the coordinate information and stores a detailed input track in units of detailed regions (step S52).

Subsequently, the processing executing unit 12 recognizes characters from the detailed input track and acquires input characters (step S53). Thereafter, the processing executing unit 12 judges whether the input characters could be acquired (step S54).

When the input characters could be acquired from the detailed input track (Yes at step S54), the processing executing unit 12 judges whether a command corresponding to a shape of the detailed input track and a direction of the detailed input track, that is, a command corresponding to the characters acquired at step S53 is defined in a gesture definition (step S55). When the command corresponding to the shape of the detailed input track and the direction of the detailed input track, that is, the command corresponding to the characters acquired at step S53 is present in the gesture definition (Yes at step S55), the processing executing unit 12 executes a command defined in the gesture definition (step S56), and displays characters registered in a program constituent element on the program editing screen (step S57). Consequently, the program editing processing ends.

On the other hand, when the input characters could not be acquired from the detailed input track at step S53 (No at step S54), the processing executing unit 12 judges whether a command corresponding to a shape of the coarse input track and a direction of the coarse input track is present in the gesture definition (step S58). When the command corresponding to the shape of the coarse input track and the direction of the coarse input track is present in the gesture definition (Yes at step S58), the processing executing unit 12 executes the command defined in the gesture definition (step S59) and displays the program constituent element on the program editing screen (step S60). Consequently, the program editing processing ends.

When the command corresponding to the shape of the coarse input track and the direction of the coarse input track is not present in the gesture definition concerning the operation target at step S58 (No at step S58) or when the command corresponding to the detailed input track and the direction of the detailed input track is not present in the gesture definition concerning the operation target at step S55 (No at step S55), the processing executing unit 12 determines that execution of any command is unnecessary (step S61) and the program editing processing ends. Note that the processing executing unit 12 can be configured to display an error message or can be configured to display no error message when determining that the command is not present.

Note that the input-gesture-characteristic-information acquiring unit 11 can be also configured to store the coarse input track and the detailed input track at step S52 while acquiring a track of input operation as the input gesture characteristic information at step S51. The processing executing unit 12 can be also configured to process simultaneously and in parallel with the processings at step S53 to S57 using the detailed input track and the processings at steps S58 to S60 using the coarse input track.

A specific example in performing input operation of character-like tracks on the program editing screen on which no program constituent element is placed is explained.

Figure 35:
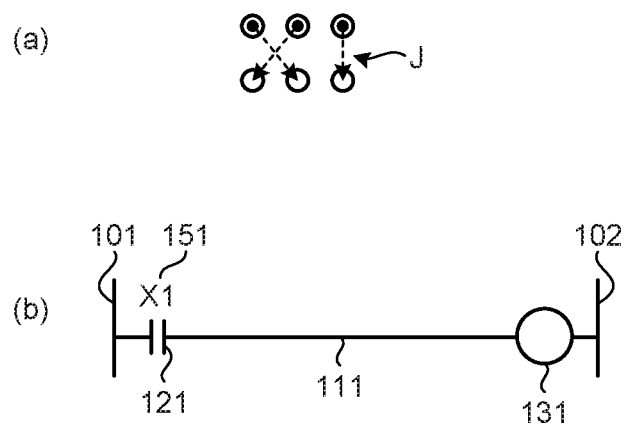
FIG. 35 is a diagram showing an example of a procedure of program editing processing according to the third embodiment.

FIG. 35 is a diagram showing an example of a procedure of program editing processing according to the third embodiment. In FIG. 35, input operation for placing the left bus 101, the right bus 102, and the connection line 111 connecting the two buses 101 and 102 and having the "a" contact symbol 121 and the coil symbol 131 is shown. First, as shown in FIG. 35(a), the user performs the input operation J on the program editing screen using the input indicator. The input-gesture-characteristic-information acquiring unit 11 acquires input gesture characteristic information from the input operation J and stores coarse input tracks and detailed input tracks.

At step S53, the processing executing unit 12 performs character recognition processing using the input gesture characteristic information (the detailed input track) and acquires input characters "X1". Subsequently, the processing executing unit 12 executes a command corresponding to a first one character "X" of the input gesture characteristic information. As a result, as shown in FIG. 35(b), program constituent elements are placed. In this example, program constituent elements, those are the left bus 101, the right bus 102, and the connection line 111 connecting the two buses 101 and 102 and having the "a" contact symbol 121 and the coil symbol 131, are placed in the program editing screen. The recognized input characters "X1" are placed in an upper region on the "a" contact symbol 121 of the program constituent elements as a device name 151.

This is an example. In the gesture definition, other definitions can be also defined for a combination of a gesture and a command to be executed.

In FIG. 35, the example is shown in which the addition of the program to the program editing screen and the character input to the device name of the program constituent element are performed by performing the input operation of the character-like tracks. The character input can be also executed by other methods. FIG. 36 is a diagram showing an example of a procedure of program editing processing according to the third embodiment. By performing predetermined input operation J (e.g., in this example, a tap operation is performed) on the program editing screen 200 as shown in (a), as shown in (b), a character input panel 210 appears on the program editing screen 200 and a character input region 220 is placed in the region where the input operation J has been performed. Then, by tapping characters on the character input panel 210 as shown in (c), a program 100 is placed as shown in (d). Note that the character input panel 210 can be also configured as illustrated in (b) and (c) to include alphabets "X", "Y", "M", and "L", numbers "0 (00)" to "9", and commands "←(back space)", "cancel", and "determine". Because characters used in the ladder program are determined, not all the alphabets are included and only the alphabets often used are included. Consequently, it is easy to tap (choose) characters without going against the rules. It is made possible to reduce the ratio of the character input panel 210 in the program editing screen 200 and improve visibility of the program editing screen 200.

For example, the character input panel 210 can be also arranged such that a list of variable names called "labels" used in association with device names is also placed to make it easy to input (choose) "labels" without spelling mistakes.

Figure 37:
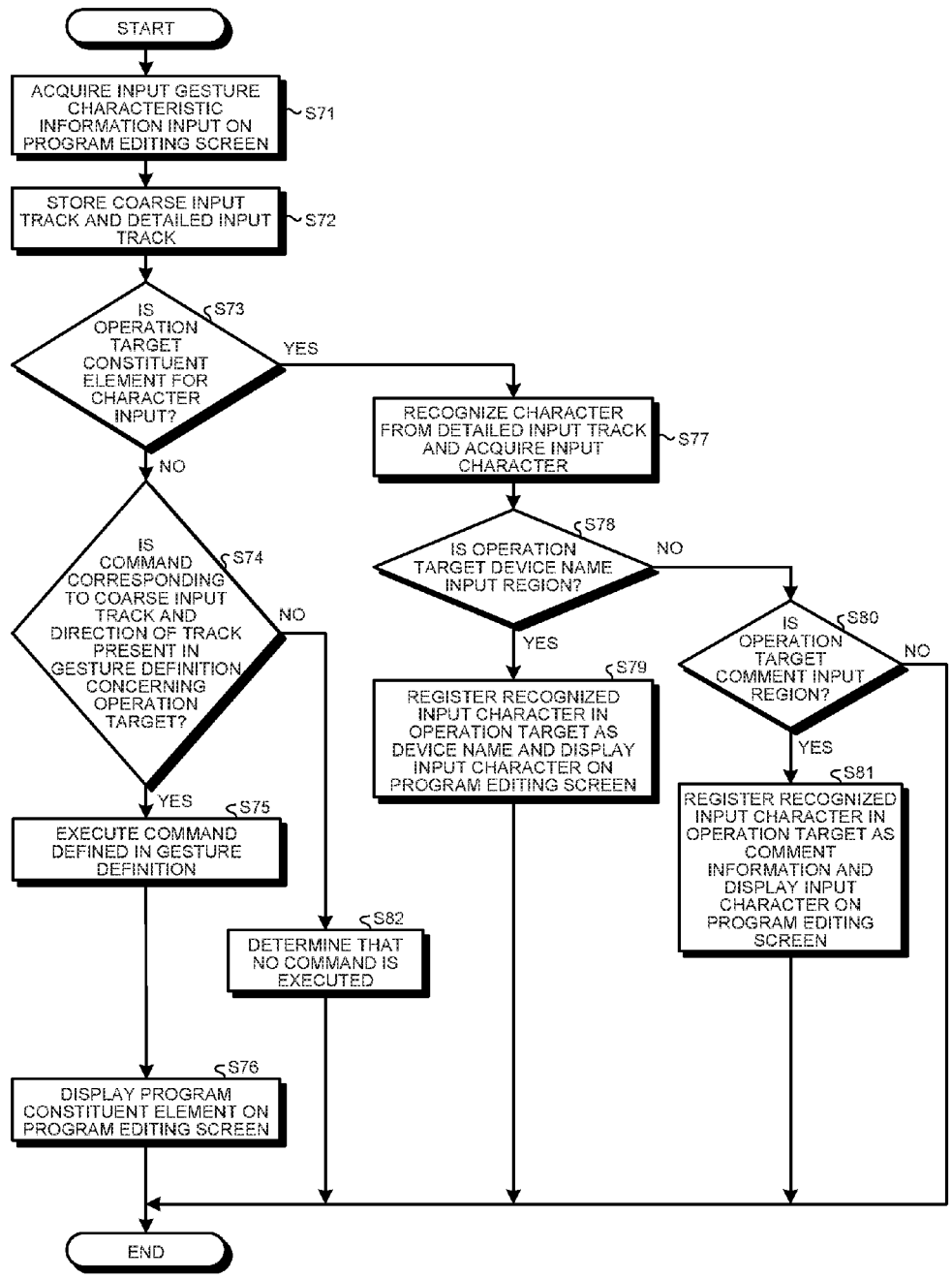
FIG. 37 is a flowchart showing an example of a processing procedure of a program editing method on the program editing screen on which one or more program constituent elements are placed according to the third embodiment.

A procedure of program editing processing when program constituent elements are placed in the program editing screen is explained below. FIG. 37 is a flowchart showing an example of a processing procedure of a program editing method performed on the program editing screen performed when program constituent elements are placed according to the third embodiment. First, the input-gesture-characteristic-information acquiring unit 11 acquires input gesture characteristic information input on the program editing screen (step S71).

Subsequently, the input-gesture-characteristic-information acquiring unit 11 stores input gesture characteristic information including a coarse input track in coordinates in units of coarse regions and a detailed input track in coordinates in units of detailed regions according to region management information (step S72). The processing executing unit 12 judges whether an operation target is a constituent element for a character input (step S73).

When the operation target is not the constituent element for the character input (No at step S73), the processing executing unit 12 determines whether a command corresponding to a shape of the coarse input track and a direction of the coarse input track is present in a gesture definition concerning the operation target (step S74). The processing executing unit 12 specifies, on the basis of coordinate information stored in the input gesture characteristic information including the coarse input track, a constituent element through which the track has passed. The processing executing unit 12 locates the constituent element as the operation target.

When a command corresponding to the shape of the coarse input track and the direction of the coarse input track is present in the gesture definition concerning the operation target (Yes at step S74), the processing executing unit 12 executes the command defined in the gesture definition (step S75). The ladder program after the execution of the command is displayed on the program editing screen (step S76). Consequently, the program editing processing ends.

On the other hand, when the operation target is the constituent element for the character input at step S73 (Yes at step S73), the processing executing unit 12 recognizes characters from the detailed input track and acquires input characters (step S77).

Subsequently, the processing executing unit 12 judges, on the basis of the coordinate information stored in the input gesture characteristic information, whether the operation target is the device name input region Rd (step S78). When the operation target is the device name input region Rd (Yes at step S78), the processing executing unit 12 registers, on the basis of the command defined in the gesture definition, recognized characters as device name information of a program constituent element associated with the device name input region Rd and displays the program editing screen on which the recognized input characters are placed as a device name in a device name display region of the program constituent element (step S79). Consequently, the program editing processing ends.

Further, when the operation target is not the device name input region Rd at step S78 (No at step S78), the processing executing unit 12 judges whether the operation target is the comment input region Rc (step S80). When the operation target is the comment input region Rc (Yes at step S80), the processing executing unit 12 registers, on the basis of the command defined in the gesture definition, the recognized characters as comment information of a constituent element associated with the comment input region Rc and displays the program editing screen on which the recognized input characters are placed in a comment display region of the program constituent element (step S81). Consequently, the program editing processing ends.

When the command corresponding to the shape of the coarse input track and the direction of the coarse input track is not present in the gesture definition concerning the operation target at step S74 (No at step S74), the processing executing unit 12 determines that execution of any command is unnecessary (step S82) and the program editing processing ends. When the operation target is not the comment input region Rc at step S80 (No at step S80), the program editing processing ends.

Specific examples of procedures of program editing processing are explained below regarding case (1) when a connection line is replaced with a program constituent element, (2) when a device name is placed on a program constituent element already placed, and (3) when characters of a device name are input using a list of characters on the program editing screen on which program constituent elements are already placed.

Figure 38:
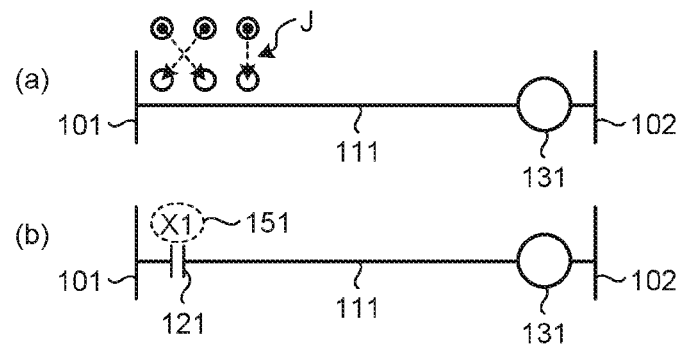
FIG. 38 is a diagram showing an example of a procedure of program editing processing according to the third embodiment.
Figure 39:
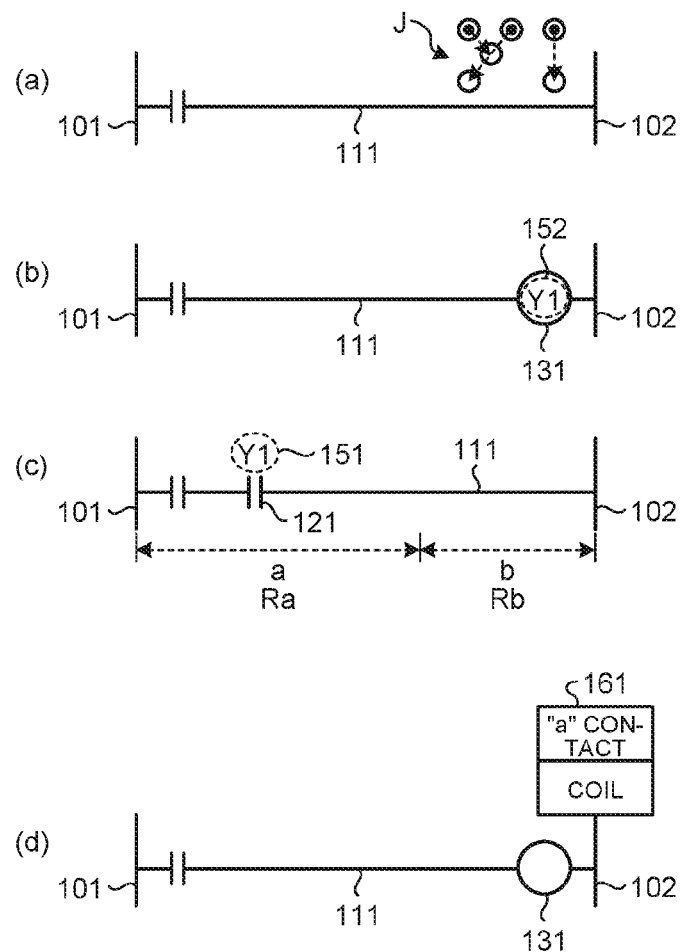
FIG. 39 is a diagram showing an example of a procedure of program editing processing according to the third embodiment.
Figure 40:
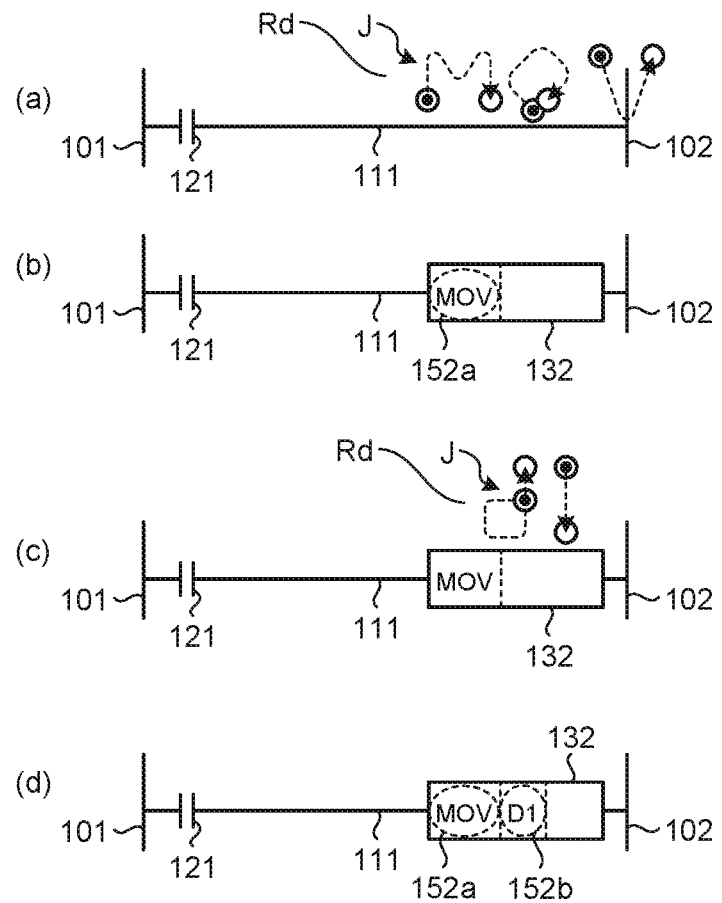
FIG. 40 is a diagram showing an example of a procedure of program editing processing according to the third embodiment.

(1) A Case in which a Connection Line is Replaced by a Program Constituent Element:

FIG. 38 to FIG. 40 are diagrams showing examples of procedures of program editing processing according to the third embodiment. In FIG. 38, input operation for inputting a device name to the device name input region and placing an "a" contact symbol on the program editing screen on which the left bus 101, the right bus 102, and the connection line 111 connecting the two buses 101 and 102 and having the coil symbol 131 are placed is shown.

First, as shown in FIG. 38(a), the user performs the input operation J in the device name input region above the connection line 111 and closer to the left than the center of the connection line 111 on the program editing screen using the input indicator. Input gesture characteristic information is acquired according to the input operation J. According to the input gesture characteristic information, because a device name input base element is present below a track of the input operation J, the processing executing unit 12 determines that an operation target is the device name input base element.

Thereafter, the processing executing unit 12 performs character recognition and acquires input characters "X1" from the input gesture characteristic information (a detailed input track). Subsequently, the processing executing unit 12 executes a command corresponding to a first one character "X" of the input characters on the basis of the gesture definition. As a result, as shown in FIG. 38(b), program constituent elements are placed. In this example, a part of the connection line 111 in a position corresponding to the region where the input operation J has been performed is replaced by the "a" contact symbol 121, and the recognized input characters "X1" are placed in the device name 151 at the upper region of the "a" contact symbol 121 that is a program constituent element.

In FIG. 39, input operation for inputting a device name to the device name input region and placing a coil symbol or an "a" contact symbol on the program editing screen on which the left bus 101, the right bus 102, and the connection line 111 connecting the two buses 101 and 102 and having the "a" contact symbol are placed is shown.

First, as shown in FIG. 39(a), the user performs the input operation J in the device name input region above the connection line 111 and closer to the right than the center of the connection line 111 on the program editing screen using the input indicator. Input gesture characteristic information is acquired from the input operation J. According to the input gesture characteristic information, because a device name input base element is present under a track of the input operation J, the processing executing unit 12 determines that an operation target is the device name input base element.

Thereafter, the processing executing unit 12 performs character recognition and acquires input characters "Y1" from the input gesture characteristic information (a detailed input track). Subsequently, the processing executing unit 12 executes a command corresponding to a first one character "Y" of the input characters. As a result, as shown in FIG. 39(b), program constituent elements are placed. In this example, a part of the connection line 111 in a position corresponding to the region where the input operation J has been performed is replaced by the coil symbol 131, and the recognized input characters "Y1" are placed to be superimposed on the coil symbol 131 as the device name 152.

Note that, in the ladder program, "Y" is a device name indicating a coil of an output device and is also a device name indicating an input device representing an energization state of the coil. Therefore, as shown in (c), by deciding in advance a region serving as the output device (the coil symbol 131) and a region serving as the input device (the "a" contact symbol 121) on the connection line 111, the type of a symbol to be placed can be also changed according to in which region the input operation has been performed. In this example, a region between the left bus 101 and the right bus 102 is divided into a and b, and the divided regions are represented as Ra and Rb. When an input of a gesture "Y" is performed on the region Rb, as shown in (b), the coil symbol 131 is placed together with the device name 152. When the input of the gesture "Y" is performed on the region Ra, as shown in (c), the "a" contact symbol 121 is placed together with the device name 151.

In the device name input region Rd placed in the region on the upper side of the connection line 111, when a program constituent element is placed on the connection line 111 corresponding to coordinate information of the input gesture characteristic information by input operation "Y" as shown in (d), it can be also arranged such that a choice panel 161 for making it possible to choose whether a symbol to be placed is an ""a" contact" or a "coil" appears.

In FIG. 39, the examples concerning the "a" contact symbol and the coil symbol are explained. Similar program editing processing for other program constituent elements can be also performed by defining a command in the gesture definition. For example, when the input operation J shown in FIG. 14(a) is performed on the region Ra, a condition input frame can be placed instead of the instruction frame.

In FIG. 40, input operation for inputting a device name to the device name input region and placing an instruction frame on the program editing screen on which the left bus 101, the right bus 102, and the connection line 111 connecting the two buses 101 and 102 and having the "a" contact symbol are placed and further setting an argument in the instruction frame is shown.

First, as shown in FIG. 40(a), the user performs the input operation J in the device name input region above the connection line 111 and closer to the right than the center of the connection line 111 on the program editing screen using the input indicator. Input gesture characteristic information is acquired from the input operation J.

Thereafter, the processing executing unit 12 performs character recognition and acquires input characters "MOV" from the input gesture characteristic information (a detailed input track). Subsequently, the processing executing unit 12 executes a command corresponding to a first one character "M" of the input gesture characteristic information. In this example, characters "OV" follow as second and subsequent characters and correspond to an instruction name. Therefore, the instruction frame 132 is placed in a location on the connection line 111 corresponding to the region where the input operation J has been performed, and the recognized input characters "MOV" are placed over a predetermined position in the instruction frame 132 of the program constituent element as an "MOV" instruction 152a.

Note that, in FIGS. 40(a) and (b), the instruction frame 132 including an instruction name is placed by the characters drawn on the device name input region Rd. In the instruction frame 132, usually, input operation for an argument is necessary apart from the instruction sentence. Therefore, when characters are continuously input by the input operation J in the device name input region Rd on the instruction frame 132 as shown in (c), an argument 152b can be input in the instruction frame 132 as shown in (d). When there are more arguments, this process can be repeated by the number of arguments.

These are examples. In the gesture definition, other definitions can be performed for a combination of a shape of a track and a direction of the track of input operation and a command to be executed.

As explained above with reference to FIG. 38 to FIG. 40, by performing the input operation of the character-like tracks, a command corresponding to input gesture characteristic information is executed on the basis of a gesture definition concerning a base element, and the base element is replaced by other program constituent elements, the device name of which is registered.

That is, because the program constituent element can be added using the character-like tracks, consequently there is an effect that memorization of tracks for input operation becomes easier for the user, and it is made possible to learn an operation method of editing a program described using symbols in a shorter period in the tablet terminal.

In addition, designation of an operation target and designation of a command performed on the operation target can be simultaneously performed. Registration of character information can also be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command performed on the operation target. Therefore, there is an effect that it is made possible to effectively use the program editing screen.

Figure 41:
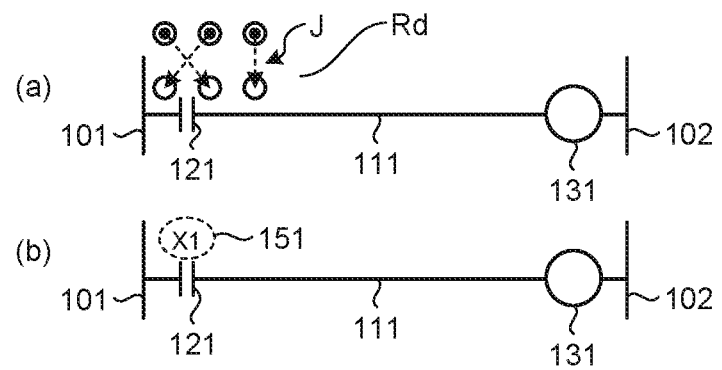
FIG. 41 is a diagram showing an example of a procedure of program editing processing according to the third embodiment.

(2) A Case in which a Device Name is Registered on a Program Constituent Element Already Placed:

FIG. 41 is a diagram showing an example of a procedure of program editing processing according to the third embodiment. In FIG. 41, input operation for placing a device name in the device name input region Rd of the "a" contact symbol 121 on the program editing screen in a state in which the connection line 111 on which the "a" contact symbol 121 and the coil symbol 131 are placed is placed and neither a device name nor a comment has been added to the symbols is shown.

First, as shown in FIG. 41(a), the user performs the input operation J in the device name input region Rd present above the "a" contact symbol 121 in the program editing screen using the input indicator. Input gesture characteristic information is stored according to the input operation J.

Thereafter, the processing executing unit 12 performs character recognition processing and acquires input characters "X1" according to the input gesture characteristic information (a detailed input track). Because the input operation J does not traverse the connection line 111, an operation target is specified as the device name input region Rd. A command is executed on the basis of a gesture definition concerning the device name input region Rd, and a device name is registered in the "a" contact symbol 121. As a result, as shown in FIG. 41(b), the input characters "X1" are placed above the "a" contact symbol 121 as the device name 151. Although not shown in the figure, when input operation of character-like tracks is performed on the comment input region, comment information is registered in the "a" contact symbol through the same process.

As explained with reference to FIG. 41, by performing the input operation J of character-like tracks, a command corresponding to input gesture characteristic information is executed on the basis of a gesture definition concerning a base element, and a device name is registered in a program constituent element.

That is, character information can be registered in the program constituent element using character-like tracks. Therefore, there is an effect that memorization of tracks for input operation becomes easier for the user and it is made possible to learn an operation method of the editing a program described using symbols in a shorter period in the tablet terminal.

In addition, designation of an operation target and designation of a command performed on the operation target can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command to be performed on the operation target. Therefore, there is an effect that it is made possible to effectively use the program editing screen.

Figure 42:
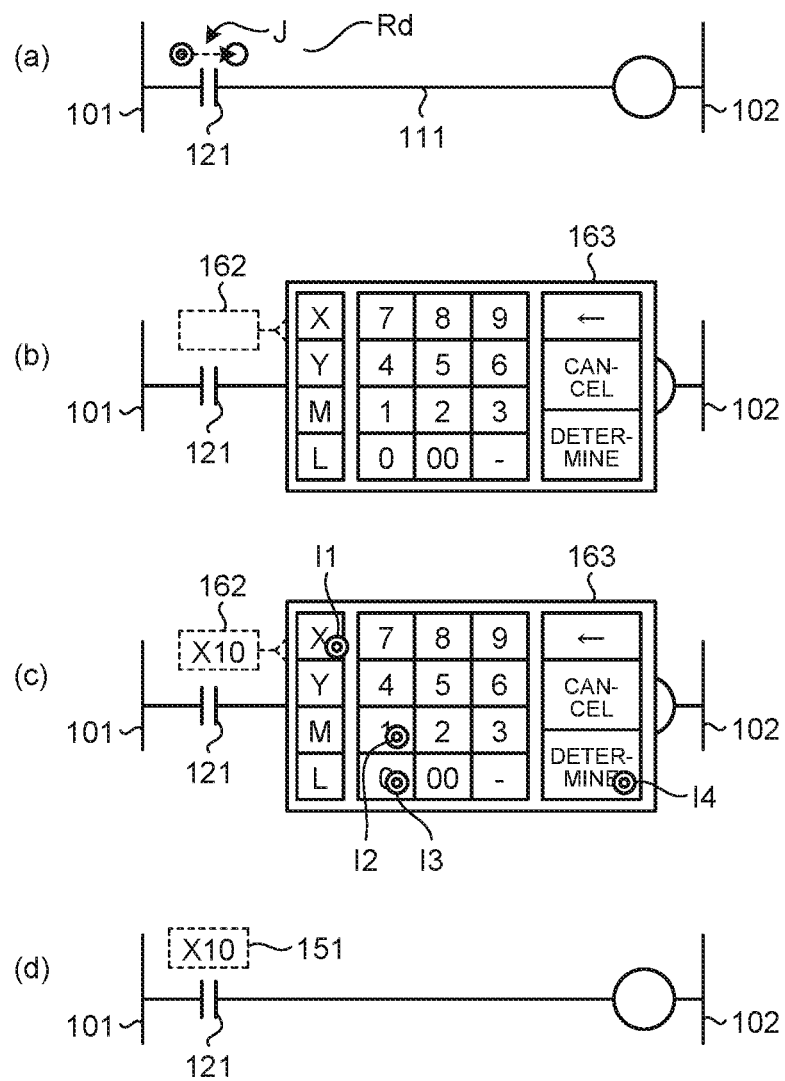
FIG. 42 is a diagram showing an example of a procedure of program editing processing according to the third embodiment.
Figure 43:
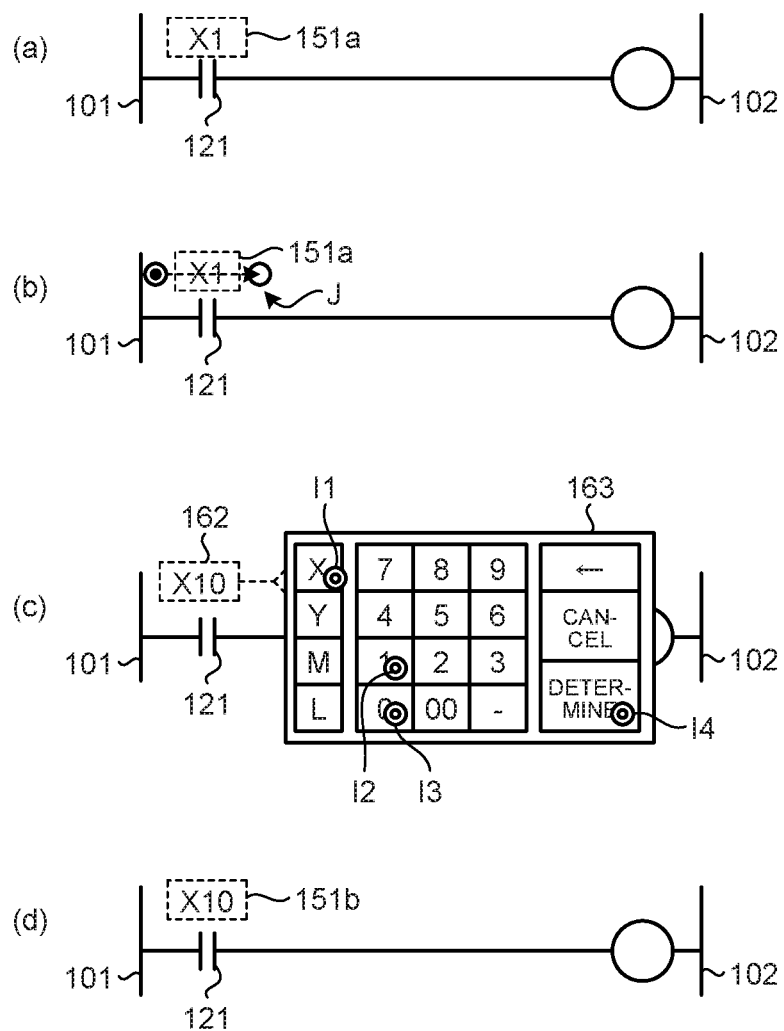
FIG. 43 is a diagram showing an example of a procedure of program editing processing according to the third embodiment.

(3) An Example in which Characters of a Device Name are Input Using a List of Characters In the above explanations, the processing for registering, in the program constituent element, the device names or the comment information using the character-like tracks in the gesture definition is explained. In the tablet terminal, a character input method is not limited to an input method of using tracks. For example, an input method using a list of characters (hereinafter referred to as "character input panel") is sometimes also performed. In this case, a command for displaying a character input panel and storing characters input using the panel in a specific region of an operation target can be defined in the gesture definition, and the processings at step S79 and subsequent steps can be executed after the input by the character input panel. FIG. 42 and FIG. 43 are diagrams showing an example of a procedure of program editing processing according to the third embodiment.

In FIG. 42, the input operation J is performed in the device name input region Rd on the upper side of the "a" contact symbol 121 as shown in (a). When the input operation J for character input processing is performed, a character input panel 163 appears as shown in (b). A character input region 162 is also provided in the region where the input operation J has been performed. Thereafter, as shown in (c), the user taps characters or numbers displayed in the character input panel 163, whereby the characters or the numbers are input to the character input region 162. In this example, the user taps l1, l2, and l3 in this order. Finally, the user taps a determination button (l4), whereby characters input to the character input region 162 are decided, and the characters are registered in the program as shown in (d). Because the input processing is performed in the device name input region Rd at the upper side of the "a" contact symbol 121, the input characters "X10" are registered in the ladder program as the device name 151 of the "a" contact symbol 121.

In FIG. 43, a case of correcting characters is shown. In this case, when the input operation J is performed as shown in (b) on a device name 151a in which characters "X1" are placed above the "a" contact symbol 121 as shown in (a), the character input panel 163 appears as shown in (c), and the character input region 162 is provided in the region where the input operation J has been performed. When the user taps characters, numbers, or the like displayed in the character input panel 163, whereby the content of the characters, the numbers, or the like is input to the character input region 162. In this example, the user taps l1, l2, and l3 in this order and inputs "X10". Finally, the user taps the determination button (l4), whereby the characters input to the character input region 162 are decided, and the input characters "X10" are registered in the ladder program as a new device name 151b of the "a" contact symbol 121 as shown in (d).

Note that, in FIG. 42 and FIG. 43, the input operation for a character input is performed in the device name input region Rd. The input operation performed in the comment input region is the same. Although the input concerning the device name or the comment information are explained above, the same processing can be applied to the instruction frame 132 as shown in FIG. 40(b) and others.

Note that, in FIG. 42 and FIG. 43, the linear track in the horizontal direction is used as the input operation. Other input operations can be also applied to the character input processing. For example, tap operation or double tap operation can be applied instead of the linear track in the horizontal direction.

In the above explanations, when the input operation of character-like shapes is performed, the processing concerning the placement of the program constituent element or the placement of the device name or the comment information of the program constituent element is performed. Other program editing processing can be also defined by the gesture definition. For example, in the example shown in FIG. 14 in the second embodiment, the instruction frame 132 is placed, but the same processing can be applied to an input of characters to the instruction frame 132.

In FIG. 42 and FIG. 43, the example of the placement of the device name is shown. By performing the same input operation in the device name input region on the upper side of the connection line 111 where no program constituent element is placed, a program constituent element, the device name of which is placed in a position above the connection line 111 corresponding to coordinates where the input operation has been performed, can be placed.

With such a configuration, when the character input processing is performed in upper or lower regions of a program constituent element where nothing is placed, a device name or comment information is registered in the program constituent element, and the ladder program is updated. When the character input processing is performed in upper and lower regions of a program constituent element where a character is placed, a device name or comment information of the program constituent element is changed, and the ladder program is updated on the basis of the change.

That is, the program constituent element can be edited using the track similar to the characters. Therefore, there is an effect that storing of a track used for the input operation becomes easy for the user and it is made possible to learn, in the tablet terminal, in a shorter period, an editing method of a program described using symbols.

In addition, designation of an operation target, designation of a command performed on the operation target, and editing of character information can be simultaneously performed. Therefore, there is an effect that it is made possible to edit a program described using symbols with less input operation labor on the tablet terminal. Further, because a process for designation of a command to be performed on the operation target from a list of choices is unnecessary, it is made unnecessary to display, on the program editing screen, a list of choices for designating a command performed on the operation target. Therefore, there is an effect that it is made possible to effectively use the program editing screen.

Note that, in the case of the character input by the input operation for drawing the track, for example, it is also likely that the device name input region cannot be distinguished, and there is a possibility that the input operation is performed on a region above the device name input region of the program editing screen and characters desired to be input to the device name input region are input to the comment input region. In order to prevent the input operation from being mistakenly performed on a wrong region, it can be also arranged such that a figure for enabling distinction of a region where character strings of an input of a device name, an input of a comment, and the like are input by the input operation for drawing the track can be displayed on the program editing screen.

Figure 44:
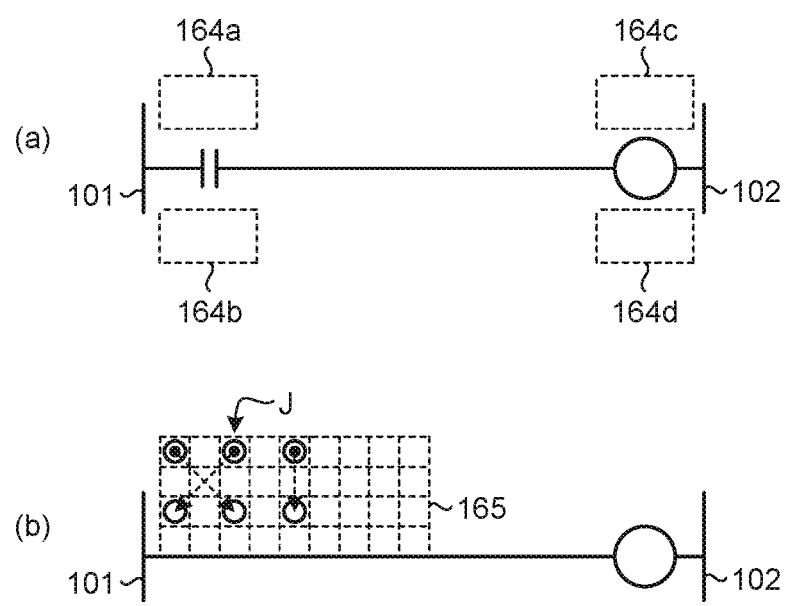
FIG. 44 is a diagram showing an example of visible frames to input characters for the input operation by drawing tracks according to the third embodiment.

FIG. 44 is a diagram showing an example of guide display of the character input regions according to the third embodiment. In FIG. 44(a), character-input-operation receiving regions 164a, 164b, 164c, and 164d are clearly shown on the program editing screen such that regions where input operation of a device name or comment information can be recognized by the user.

In FIG. 44(b), a guide line 165 indicating a region of recognition processing is displayed on the program editing screen while the user is performing the input operation.

In the third embodiment, when the input operation of character-like tracks is performed on the program editing screen, if an operation target is a constituent element to which characters can be input, the input characters are identified according to a track of input operation or a shape of the track and a direction of the track included in input gesture characteristic information including a detailed input track. A command corresponding to the detailed input track is specified according to a gesture definition and executed. The input characters are placed as the device name, the comment of the operation target. Consequently, according to the input operation of character-like tracks, it is made possible to place a program constituent element in a desired position together with a device name or comment information of the program constituent element. Therefore, there is an effect that it is made possible to edit a program described using symbols with less input operation labor according to the operation for drawing the track modeling the shapes of the characters.

Fourth Embodiment

When programming is performed on an initial program editing screen on which only a left bus and a right bus are placed, usually, a connection line is placed first. Therefore, in the case of the initial program editing screen and in the case of a program editing screen on which other program constituent elements are placed, the resolution of input gesture characteristic information to be acquired can be changed. An example in those cases is explained below.

Figure 45:
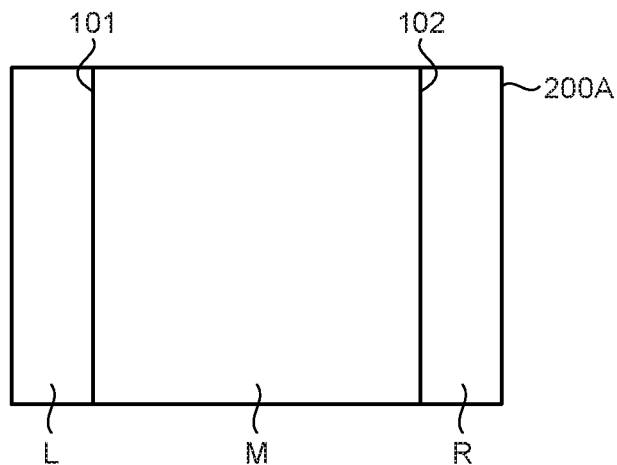
FIG. 45 is a diagram showing an example of a program editing screen.

On a program editing screen on which only a left bus and a right bus are placed, the program editing screen can be divided in units of large regions larger than the second division unit. FIG. 45 is a diagram showing an example of a program editing screen on which only buses are placed. As shown in the figure, a program editing screen 200A on which only buses are placed is in a state in which the left bus 101 and the right bus 102 are placed in predetermined positions in advance. The program editing screen 200A on which only the buses are placed includes the region L further on the left side than the left bus 101 (left side base elements), the region M sandwiched by the left bus 101 and the right bus 102 (symbol-locatable base elements), and a region R further on the right side than the right bus 102 (right side base elements). Note that the regions L, M, and R are referred to as large regions. Note that, although the example shows the case in which the buses are displayed on the program editing screen, the initial program editing screen can be also configured with the large regions and without displayed buses.

In this case, the region management information includes information associating the large regions with coarse regions. Specifically, the region management information includes a coordinate range corresponding to the coarse regions and the coarse regions included in the large regions. Note that, in the fourth embodiment, as an input operation of character-like tracks is not explained, detailed regions are not included in the region management information unlike the third embodiment. However, when the input operation is detected in coordinates in units of detailed regions as in the third embodiment, the detailed regions can be also provided.

When program constituent elements other than the left bus and the right bus are not placed on the program editing screen, the input-gesture-characteristic-information acquiring unit 11 stores a large input track (a third input track). When program constituent elements other than the left bus and the right bus are placed on the program editing screen, the input-gesture-characteristic-information acquiring unit 11 stores a coarse input track.

FIG. 46 is a diagram showing an example of a gesture definition. As in FIG. 2, a method of laying tile-like constituent elements on the program editing screen and acquiring tracks on the basis of each element is illustrated. FIG. 46(a) is a diagram showing a positional relation of tile-like squares in the gesture definition. FIG. 46(b) is a diagram showing a positional relation of tile-like squares on the program editing screen. FIG. 46(c) is a diagram showing an example of a gesture definition in the case of FIGS. 46(a) and (b). Note that the left side base elements are laid in L, the symbol-locatable base elements are laid in M, and the right side base elements are laid in R.

In this example, the gesture definition associates a shape of a track of input operation and a direction of the track, a constituent element, and a command applied to the constituent element together. A track of a gesture is a track of coordinates obtained on the basis of a coordinate system defined on the program editing screen as explained above. A program constituent element drawn in a gesture drawing region is defined with respect to drawing of the track. The coarse regions are the same as the case of FIG. 2 or FIG. 3. Concerning the large regions, the program editing screen is divided into the regions L, M, and R, and tracks of input operation can be acquired more roughly than in the case of the coarse regions. In the gesture definition which is illustrated in FIG. 46(c), shapes of tracks are defined for the regions L, M, and R. That is, the shape of the track is distinguished according to the direction from a start point to an end point, additionally coordinates of the regions L, M, and R through which the track has passed from the start point to the end point, and the direction of the track is distinguished according to the order of the regions L, M, and R through which the track has passed from the start point to the end point.

The processing executing unit 12 executes, on the basis of the large input track or the coarse input track and coordinate information stored in the input gesture characteristic information stored by the input-gesture-characteristic-information acquiring unit 11, a command corresponding to a combination of the regions through which the track has pass and performs processing for displaying a ladder program reflecting results of the execution of the command on the program editing screen.

A processing procedure of the program editing method by the program for program editing processing is explained below. When the operation target is a base element at step S33 of the flowchart of FIG. 8 in the second embodiment, the input-gesture-characteristic-information acquiring unit 11 only has to store a large input track in units of the large regions, and at step S33, the processing executing unit 12 only has to judge on the basis of the input gesture characteristic information whether a track corresponding to the large input track is present.

Further, when the operation target is a program constituent element at step S33, the input-gesture-characteristic-information acquiring unit 11 only has to store a coarse input track in units of coarse regions in the input gesture characteristic information, and the processing executing unit 12 only has to judge whether a track corresponding to a combination of the coarse input track and the operation target (the constituent element) is present. Note that the other processing is the same as, for example, the processing explained with reference to FIG. 8. Therefore, explanation of the program editing processing concerning FIG. 46 is omitted in this description.

In the fourth embodiment, the program editing screen 200A is divided into the region L further on the left side than the left bus 101, the region R further on the right side than the right bus 102, and the region M between the left bus 101 and the right bus 102. The connection line 111 serving as a basic constituent element of a ladder program, or the "a" contact symbol 121, the coil symbol 131 generally used in the ladder program, and the connection line 111 connecting the "a" contact symbol 121 and the coil symbol 131 and the like are placed on the program editing screen 200A by a gesture moving from the region L to the region R via the region M (or a gesture of a track opposite to the gesture). Consequently, at an initial stage for creating a ladder program, it is made possible to perform acquisition of a gesture in units of regions larger than the detailed regions or the coarse regions in the third embodiment and place basic program constituent elements. As a result, there is an effect that it is made possible to suppress load of processing applied to program editing processing compared with the third embodiment.

Fifth Embodiment

In a fifth embodiment, a replacement of an instruction statement in an instruction frame is explained.

The input-gesture-characteristic-information acquiring unit 11 according to the fifth embodiment stores a coarse input track and a detailed input track.

When an instruction frame is present in constituent elements of a region through which a track of input operation passes, the processing executing unit 12 executes a command on the basis of a gesture definition concerning the instruction frame. Specifically, when character-like tracks of predetermined characters are input on the instruction frame, the processing executing unit 12 replaces an instruction statement in the instruction frame according to content defined in the gesture definition.

In the gesture definition concerning the instruction frame, processing performed when a predetermined track is drawn is further specified. Specifically, the gesture definition has a definition for switching, according to a shape of the track and the direction of the track, commands to be executed according to a type of an instruction statement already stored.

Figure 47:
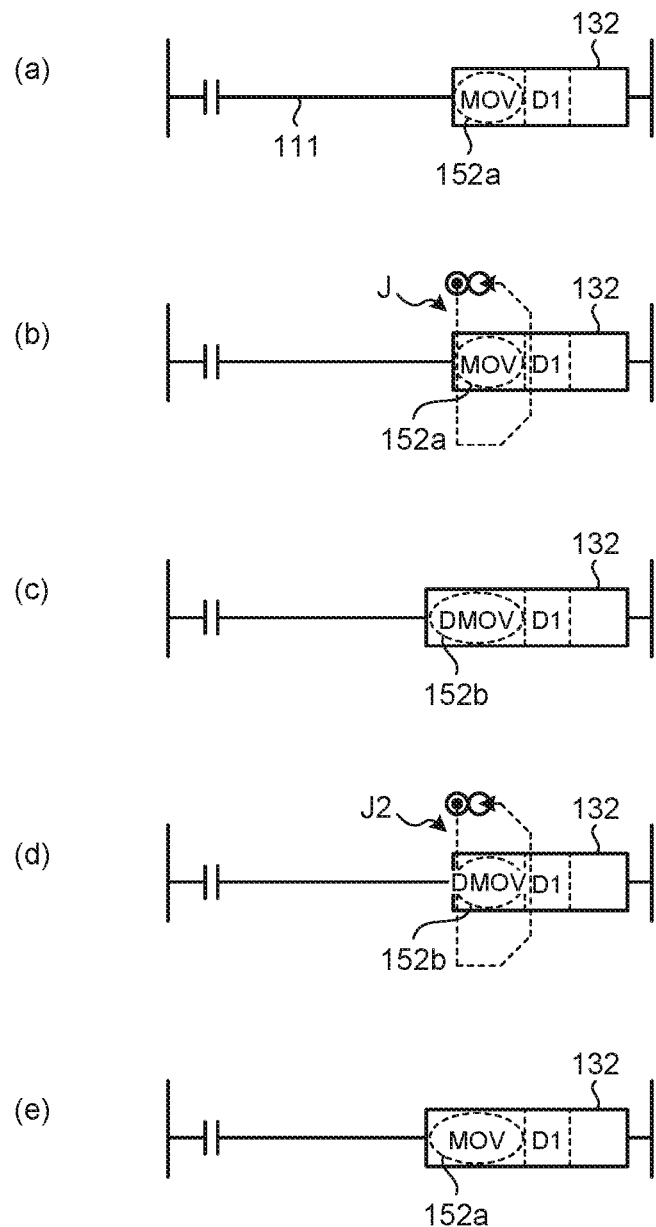
FIG. 47 is a diagram showing an example of a procedure of program editing processing according to a fifth embodiment.

FIG. 47 is a diagram showing an example of a procedure of program editing processing according to the fifth embodiment. As shown in (a), the instruction frame 132, to which the "MOV" instruction 152a is input, is placed in a ladder program. When the input operation J which looks like a character "D" is drawn to stride over the instruction frame 132 on the "MOV" instruction 152a of the instruction frame 132 as shown in (b), the "MOV" instruction 152a for performing a 16-bit data operation is replaced by a "DMOV" instruction 152b for performing a 32-bit data operation as shown in (c).

Further, when the input operation J2 of a character-like track which looks like a character "D" is performed to stride over the instruction frame 132 on the "DMOV" instruction 152b of the instruction frame 132 as shown in (d), the "DMOV" instruction is changed to the "MOV" as shown in (e).

In the fifth embodiment, the instruction statement in the instruction frame 132 is replaced by performing a predefined input operation on the instruction frame 132. Therefore, there is an effect that it is made possible to easily perform a change of the instruction statement registered in the constituent element.

Sixth Embodiment

In a sixth embodiment, the program constituent elements placed in the embodiments explained above are changed.

The processing executing unit 12 is further configured to include a function of displaying, when predefined input operation is performed on a program constituent element, one or more program constituent elements similar to the program constituent element as choices for replacement. The choices are acquired from, for example, a choice list in which symbols having similar shapes are collected. The choice list is included in, for example, a gesture definition. The choices are displayed in an element choice panel. The element choice panel appears on a program editing screen near the position where the input operation has been performed.

Figure 48:
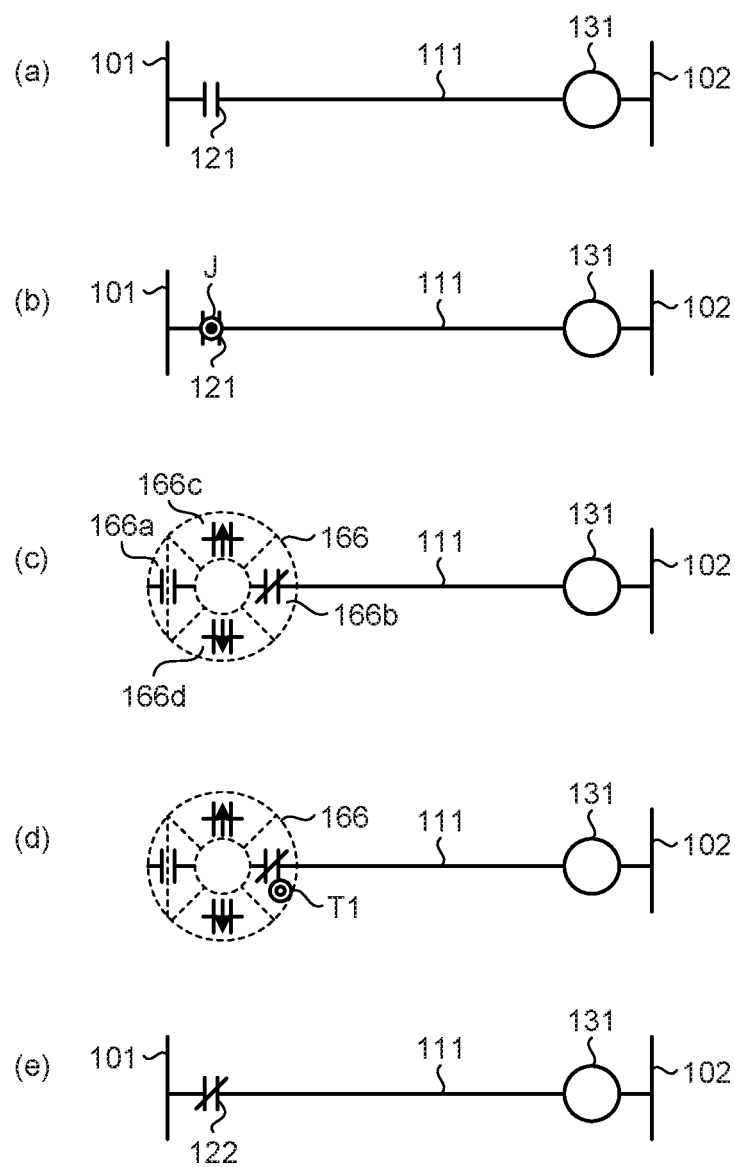
FIG. 48 is a diagram showing an example of a procedure of specific program editing processing according to a sixth embodiment.

FIG. 48 is a diagram showing an example of a specific procedure of program editing processing according to the sixth embodiment. In FIG. 48(a), a ladder program is described in which the "a" contact symbol 121 and the coil symbol 131 are placed between the left bus 101 and the right bus 102 and connected by the connection line 111. In the gesture definition, choice of a symbol to be changed and display of the change choice list are defined as being specified by placing an input indicator on the "a" contact symbol 121 for a predetermined time or more as the input operation J as shown in (b). When the input operation J is performed on the "a" contact symbol 121, the input-gesture-characteristic-information acquiring unit 11 stores input gesture characteristic information. The processing executing unit 12 acquires, on the basis of a command defined in the gesture definition, the choice list including symbols similar to the "a" contact symbol 121 from the gesture definition. Subsequently, the processing executing unit 12 displays an element choice panel 166 on the basis of the acquired choice list as shown in (c). In this example, as the choice list of the "a" contact symbol 121, an "a" contact symbol 166a, a "b" contact symbol 166b, a leading edge pulse symbol 166c, and a trailing edge pulse symbol 166d are displayed in the element choice panel 166. When any one of the symbols (e.g., the "b" contact symbol 166b) is chosen by the user from the inside of the element choice panel 166 as shown in (d) (T1), the "a" contact symbol 121 chosen by the user is replaced by the "b" contact symbol 122 chosen in the element choice panel 166 by the user as shown in (e).

Note that the choice list can further include a choice for indicating canceling of the replacement of the constituent element. The replacement can be canceled when input operation is performed in a region outside the element choice panel. After the element choice panel is displayed, the replacement can be canceled when no input is performed for a predetermined period.

In the sixth embodiment, the choices associated with the constituent element to be operated are displayed by performing the predefined input operation on the program constituent element. Therefore, there is an effect that it is made possible to easily execute the replacement of the program constituent element.

Seventh Embodiment

In a seventh embodiment, an embodiment concerning movement of the program constituent elements placed as explained above is explained.

The processing executing unit 12 judges, using the input gesture characteristic information acquired by the input-gesture-characteristic-information acquiring unit 11, whether a start point of a drawn track is present in a predetermined position of a constituent element and performs processing of moving the constituent element along the track of the gesture when the start point of the track is present on the predetermined position of the constituent element. In this configuration, when the start point of the gesture is not present on the predetermined position of the constituent element, the processing executing unit 12 performs processing equivalent to the processing explained in the embodiment above.

FIG. 49 is a diagram showing examples of moving conditions of program constituent elements according to the seventh embodiment. As shown in FIG. 49(a), when a program constituent element placed under a track is the connection line 111, the predetermined position is a position (a moving operation region Rm) over the connection line 111. As shown in FIG. 49(b), when a program constituent element placed under the track is a symbol 120 other than the connection line 111, for example, the moving operation range Rm provided on the upper right of a region of a predetermined range including the symbol 120 is set as the predetermined position. A movement of a symbol can be performed by performing input operation with the moving operation region Rm set as a start point of the track.

Figure 51:
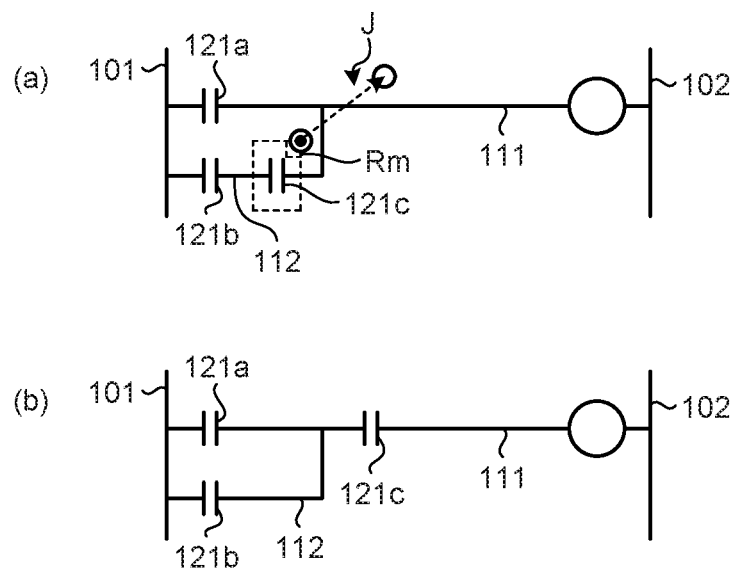
FIG. 51 is a diagram showing an example of a moving method for a program constituent element according to the seventh embodiment.
Figure 52:
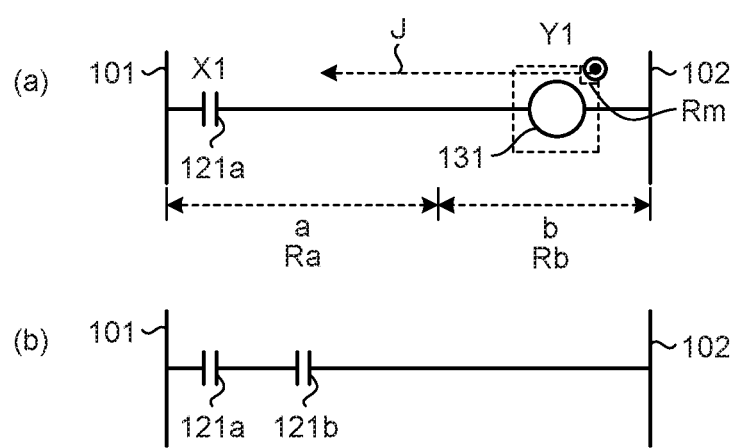
FIG. 52 is a diagram showing an example of a moving method for a program constituent element according to the seventh embodiment.

FIG. 50 to FIG. 52 are diagrams showing examples of moving methods for program constituent elements according to the seventh embodiment. FIG. 50 shows movement of a connection line. In (a), a ladder program is shown in which two coil symbols 131a and 131b are formed in a parallel circuit configuration. When it is desired to move a position of the connection line 112a in the up-down direction parallel to the buses 101 and 102 in this parallel portion to the left, as shown in (b), the input operation J for touching the connection line 112a with the input indicator and, thereafter, moving the input indicator toward the left direction in a state in which the connection line 112a is being pressed, and releasing the input indicator in a position where the movement is desired to be ended is performed. Consequently, as shown in (c), the connection line 112a is moved. In FIG. 50, the connection line 112a is moved in the left-right direction in the screen. For example, movement in the up-down direction of the connection line 112b in a parallel circuit portion in a direction parallel to the connection line 111 can be also performed by the same method.

In FIG. 51, a case in which an "a" contact symbol is moved is shown. In (a), one "a" contact symbol 121a is placed on the connection line 111. The connection line 112 on which two "a" contact symbols 121b and 121c are placed between the connection line 111 and the left bus 101 to configure a parallel circuit in conjunction with the "a" contact symbol 121a is provided. When the "a" contact symbols 121c among these symbols is moved, the user performs, while touching the moving operation region Rm on the upper right of the "a" contact symbol 121c, the input operation J to move the input indicator to a position to which the user desires to move the input indicator. The user releases the input indicator from the program editing screen in a position where the user desires to place by the movement, whereby the location of the "a" contact symbol 121c moves onto the connection line 111 as shown in (b).

It is explained with reference to FIG. 39 in the third embodiment that the program constituent element, the initial character of the device name of which is "Y", becomes either an output or an input. Therefore, when the movement of the program constituent element, the initial character of the device name of which is "Y", is performed, as shown in FIG. 52(a), the type of a symbol can be changed according to a position of a moving destination of the symbol. For example, when the coil symbol 131 is moved from the region Rb to the region Ra like the input operation J in (a), the coil symbol 131 is changed to the "a" contact symbol 121b, and the "a" contact symbol 121b is placed as shown in (b).

Further, when the user is moving the input indicator in contact with the moving operation region Rm, in order to allow the user to see that the symbol is being moved, a symbol to be moved can be distorted or formed in a standing-out shape or a shape of the symbol to be moved can be deformed.

The movement is explained above. Instead of the movement, addition of a copy (hereinafter copying) of the program constituent element can be also performed by the same method. FIG. 53 is a diagram showing an example of a procedure of program editing processing according to the seventh embodiment. As shown in FIG. 53(a), a copy operation region Rcp is provided in a symbol. When the user desires to copy the symbol, the user moves the input indicator while touching the operation region Rcp with the input indicator, whereby a copy of the pressed program constituent element moves. In this example, the user draws, while touching the copy operation region Rcp in the center of the "a" contact symbol 121a that is a constituent of the parallel circuit, the input operation J by moving the input indicator to the position where the user desires to place a copied "a" contact symbol. The user releases the input indicator from the program editing screen in a position where the user desires to place the new "a" contact symbol, whereby, as shown in FIG. 53(b), the "a" contact symbol 121b is newly placed in a designated position.

Note that, although the example in which the copy operation region Rcp is provided is explained above, other methods can be also provided as a method of the copy operation. For example, an editing button for designating copy operation can be provided as a button for editing explained in an eighth embodiment explained below and a combination of the editing button and the movement operation region Rm can be used to make it possible to, without providing the copy operation region Rcp, copy the program constituent element by performing input operation of moving the program constituent element in a state in which the editing button being pressed. Similarly, the editing button for designating the copy operation can be provided such that, in a state in which the editing button is being pressed, all input operations for a program constituent element are processed as input operation for copying the program constituent element.

In the seventh embodiment, because the input operation is performed using the input indicator on the predetermined position of the constituent element, there is an effect that it is made possible to easily perform relocation and copying of the program constituent element.

Eighth Embodiment

In the embodiments explained above, the commands to be executed are specified by the input operations by the input indicator. In an eighth embodiment, an editing button is provided to make it possible to select a command to be executed according to a combination of the input operation and the status of the editing button.

In an engineering tool in which a program for program editing is introduced according to the eighth embodiment, an editing button for enabling choice of permission/non-permission of a predetermined editing function is provided. Examples of the editing button include a change permission button for setting permission/non-permission of a change of a ladder program by the input operation, a movement permission button for setting permission/non-permission of movement of a program constituent element by the input operation, a copy permission button for setting permission/non-permission of copying of the program constituent element by the input operation, and a deletion permission button for setting permission/non-permission of deletion of the program constituent element.

When the editing button is in a permission state, editing processing (change, movement, deletion, etc.) associated with the editing button can be performed. On the other hand, when the editing button is in a non-permission state, the editing processing (change, movement, deletion, etc.) associated with the editing button cannot be performed. In this case, not only the editing processing can be simply disabled to be executed but also processing associating non-permission of the editing processing and the input operation using the input indicator can be made executable.

In that case, the gesture definition stores a record that specifies processing for a combination of a type of a constituent element, a shape of a track and a direction of the track, a permission state or a non-permission state of the editing button, and a command to be executed.

The processing executing unit 12 specifies an operation target on the basis of coordinate information included in the input gesture characteristic information stored by the input-gesture-characteristic-information acquiring unit 11 and executes a command stored in the gesture definition concerning the operation target on the basis of a shape of a track and a direction of the track stored in the input gesture characteristic information and a state of permission/non-permission of the editing button, and displays a ladder program obtained after the execution of the command on the program editing screen. Note that the permission state and/or the non-permission state of the editing buttons can be also displayed on the program editing screen as editing permission state information indicating the state of the editing button.

Note that a basic flow of the program editing processing in the eighth embodiment is the same as the basic flow of the program editing processing in the embodiments explained above except that a state of the editing button is added as a choice for specifying a command in the gesture definition. Therefore, explanation of the basic flow of the program editing processing is omitted in this description.

Figure 55:
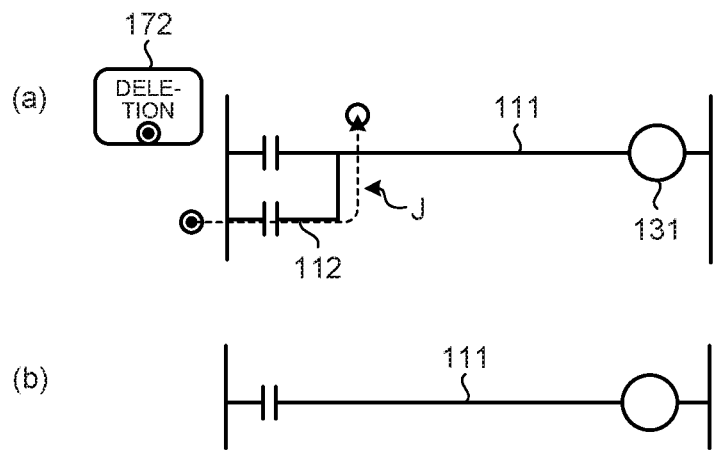
FIG. 55 is a diagram showing an example of a procedure of program editing processing according to the eighth embodiment.
Figure 56:
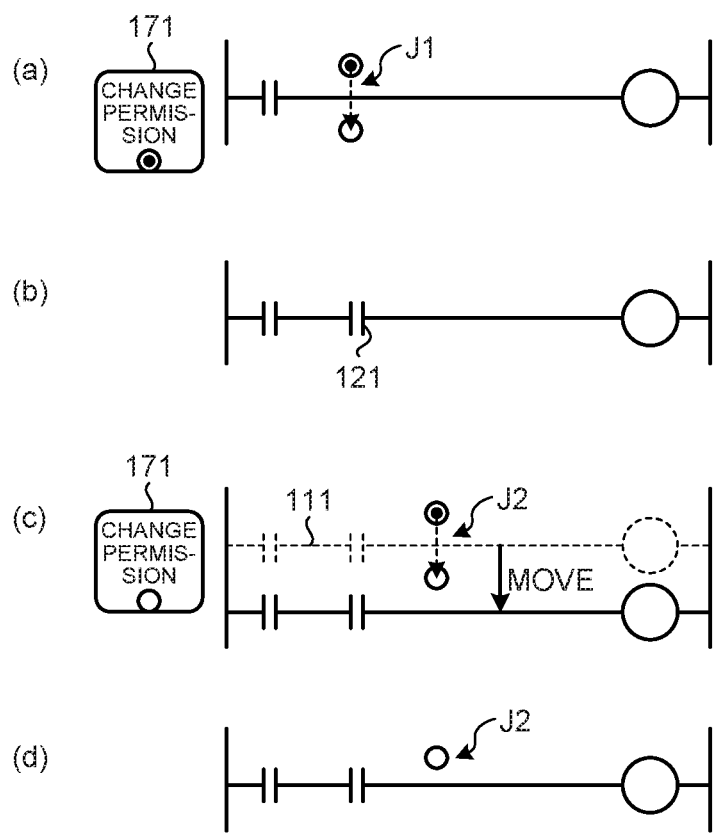
FIG. 56 is a diagram showing an example of a procedure of program editing processing according to the eighth embodiment.

In the following explanation, specific examples of the program editing processing using the editing button performed (1) when a command for changing a program is not executed in the non-permission state of the editing button and (2) when a gesture definition is defined to execute a different command in the non-permission state of the editing button are explained. FIG. 54 to FIG. 56 are diagrams showing examples of procedure of program editing processing according to the eighth embodiment.

(1) A Case in which a Command for Changing a Program is not Executed in the Case of the Non-Permission State An example is explained in which, when the editing button is in the permission (ON) state, the processing such as the change of location of the program constituent element explained in the embodiment explained above can be performed but, when the editing button is in the non-permission (OFF) state, the processing such as the change of location of the program constituent element cannot be performed.

When a change permission button 171 functioning as the editing button is pressed to change to a change permission state as shown in FIG. 54(a), for example, the processing for changing the location of the program constituent element can be performed. Therefore, for example, when the input operation J1 for placing an "a" contact symbol is performed on the program editing screen, the "a" contact symbol 121 corresponding to the input operation J1 is placed as shown in (b).

Thereafter, when the change permission button 171 is pressed to change to a change non-permission state, in the gesture definition, definition for not executing a relevant command in the change non-permission state is performed, whereby, for example, the processing for changing the location of the program constituent element cannot be performed. Therefore, even if, for example, the input operation J2 for placing an "a" contact symbol is performed on the program editing screen as shown in (c), no "a" contact symbol is placed in the program editing screen as shown in (d).

The operation is the same when a movement permission button is provided instead of the change permission button as the editing button. In this case, the movement of the program constituent element is possible when the movement permission button is in the state of "permitted". However, the movement does not occur when the movement permission button is in a non-permission state.

In FIG. 55, a case in which a deletion permission button 172 is provided as the editing button is shown. When the deletion permission button 172 is pressed to change to a deletion permission state and the input operation J is performed to trace the connection line 112 of the parallel circuit provided with respect to the connection line 111 as shown in (a), the connection line 112 placed under the input operation J is deleted as shown in (b). When the deletion permission button 172 is pressed again to change to a deletion non-permission state, processing corresponding to a drawn gesture is performed as in the case of FIGS. 54(c) and (d).

(2) A Case in which Gesture Definition is Defined to Execute a Different Command in the Case of the Non-Permission State An example is explained in which different commands are executed when the editing button is changed to the non-permission state to perform the input operation and when the editing button is changed to the permission state to perform the input operation.

When the change permission button 171 functioning as the editing button is pressed to change to the change permission state as shown in FIG. 56(a), for example, by defining a command for placing a program constituent element as a command executed according to the input operation, if, for example, the input operation J1 for placing an "a" contact symbol is performed on the program editing screen, the "a" contact symbol 121 corresponding to the input operation is placed as shown in (b).

Thereafter, when the change permission button 171 is pressed to change to the change non-permission state, the input operation J2 same as (a) is performed on the program editing screen as shown in (c). Then, when scroll processing is defined in the gesture definition for the input operation J2 in the non-permission state of the change permission in the gesture definition, a range of a program displayed on the program editing screen moves. When the user releases the input indicator from the program editing screen and ends the input operation J2 as shown in (d), the scroll processing ends.

Note that permission and non-permission can be switched every time the editing button is pressed. Alternatively, the editing button can be also configured to be usually in the non-permission state and change to the permission state when it is continuously pressed. The editing button can be displayed on a display section of a tablet terminal or can be also configured using a multi-touch function included in a touch input device of the tablet terminal. The editing button can be also configured using an input key of a keyboard connected to the tablet terminal. A physical operation button can be also provided in the tablet terminal and allocated to the editing button.

In the eighth embodiment, the editing button is provided. The command to be executed can be changed according to ON or OFF of the editing button. Consequently, there is an effect that it is made possible to increase processing allocated to input operations, shapes of tracks and directions of the tracks of which are the same. An effect is further obtained that it is made possible to prevent a program from being changed by mistake concerning editing processing such as deletion or movement. Therefore, there is also an effect that it is made possible to improve operability by the user.

Ninth Embodiment

In the embodiments explained above, the editing of a program is performed by the program for program editing. In a ninth embodiment, when an operation state such as a value of a variable in a control apparatus actually in operation (hereinafter referred to as a device variable) is displayed on a program editing screen, a state of the device variable in execution is controlled by input operation using an input indicator.

In a program for program editing, processing in which the input-gesture-characteristic-information acquiring unit 11 acquires input gesture characteristic information from input operation is the same as the processing in the embodiments explained above.

The processing executing unit 12 specifies a command corresponding to the input gesture characteristic information according to the gesture definition and performs processing for executing, on a control apparatus such as a programmable controller connected via a communication line, a command for changing a value of a device variable in the control apparatus. For example, the processing executing unit 12 has a function of, in an ON state of an "a" contact symbol in a ladder program, when a user performs an input operation corresponding to a command for changing the state of the device variable, in a control apparatus in which the ladder program is actually executed, the changing the state of a device variable indicated by an "a" contact symbol corresponding to the control apparatus to OFF and changing an "a" contact symbol on the program editing state to an OFF state.

In the above explanation, the command for changing the state of the device variable is defined in the gesture definition concerning the operation target. A command executed when the state of the device variable is ON and a command executed when the state of the device variable is OFF can be also respectively defined in the gesture definition concerning the operation state. The processing executing unit 12 can be also configured to switch, according to the state of the device variable, the command to be executed.

Figure 57:
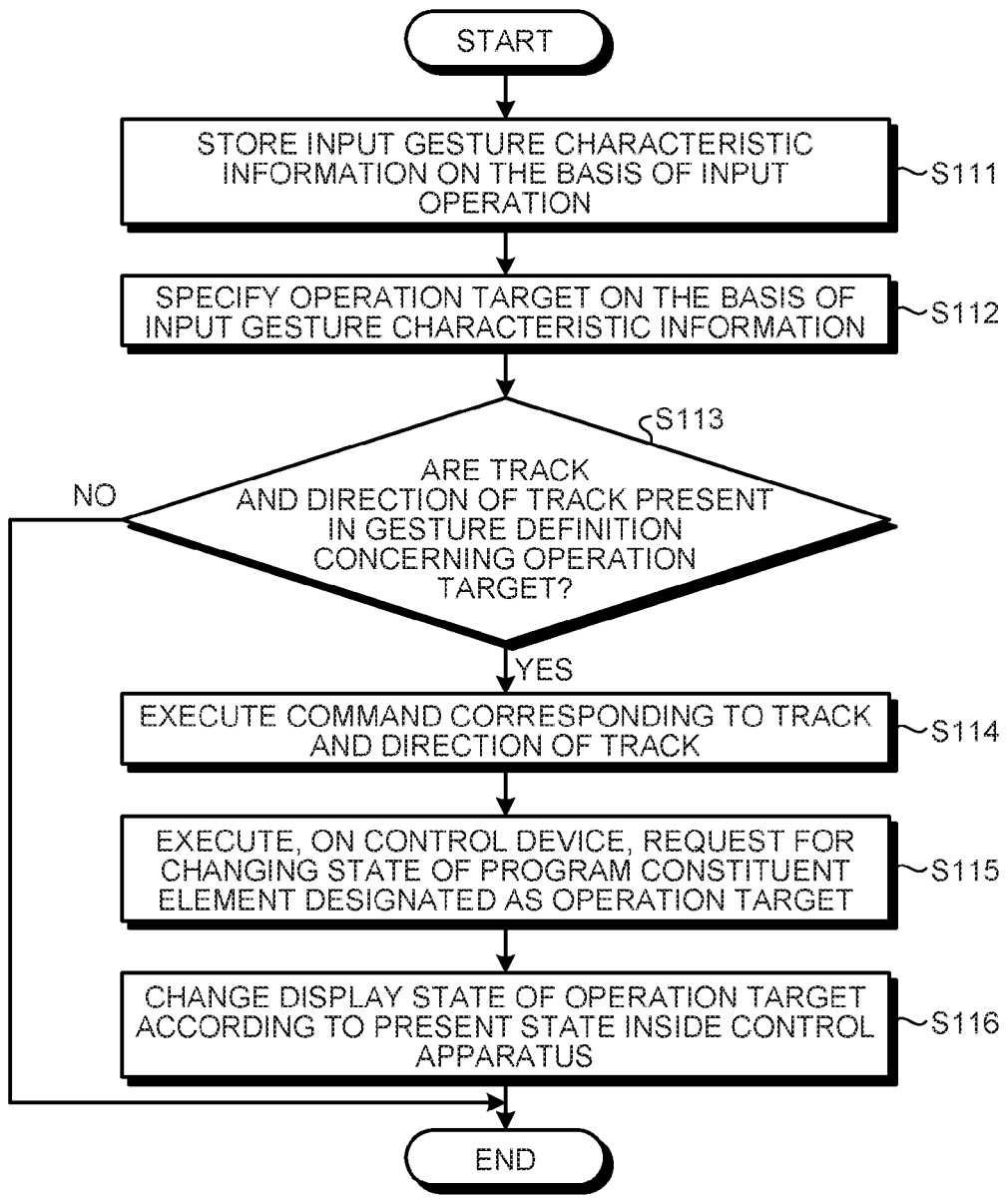
FIG. 57 is a flowchart showing an example of a procedure of processing performed by a program for program editing according to a ninth embodiment.

FIG. 57 is a flowchart for explaining an example of a procedure of program editing processing according to the ninth embodiment. A ladder program being executed in the control apparatus is displayed on the program editing screen. In a program constituent element of the ladder program, a present state inside the control apparatus of a device variable indicated by the program constituent element is also displayed. The state of the device variable can be changed by sending a request to the control apparatus (hereinafter referred to as test mode state).

First, the input-gesture-characteristic-information acquiring unit 11 stores input gesture characteristic information on the basis of input operation (step S111). Note that, as explained above, the input gesture characteristic information includes, besides the shape of a track and the direction of the track of the input indicator on the program editing screen, coordinate information in which the track is drawn.

Subsequently, the processing executing unit 12 specifies an operation target on the basis of the input gesture characteristic information (step S112). Thereafter, the processing executing unit 12 judges whether the shape of the track and the direction of the track stored in the input gesture characteristic information are present in a gesture definition concerning the operation target (step S113).

When the shape of the track and the direction of the track included in the input gesture characteristic information are present in the gesture definition concerning the operation target (Yes at step S113), the processing executing unit 12 executes a command corresponding to the shape of the track and the direction of the track of the input gesture characteristic information (step S114). That is, the processing executing unit 12 executes, on the control apparatus, via the communication equipment, a request for changing the state of a program constituent element designated as the operation target (step S115). Subsequently, the processing executing unit 12 changes the state of display of the operation target according to the present state inside the control apparatus (step S116) and the program editing processing ends.

At step S113, when the shape of the track and the direction of the track included in the input gesture characteristic information are absent in the gesture definition of the operation target (No at step S113), the processing executing unit 12 executes no command and the program editing processing ends.

Figure 58:
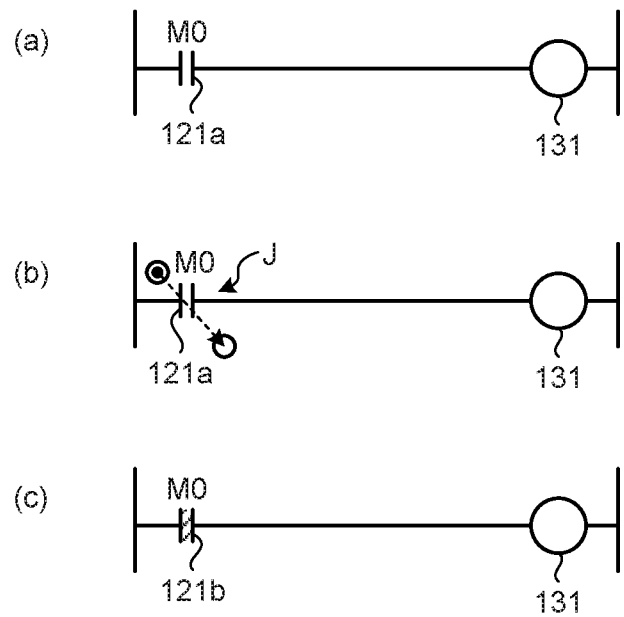
FIG. 58 is a diagram showing an example of a procedure of processing in a test mode state according to the ninth embodiment.
Figure 59:
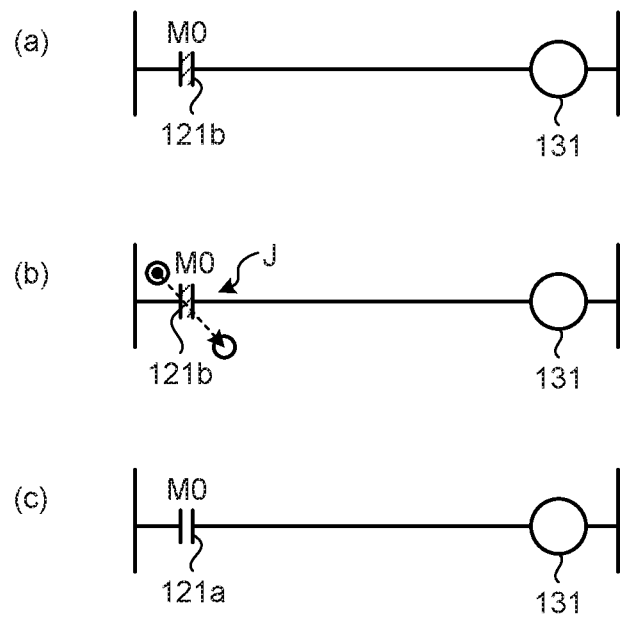
FIG. 59 is a diagram showing an example of a procedure of processing in the test mode state according to the ninth embodiment.

A procedure of program editing processing using a program editing screen set in the test mode state is explained below with reference to a specific example. FIG. 58 and FIG. 59 are diagrams showing examples of procedures of program editing processing in the test mode state according to the ninth embodiment.

FIG. 58 shows the case in which the operation state of an "a" contact is changed from OFF to ON in the test mode state. As shown in (a), a ladder program including the "a" contact symbol 121*a* in an OFF state and the coil symbol 131 is displayed on the program editing screen. When, in this state, the input operation J for moving the input indicator from a region on the upper left to a region on the lower right of the "a" contact symbol 121*a* is performed as shown in (b), as a result, a request for changing a contact having a device name M0 corresponding to the "a" contact symbol 121*a* (121*b*) to an ON state is output from the tablet terminal, which is executing the program for program editing, to the control apparatus via the communication equipment. As shown in (c), the "a" contact symbol 121*a* of "OFF" is switched to the "a" contact symbol 121*b* in the ON state.

FIG. 59 shows an example in which an operation state of the "a" contact is changed from ON to OFF in the test mode state. As shown in (a), a ladder program including the "a" contact symbol 121*b* in the ON state and the coil symbol 131 is displayed on the program editing screen. In this state, when the input operation J for moving the input indicator from a region on the upper left to a region on the lower right of the "a" contact symbol 121*b* is performed as shown in (b), as a result, as shown in (c), a request for changing a contact having the device name M0 corresponding to the "a" contact symbol 121*b* (121*a*) to the OFF state is output from the tablet terminal, which is executing the program for program editing, to the control apparatus via the communication equipment. The "a" contact symbol 121*b* in the ON state is switched to the "a" contact symbol 121*a* in the OFF state.

In the ninth embodiment, when the state of the device variable in the control apparatus is displayed to be superimposed on the ladder program on the program editing screen, by performing an input operation using the input indicator on a program constituent element, a request for changing the state of a device variable corresponding to the program constituent element is issued and a display state of an operation is changed. Consequently, there is an effect that it is made possible to easily switch a state of the program constituent element in the control apparatus during the test mode state of the control apparatus.

Note that, for example, in the gesture definition of the right side base elements, a command for changing an operation state such as a test mode state of the control apparatus can be also defined to make it possible to change the operation state of the control apparatus according to the input operation.

Tenth Embodiment

In the tenth embodiment, a procedure of program editing processing to display help information concerning program editing is explained.

When input gesture characteristic information acquired by the input-gesture-characteristic-information acquiring unit 11 is a command for displaying help information, the processing executing unit 12 executes, on the basis of a command defined in a gesture definition, processing for causing a help-information display panel to display the help information. The help information includes, for example, a program editing method or a list of shapes of tracks and directions of the tracks for placing symbols. The help information can also include movies concerning an input operation method for each of the symbols.

Note that the gesture definition further includes a definition of a gesture associated with the command for displaying the help information. Note that a basic flow of program editing processing in the tenth embodiment is the same as the basic flow in the embodiments explained above. Therefore, explanation of the basic flow of the program editing processing is omitted in this description.

In the following explanation, a specific example of display processing of help information is explained. FIG. 60 is a diagram showing an example of a processing procedure of displaying the help information according to the tenth embodiment. In FIG. 60, an example is explained in which a user desires to add an "a" contact symbol but does not know how to input a gesture.

First, as shown in (a), the user performs, on a program editing screen, the input operation J for displaying help information. Subsequently, the input-gesture-characteristic-information acquiring unit 11 acquires input gesture characteristic information. The processing executing unit 12 displays, on the basis of a gesture definition, a help-information search panel 185 in the vicinity of a gesture drawing region as shown in (b). In the help-information search panel 185, a search-condition input field 185a, to which keywords desired to be searched can be input, and a search button 185b are provided. In this example, the user inputs an ""a" contact" to the search-condition input field 185a and presses the search button 185b.

Then, help information indicating a placement method for an "a" contact symbol is retrieved and displayed in a help-information display panel 186 as shown in (c). Consequently, the user can perform editing of a program referring to the help-information display panel 186.

According to the tenth embodiment, the display of the help information is associated with the input operation using the input indicator. Therefore, there is an effect that it is made possible to provide explanation of an editing method for a program to, for example, a user unaccustomed to editing of the program or a user who does not understand operation during the editing of the program.

Eleventh Embodiment

In editing of a ladder program, in some case, after the ladder program is created by placing only symbols without device names, the device names are set for the symbols. A setting method for the device names in such a case is explained.

Figure 61:
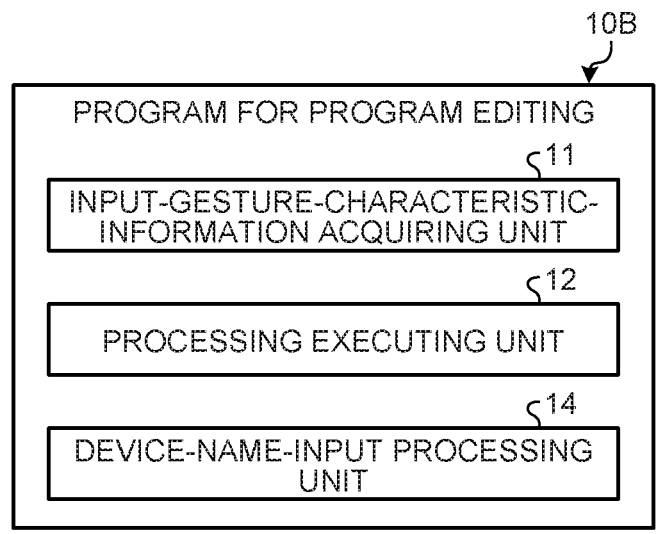
FIG. 61 is a block diagram schematically showing an example of a functional construction of a program for program editing according to an eleventh embodiment.

FIG. 61 is a block diagram schematically showing an example of a functional construction of a program for program editing according to an eleventh embodiment. A program for program editing 10B further includes device-name-input processing unit 14 in addition to the components in the first embodiment.

The device-name-input processing unit 14 registers device names, which are input by a user, to symbols according to device name input order. The device name input order is information for specifying order of registering the device names to symbols in a ladder program displayed on a program editing screen. The device name input order can be, for example, order from an upper connection line to a lower connection line and, in the connection lines, from a left bus to a right bus. Note that the device name input order can be also optionally set by the user.

Note that components same as the components in the embodiments explained above are denoted by the same reference numerals and symbols and explanation of the components is omitted in this description. A basic flow of program editing processing in the eleventh embodiment is the same as the basic flow in the embodiments explained above. Therefore, explanation of the basic flow is omitted in this description.

In the following explanation, a specific example of input processing of device names is explained. FIG. 62 is a diagram showing an example of a procedure of device name input processing according to the eleventh embodiment. A ladder program, to which device names are not input, as shown in (a) is created by the user. Subsequently, device names shown in (b) are key-input using, for example, a keyboard connected to the tablet terminal. It is assumed that an "enter" key indicating a delimiter is input between the device name and the device name. After the end of the input of each device name, the device-name-input processing unit 14 registers each of the device names, which are input as shown in (b), to a corresponding device name input region of each symbol of the ladder program according to the device names and the device name input order shown in (b). If the device name input order is the order explained above, as shown in (c), the input device names are registered in order from the "a" contact symbol 121a on the left side of the top connection line 111 toward the coil symbol 131c on the right side of a bottom connection line 113.

Note that, in the example explained above, the device names are input using the keyboard connected to the tablet terminal. The input method of the device names is not limited to this. For example, a software keyboard can be displayed on a touch panel of the tablet terminal, and the device names can be key-input using the software keyboard. The device names and the delimiter symbols can be also input by voice as shown in FIG. 62(*b*). The input voice can be identified to set the device names in program constituent elements of the ladder program according to the device name input order.

According to the eleventh embodiment, it is made possible to continuously input character strings given to program constituent elements using a device suitable for a character input such as a keyboard without inserting other input operation such as touch operation on a screen halfway. Therefore, there is an effect that the user can efficiently designate the character strings in the program constituent elements.

Figure 63:
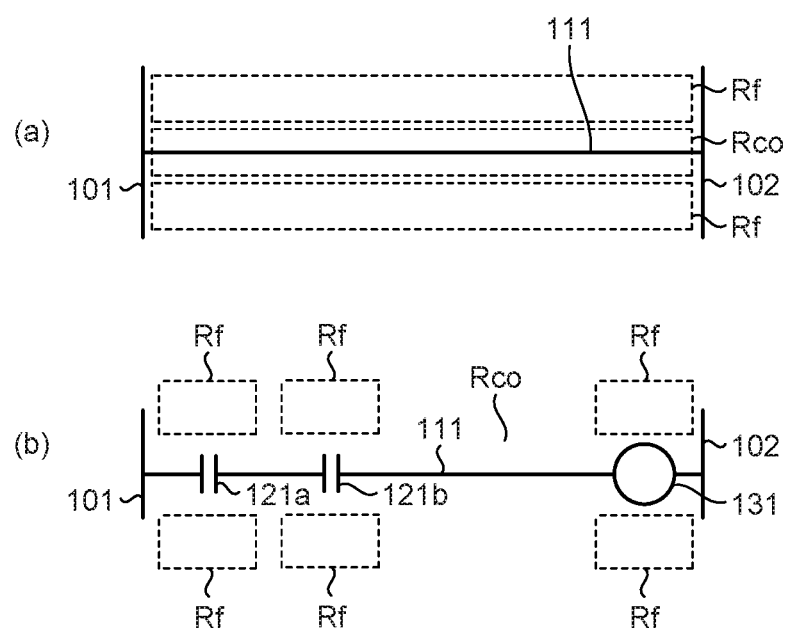
FIG. 63 is a diagram showing another example of a method of acquiring coordinate information of input gesture characteristic information from input operation.

Note that, in the embodiments explained above, a plurality of tracks concerning the coarse input track, the detailed input track, or the large input region are stored with each resolution in acquiring an input track from the input operation uniformly set on the program editing screen. However, the present invention is not limited to this. FIG. 63 is a diagram showing another example of a method of acquiring coordinate information of input gesture characteristic information from the input operation. As shown in FIG. 63(*a*), when the left bus 101, the right bus 102, and the connection line 111 connecting the left bus 101 and the right bus 102 are drawn on the program editing screen, a predetermined region above the connection line 111 and a predetermined region below the connection line 111 are represented as detailed regions Rf. A region sandwiched by the detailed regions Rf is represented as coarse region Rco. The resolution of the input track can be changed according to in which region a track of the input operation is drawn. That is, when a gesture is drawn in the detailed regions Rf, the input-gesture-characteristic-information acquiring unit 11 stores a detailed input track. When a gesture is drawn in the coarse region Rco, the input-gesture-characteristic-information acquiring unit 11 stores a coarse input track.

Further, after program constituent elements are placed in a state shown in FIG. 63(*a*) and, for example, two "a" contact symbols 121*a* and 121*b* and the coil symbol 131 are placed on the connection line 111 as the program constituent elements as shown in FIG. 63(*b*), predetermined regions above and below the program constituent elements can be represented as the detailed regions Rf and the other regions can be represented as the coarse region Rco. Consequently, when an input operation is performed on the detailed regions Rf, the input-gesture-characteristic-information acquiring unit 11 stores a detailed input track. When an input operation is performed on the coarse region Rco, the input-gesture-characteristic-information acquiring unit 11 stores a coarse input track.

The detailed region Rf and the coarse region Rco can be also defined to be superimposed such that, after an input to one region is started, a boundary for determining that a track has shifted to the other region overlaps the other region. Consequently, for example, it is made possible to draw, as a larger track, a track modeling a character input to the detailed region Rf, making it possible to improve operability of the user.

In the embodiments explained above, the shape of the track and the direction of the track are stored in the input gesture characteristic information as the information concerning the track. Information concerning a writing pressure of the track can be also added to the information. The input gesture characteristic information can be also configured to use one or two of the three kinds of information of the shape, the direction, and the writing pressure. That is, for example, only the shape of the track can be used as the information concerning the track.

Note that, in the embodiments explained above, the tablet terminal is explained as the example of the information processing apparatus that executes the program for program editing. Information processing apparatus such as a personal computer including a pointing device such as a mouse, a portable information terminal provided with a touch panel in a display section and having a small size of the display section compared with the tablet terminal, or a multi-function cellular phone can be also used.

In the embodiments explained above, the creation of the ladder program is explained as the example. The embodiments can be also applied to programming using symbols such as an FB, an FBD, and an SFC.

Note that the program editing method in the program for program editing and the control method for the control apparatus can be configured as a program in which the processing procedures of the methods are stored. The methods can be realized by causing the information processing apparatus to execute the program. The program is stored in a recording medium readable by the information processing apparatus such as a hard disk, an SSD (Solid State Drive), a CD (Compact Disk)-ROM (Read Only Memory), an M0 (Magneto-Optical disk), a DVD (Digital Versatile Disk or Digital Video Disk), a memory card and the like. In this case, the program is read out from the recording medium by the information processing apparatus. The program can be also distributed via a network (a communication line) such as the Internet.

INDUSTRIAL APPLICABILITY

As explained hereinabove, the program for program editing according to the present invention has an effect that it is made possible to edit, in the tablet terminal, with less labor, a program described using symbols, an effect that it is made possible to effectively use the program editing screen, and an effect that it is made possible to learn an editing method for a program in a shorter period. Therefore, the program for program editing is useful for programming using symbols of a programmable controller or the like.

REFERENCE SIGNS LIST

10, 10B program for program editing
11 input-gesture-characteristic-information acquiring unit
12 processing executing unit
14 device-name-input processing unit
101 left bus
102 right bus
111, 111*a* to 111*c*, 112, 112*a* to 112*c*, 113 connection line
120 symbol
121, 121*a* to 121*c* "a" contact symbol
122 "b" contact symbol
123 trailing edge pulse "a" contact symbol
131, 131*a* to 131*c* coil symbol
132 instruction frame
132*a* trailing edge pulse instruction frame
151, 151*a*, 151*b* device name
161 choice panel
162 character input region
163 character input panel
164 character-input-operation receiving region
165 guide line
166 element choice panel
171 change permission button
172 deletion permission button
180, 200, 200A program editing screen
185 help-information search panel
185*a* search-condition input field
185*b* search button
186 help-information display panel
210 character input panel
220 character input region

The invention claimed is:

1. A computer-readable recording medium that stores therein a program for program editing for editing a program described using a symbol on a program editing screen, the program for program editing causing an information processing apparatus to function as:

input-gesture-characteristic-information acquiring unit for acquiring input gesture characteristic information including coordinate information and a shape of a track of the coordinate information input on the program editing screen; and processing executing unit for specifying an operation target and specifying a command applied to the operation target based on the input gesture characteristic information, executing the command, and displaying a result of execution of the command on the program editing screen, wherein:

the processing executing unit specifies the command based on a gesture definition in which a type of the operation target selected from among a constituent element type and a non-constituent element type, the shape of the track, and a command to be executed, are associated with each other, executes the specified command, and displays a result of execution of the command on the program editing screen, in the constituent element type, the operation target is a symbol of a relay control circuit, the input-gesture-characteristic-information acquiring unit acquires a first input track, which is a record of passing points from a start point to an end point of the coordinate information at first resolution, and a second input track, which is a record of the passing points from the start point to the end point of the coordinate information at second resolution higher than the first resolution, the processing executing unit judges whether a command corresponding to the first input track is present in the gesture definition and judges whether a command corresponding to the second input track is present in the gesture definition, and the processing executing unit acquires an input character string based on the second input track and, when a command corresponding to the input character string is present in the gesture definition, registers the input character string in the operation target.

2. The computer-readable recording medium that stores therein the program for program editing according to claim 1, wherein the processing executing unit acquires an input character string based on information included in the input gesture characteristic information and, when a command corresponding to the input character string is present in the gesture definition, registers the input character string in the operation target.

3. The computer-readable recording medium that stores therein the program for program editing according to claim 1, wherein the processing executing unit has a function of, in specifying the operation target based on the coordinate information, when a plurality of choices of the operation target are present, displaying the choices of the operation target as a list, and the processing executing unit has a function of capable of choosing the operation target from the choices of the operation target.

4. The computer-readable recording medium that stores therein the program for program editing according to claim 1, wherein the processing executing unit has a function of displaying, in changing the type of the operation target, choices of the type as a list and a function of capable of choosing the type from the choices.

5. The computer-readable recording medium that stores therein the program for program editing according to claim 1, wherein a track of input operation is displayed on the program editing screen.

6. The computer-readable recording medium that stores therein the program for program editing according to claim 1, wherein a guide line indicating a range in which input operation is possible is displayed on the program editing screen.

7. The computer-readable recording medium that stores therein the program for program editing according to claim 1, wherein, when a start point of the track is present in a predetermined position of the operation target, the processing executing unit moves the operation target along an input operation.

8. The computer-readable recording medium that stores therein the program for program editing according to claim 1, wherein the processing executing unit is capable of changing, according to information concerning possibility of program editing, a command to be executed.

9. The computer-readable recording medium that stores therein the program for program editing according to claim 1, wherein, in the non-constituent element type, the operation target is selected from among a standard base element, a device name input base element, and a comment input base element.

10. The computer-readable recording medium that stores therein the program for program editing according to claim 9, wherein in the constituent element type, the operation target is selected from among a symbol representing a contact, a symbol representing a coil, a connection line connecting symbol, and a base element placed along a bus or on an side of the bus representing the symbol of the relay control circuit.

11. A computer-readable recording medium that stores therein a program for program editing for editing a program described using a symbol on a program editing screen, the program for program editing causing an information processing apparatus to function as:

input-gesture-characteristic-information acquiring unit for acquiring input gesture characteristic information including coordinate information, a shape of a track of the coordinate information, and a direction of the track, input on the program editing screen; and processing executing unit for specifying an operation target and specifying a command applied to the operation target based on the input gesture characteristic information, executing the command, and displaying a result of execution of the command on the program editing screen, wherein:

the processing executing unit specifies the command based on a gesture definition in which a type of the operation target is selected from among a constituent element type and a non-constituent element type, the shape and the direction of the track, and a command to be executed, are associated with each other, executes the specified command, and displays a result of execution of the command on the program editing screen, in the constituent element type, the operation target is a symbol of a relay control circuit, the input-gesture-characteristic-information acquiring unit acquires a first input track, which is a record of passing points from a start point to an end point of the coordinate information at first resolution, and a second input track, which is a record of the passing points from the start point to the end point of the coordinate information at second resolution higher than the first resolution, the processing executing unit judges whether a command corresponding to the first input track is present in the gesture definition and judges whether a command corresponding to the second input track is present in the gesture definition, and the processing executing unit acquires an input character string based on the second input track and, when a command corresponding to the input character string is present in the gesture definition, registers the input character string in the operation target.

12. The computer-readable recording medium that stores therein the program for program editing according to claim 11, wherein the processing executing unit acquires an input character string based on information included in the input gesture characteristic information and, when a command corresponding to the input character string is present in the gesture definition, registers the input character string in the operation target.

13. The computer-readable recording medium that stores therein the program for program editing according to claim 11, wherein the processing executing unit has a function of, in specifying the operation target based on the coordinate information, when a plurality of choices of the operation target are present, displaying the choices of the operation target as a list, and
the processing executing unit has a function of capable of choosing the operation target from the choices of the operation target.

14. The computer-readable recording medium that stores therein the program for program editing according to claim 11, wherein the processing executing unit has a function of displaying, in changing the type of the operation target, choices of the type as a list and a function of capable of choosing the type from the choices.

15. The computer-readable recording medium that stores therein the program for program editing according to claim 11, wherein a track of input operation is displayed on the program editing screen.

16. The computer-readable recording medium that stores therein the program for program editing according to claim 11, wherein a guide line indicating a range in which input operation is possible is displayed on the program editing screen.

17. The computer-readable recording medium that stores therein the program for program editing according to claim 11, wherein, when a start point of the track is present in a predetermined position of the operation target, the processing executing unit moves the operation target along an input operation.

18. The computer-readable recording medium that stores therein the program for program editing according to claim 11, wherein the processing executing unit is capable of changing, according to information concerning possibility of program editing, a command to be executed.

19. A computer-readable recording medium that stores therein a program for program editing for editing a program described using a symbol on a program editing screen, the program for program editing causing an information processing apparatus to function as:
an input-gesture-characteristic-information acquiring unit for acquiring input gesture characteristic information including coordinate information and a shape of a track of the coordinate information input on the program editing screen; and
a processing executing unit for specifying an operation target and specifying a command applied to the operation target based on the input gesture characteristic information, executing the command, and displaying a result of execution of the command on the program editing screen,
wherein the processing executing unit specifies based on a gesture definition that associates a type of the operation target, the shape of the track, and a command to be executed, executes the specified command, and displays a result of execution of the command on the program editing screen, and
wherein:
the processing executing unit judges whether the operation target is a constituent element for a character input,
the input-gesture-characteristic-information acquiring unit acquires, when it is judged that the operation target is not the constituent element for a character input, a first input track, which is a record of the coordinate information of passing points from a start point to an end point at first resolution, and acquires, when it is judged that the operation target is the constituent element for the character input, a second input track, which is a record of the coordinate information of the passing points from the start point to the end point at second resolution higher than the first resolution, and
when the second input track is acquired, the processing executing unit acquires an input character string based on the second input track and registers the input character string in the operation target.

20. A computer-readable recording medium that stores therein a program for program editing for editing a program described using a symbol on a program editing screen, the program for program editing causing an information processing apparatus to function as:
an input-gesture-characteristic-information acquiring unit for acquiring input gesture characteristic information including coordinate information, a shape of a track of the coordinate information, and a direction of the track, input on the program editing screen; and
a processing executing unit for specifying an operation target and specifying a command applied to the operation target based on the input gesture characteristic information, executing the command, and displaying a result of execution of the command on the program editing screen,
wherein the processing executing unit specifies the command based on a gesture definition that associates a type of the operation target, the shape and the direction of the track, and a command to be executed, executes the specified command, and displays a result of execution of the command on the program editing screen,
wherein:
the processing executing unit judges whether the operation target is a constituent element for a character input,
the input-gesture-characteristic-information acquiring unit acquires, when it is judged that the operation target is not the constituent element for a character input, a first input track, which is a record of the coordinate information of passing points from a start point to an end point at first resolution, and acquires, when it is judged that the operation target is the constituent element for the character input, a second input track, which is a record of the coordinate information of the passing points from the start point to the end point at second resolution higher than the first resolution, and
when the second input track is acquired, the processing executing unit acquires an input character string based on the second input track and registers the input character string in the operation target.

21. A method for editing a program described using a symbol on a program editing screen, the method comprising:
acquiring input gesture characteristic information comprising coordinate information and a shape of a track of the coordinate information input on the program editing screen;
specifying an operation target based on the acquired input gesture characteristic information;
specifying a command applied to the operation target based on the acquired input gesture characteristic information and a gesture definition;
executing the specified command; and displaying a result of said executing the specified command, on the program editing screen,
wherein:
the gesture definition associates with each other a type of the operation target selected from among a constituent element type and a non-constituent element type, the shape of the track, and a command to be executed,
in the constituent element type, the operation target is a symbol of a relay control circuit,
the acquiring comprises acquiring a first input track, which is a record of passing points from a start point to an end point of the coordinate information at first resolution, and a second input track, which is a record of the passing points from the start point to the end point of the coordinate information at second resolution higher than the first resolution,
the specifying comprises judging whether a command corresponding to the first input track is present in the gesture definition and judging whether a command corresponding to the second input track is present in the gesture definition, and
the acquiring comprises acquiring an input character string based on the second input track and, when a command corresponding to the input character string is present in the gesture definition, registering the input character string in the operation target.

22. A method for editing a program described using a symbol on a program editing screen, the method comprising:
acquiring input gesture characteristic information comprising coordinate information, a shape of a track of the coordinate information, and a direction of the track, input on the program editing screen;
specifying an operation target based on the acquired input gesture characteristic information;
specifying a command applied to the operation target basis on the input gesture characteristic information and a gesture definition;
executing the specified command; and
displaying a result of the executing of the specified command, on the program editing screen,
wherein the gesture definition associates with each other, a type of the operation target selected from among a constituent element type and a non-constituent element type, the shape and the direction of the track, and a command to be executed,
wherein, in the constituent element type, the operation target is a symbol of a relay control circuit,
wherein the acquiring comprises acquiring a first input track, which is a record of passing points from a start point to an end point of the coordinate information at first resolution, and a second input track, which is a record of the passing points from the start point to the end point of the coordinate information at second resolution higher than the first resolution,
wherein the specifying comprises judging whether a command corresponding to the first input track is present in the gesture definition and judging whether a command corresponding to the second input track is present in the gesture definition, and
wherein the acquiring comprises acquiring an input character string based on the second input track and, when a command corresponding to the input character string is present in the gesture definition, registering the input character string in the operation target.

* * * * *